(12) United States Patent
Ueshima et al.

(10) Patent No.: US 7,682,237 B2
(45) Date of Patent: Mar. 23, 2010

(54) MUSIC GAME WITH STRIKE SOUNDS CHANGING IN QUALITY IN THE PROGRESS OF MUSIC AND ENTERTAINMENT MUSIC SYSTEM

(75) Inventors: Hiromu Ueshima, Shiga (JP); Masaki Ohashi, Shiga (JP)

(73) Assignee: SSD Company Limited, Shiga (JP)

( * ) Notice: Subject to any disclaimer, the term of this patent is extended or adjusted under 35 U.S.C. 154(b) by 1115 days.

(21) Appl. No.: 10/947,064

(22) Filed: Sep. 22, 2004

(65) Prior Publication Data
US 2005/0096132 A1     May 5, 2005

(30) Foreign Application Priority Data
Sep. 22, 2003   (JP)   ............... P. 2003-329324

(51) Int. Cl.
A63F 13/10   (2006.01)
G10H 3/00    (2006.01)
G10F 1/08    (2006.01)
A63F 13/08   (2006.01)

(52) U.S. Cl. ............... 463/7; 463/35; 463/36; 84/104; 84/106; 84/411 R

(58) Field of Classification Search ............ 463/7, 463/35, 36; 84/104, 106, 411 R
See application file for complete search history.

(56) References Cited

U.S. PATENT DOCUMENTS

| | | | | |
|---|---|---|---|---|
| 3,659,032 A | * | 4/1972 | May | 84/600 |
| 4,479,412 A | * | 10/1984 | Klynas | 84/730 |
| 4,691,611 A | * | 9/1987 | May | 84/421 |
| 5,140,889 A | * | 8/1992 | Segan et al. | 84/723 |
| 5,434,350 A | * | 7/1995 | Haney et al. | 84/743 |
| 5,773,742 A | * | 6/1998 | Eventoff et al. | 84/609 |
| 5,925,843 A | * | 7/1999 | Miller et al. | 84/609 |
| 5,990,405 A | * | 11/1999 | Auten et al. | 84/609 |
| 6,018,121 A | * | 1/2000 | Devecka | 84/743 |
| 6,070,205 A | | 5/2000 | Kato et al. | |
| 6,075,197 A | * | 6/2000 | Chan | 84/730 |

(Continued)

FOREIGN PATENT DOCUMENTS

JP    2001-070649 A    3/2001

(Continued)

OTHER PUBLICATIONS

"Feature: Interview with Wayne Lytle, from Animusic", MIDI Manufacturers Association, copyright 1995-2008, accessed Jun. 12, 2008, <http://www.midi.org/aboutmidi/animusic.php>.*

(Continued)

*Primary Examiner*—Peter D. Vo
*Assistant Examiner*—William H McCulloch
(74) *Attorney, Agent, or Firm*—Osha • Liang LLP

(57) ABSTRACT

Indication objects are displayed on a television monitor at the intervals in agreement with the rhythm of music, such that the player can generate musical tones in synchronization with music by striking the strike surface of a music game console in the appropriate timing as indicated by indication objects. In this case, the tone quality of the strike sound changes in the progress of music on the basis of strike sound indicating information.

23 Claims, 29 Drawing Sheets

U.S. PATENT DOCUMENTS

| | | | |
|---|---|---|---|
| 6,390,923 B1* | 5/2002 | Yoshitomi et al. | 463/43 |
| 6,607,436 B1* | 8/2003 | Ueshima et al. | 463/3 |
| 6,638,160 B2* | 10/2003 | Yoshitomi | 463/7 |
| 6,645,067 B1* | 11/2003 | Okita et al. | 463/7 |
| 6,659,873 B1* | 12/2003 | Kitano et al. | 463/42 |
| 6,695,694 B2* | 2/2004 | Ishikawa et al. | 463/7 |
| 6,786,821 B2* | 9/2004 | Nobe et al. | 463/31 |
| 6,821,203 B2* | 11/2004 | Suga et al. | 463/7 |
| 6,835,887 B2* | 12/2004 | Devecka | 84/743 |
| 6,905,413 B1* | 6/2005 | Terao et al. | 463/40 |
| 7,070,500 B1* | 7/2006 | Nomi et al. | 463/7 |
| 7,128,649 B2* | 10/2006 | Nobe et al. | 463/23 |
| 7,217,878 B2* | 5/2007 | Ludwig | 84/609 |
| 7,235,748 B2* | 6/2007 | Ueshima et al. | 200/18 |
| 7,283,948 B2* | 10/2007 | Holzrichter et al. | 704/2 |
| 7,297,864 B2* | 11/2007 | Ueshima et al. | 84/724 |
| 7,320,643 B1* | 1/2008 | Brosius et al. | 463/37 |
| 7,322,889 B2* | 1/2008 | Ueshima | 463/34 |
| 7,331,856 B1* | 2/2008 | Nakamura et al. | 463/7 |
| 7,371,164 B2* | 5/2008 | Ueshima | 463/8 |
| 7,435,178 B1* | 10/2008 | Tam et al. | 463/38 |
| 7,554,545 B2* | 6/2009 | Ueshima | 345/441 |
| 7,582,015 B2* | 9/2009 | Onoda et al. | 463/30 |
| 2001/0007824 A1* | 7/2001 | Fukuda | 463/7 |
| 2001/0011496 A1* | 8/2001 | Mishima et al. | 84/600 |
| 2001/0016510 A1* | 8/2001 | Ishikawa et al. | 463/7 |
| 2002/0013166 A1* | 1/2002 | Yoshitomi | 463/7 |
| 2002/0025841 A1* | 2/2002 | Nobe et al. | 463/1 |
| 2002/0025842 A1* | 2/2002 | Nobe et al. | 463/7 |
| 2002/0142818 A1* | 10/2002 | Nakatsuka et al. | 463/7 |
| 2003/0032468 A1* | 2/2003 | Adams, Jr. | 463/9 |
| 2003/0125099 A1* | 7/2003 | Basson et al. | 463/7 |
| 2005/0085284 A1* | 4/2005 | Onoda et al. | 463/7 |
| 2005/0096132 A1* | 5/2005 | Ueshima et al. | 463/37 |
| 2005/0101364 A1* | 5/2005 | Onoda et al. | 463/7 |
| 2005/0124413 A1* | 6/2005 | Ueshima | 463/30 |
| 2005/0140645 A1* | 6/2005 | Ueshima | 345/156 |
| 2006/0058101 A1* | 3/2006 | Rigopulos | 463/35 |
| 2006/0141433 A1* | 6/2006 | Hing et al. | 434/247 |
| 2007/0197290 A1* | 8/2007 | Ueshima | 463/36 |
| 2007/0232374 A1* | 10/2007 | Lopiccolo et al. | 463/7 |
| 2007/0243915 A1* | 10/2007 | Egozy et al. | 463/7 |
| 2007/0252327 A1* | 11/2007 | Ueshima et al. | 273/148 B |
| 2007/0265074 A1* | 11/2007 | Akahori et al. | 463/35 |
| 2008/0031544 A1* | 2/2008 | Ueshima et al. | 382/289 |
| 2008/0113698 A1* | 5/2008 | Egozy | 463/7 |
| 2008/0113797 A1* | 5/2008 | Egozy | 463/35 |
| 2008/0139307 A1* | 6/2008 | Ueshima et al. | 463/31 |
| 2008/0146303 A1* | 6/2008 | Ueshima | 463/7 |
| 2008/0161078 A1* | 7/2008 | Nakano et al. | 463/7 |
| 2008/0200224 A1* | 8/2008 | Parks | 463/7 |
| 2008/0220864 A1* | 9/2008 | Brosius et al. | 463/33 |
| 2008/0261693 A1* | 10/2008 | Zalewski | 463/31 |
| 2008/0280660 A1* | 11/2008 | Ueshima et al. | 463/3 |
| 2008/0293465 A1* | 11/2008 | Chang | 463/7 |
| 2008/0311969 A1* | 12/2008 | Kay et al. | 463/7 |
| 2008/0311970 A1* | 12/2008 | Kay et al. | 463/7 |
| 2009/0075711 A1* | 3/2009 | Brosius et al. | 463/7 |
| 2009/0082078 A1* | 3/2009 | Schmidt et al. | 463/7 |
| 2009/0098979 A1* | 4/2009 | Coshott | 482/4 |
| 2009/0104956 A1* | 4/2009 | Kay et al. | 463/7 |
| 2009/0117958 A1* | 5/2009 | Ueshima et al. | 463/8 |
| 2009/0231269 A1* | 9/2009 | Ueshima et al. | 345/156 |
| 2009/0258686 A1* | 10/2009 | McCauley et al. | 463/7 |
| 2009/0258700 A1* | 10/2009 | Bright et al. | 463/31 |
| 2009/0258702 A1* | 10/2009 | Flores et al. | 463/35 |
| 2009/0268949 A1* | 10/2009 | Ueshima et al. | 382/107 |

FOREIGN PATENT DOCUMENTS

| | | |
|---|---|---|
| JP | 2001-104635 | 4/2001 |
| JP | 2001-129244 | 5/2001 |
| JP | 2001-175254 | 6/2001 |
| JP | 2002-066129 A | 3/2002 |
| JP | 2002-239233 A | 8/2002 |

OTHER PUBLICATIONS

"General MIDI Level 1 Sound Set", MIDI Manufacturers Association, copyright 1995-2008, accessed Jun. 12, 2008, <http://www.midi.org/techspecs/gm1sound.php>.*

Karow, Jonathan, "Review—S&S Industries", Harmony Central, accessed Jun. 12, 2008, <http://www.harmony-central.com/Drums/EDW/review-ss.html>.*

"Musical Instrument Digital Interface", Wikipedia, accessed Jun. 12, 2008, <http://en.wikipedia.org/w/index.php?title=Musical_Instrument_Digital_Interface&printable=yes>.*

Mimic Percussion Instrument and Music Playing Game Device of JP2001-175254 from esp@cenet document view (1 page).

"Music Playing Game Device, Method of Displaying Image for Guiding Play, and Readable Storage Medium Storing Play Guide Image Formation Program" of JP2001-129244 from esp@cenet document view (1 page).

English abstract of JP2002066129 published Mar. 5, 2002, , esp@cenet database, 1 page.

English abstract of JP2001070649 published Mar. 21, 2001, esp@cenet database, 2 pages.

Japanese Office Action "Notice of Reasons for Rejections" issued in Japanese Application No. 2003-329324 mailed on Feb. 19, 2008 and English translation thereof, 5 pages.

English abstract of JP2002239233 published Aug. 27, 2002, esp@cenet database, 2 pages.

Japanese Office Action "Notice of Reasons for Rejections" issued in Japanese Application No. 2003-329324 mailed on Oct. 14, 2008 and English translation thereof, 5 pages.

* cited by examiner

| COMMAND | NOTE NUMBER/ WAITING TIME | INSTRUMENT DESIGNATION | VELOCITY | Gate Time |
|---|---|---|---|---|
| Note ON | 65 | 1 | 72 | t1 |
| Wait | T1 | -- | -- | -- |
| Note ON | 66 | 1 | 72 | t2 |
| . | . | . | . | . |
| . | . | . | . | . |
| . | . | . | . | . |

Fig. 17

| COMMAND | NOTE NUMBER/ WAITING TIME | INSTRUMENT DESIGNATION |
|---|---|---|
| Note ON | 81 | 117 |
| Wait | T2 | – |
| Note ON | 76 | 117 |
| ⋮ | ⋮ | ⋮ |
| Note ON | 79 | 117 |

Fig. 18

| NOTE NUMBER | STRENGTH/POSITION |
|---|---|
| 76 | STRONG/RIGHT |
| 65 | STRONG/LEFT |
| 56 | WEAK/RIGHT |
| 45 | WEAK/LEFT |
| 77 | STRONG/RIGHT HAND OF RIGHT RESPONSE OBJECT |
| 74 | STRONG/LEFT HAND OF RIGHT RESPONSE OBJECT |
| 67 | STRONG/RIGHT HAND OF LEFT RESPONSE OBJECT |
| 64 | STRONG/LEFT HAND OF LEFT RESPONSE OBJECT |
| 57 | WEAK/RIGHT HAND OF RIGHT RESPONSE OBJECT |
| 53 | WEAK/LEFT HAND OF RIGHT RESPONSE OBJECT |
| 47 | WEAK/RIGHT HAND OF LEFT RESPONSE OBJECT |
| 43 | WEAK/LEFT HAND OF LEFT RESPONSE OBJECT |
| 72 | LONG REPETITION/RIGHT |
| 69 | SHORT REPETITION/RIGHT |
| 48 | LONG REPETITION/LEFT |
| 52 | SHORT REPETITION/LEFT |
| 71 | LONG REPETITION/LEFT & RIGHT |
| 50 | SHORT REPETITION/LEFT & RIGHT |
| 81 | START |
| 79 | END |

Fig. 19

| COMMAND | NOTE NUMBER/ WAITING TIME | INSTRUMENT DESIGNATION |
|---|---|---|
| Note ON | 41 | 117 |
| Note ON | 84 | 117 |
| Wait | T3 | — |
| ⋮ | ⋮ | ⋮ |

Fig. 20

| STRIKE SOUND INDICATING INFORMATION | WAVEFORM DATA INITIAL ADDRESS | VOLUME INFORMATION |
|---|---|---|
| ⋮ | ⋮ | ⋮ |

MUSIC GAME WITH STRIKE SOUNDS CHANGING IN QUALITY IN THE PROGRESS OF MUSIC AND ENTERTAINMENT MUSIC SYSTEM

This application claims foreign priority based on Japanese Patent application No. 2003-329324, filed Sep. 22, 2003, the contents of which is incorporated herein by reference in its entirety.

BACKGROUND OF THE INVENTION

1. Field of the Invention

The present invention relates to a music game console, a music game system and an entertainment music system with which musical tones are produced by hitting back on a screen an object appearing at intervals in rhythm of music with another object.

2. Description of the Related Art

A ball paddle game machine of the present applicant is described in JP-A-2001-104635. This will be briefly explained.

FIG. 36 is a view showing the overall configuration of the ball paddle game machine described in JP-A-2001-104635. As shown in FIG. 36, this ball paddle game machine includes a game console 501, which can be connected to a television monitor 500. This game console 501 is provided with four paddle keys 502 to 505.

FIG. 37 is a view showing an example of the game screen of the ball paddle game machine of FIG. 36. Four paddle images 602 to 605 are displayed in the game screen of the television monitor 500 corresponding to the four paddle keys 502 to 505. Also, balls 510 are displayed to move along four ball motion lanes "A" to "D" corresponding to the four paddle images 602 to 605. If the operation timing of the paddle keys 502 to 505 coincides with the motion timing of the balls 510, the player succeeds, otherwise fails.

If the balls 510 are displayed to fall in synchronization with music, the player can enjoy the game together with music. Accordingly, this ball paddle game machine can be said also as a music game machine.

However, generally speaking, users tend to have a desire for a more enjoyable game machine than existing products.

SUMMARY OF INVENTION

In view of the foregoing, it is an object of the present invention to provide a music game console and a music game system with which music can be fully enjoyed with high musical quality.

In accordance with the first aspect of the present invention, a music game console comprising:

a strike surface to be struck by a player;

at least one detection circuit that detects a striking strength and outputs strike information indicative of the striking strength; and a processor which is operative to:

acquiring sequentially musical note information items from first data containing said musical note information items arranged in a time series, and performing music automatically;

acquiring sequentially codes assigned to indication object images, each of which indicates a timing of striking to said player, from second data containing said codes which are arranged in a time series, and displaying on a display device said indication object images corresponding to said acquired codes;

acquiring sequentially codes, each of which designates a tone quality of a sound to be output in response to a trigger corresponding to said strike information, from third data containing said codes which are arranged in a time series, and generating the sound of said tone quality designated by each of said codes in response to said trigger;

indicating a reaction responsive to said strike information with a response object image; and indicating a reaction of said indication object image when the reaction of said response object image is indicated during the time that said indication object image is located within a predetermined range in relation to a predetermined reference position.

Of the above elements, "the reaction of said response object image" and "the reaction of said indication object" may be implemented as any type of change in the appearance of the response object image such as the change in the profile, the change in the color and so forth, or as any type of change in the way of displaying the image, for example, blinking, the change in the brightness, hiding or showing, or any combination thereof.

In accordance with this configuration, since the indication object image is displayed in synchronization with music, the player can output sounds in rhythm of music by striking in the timing as indicated by the indication object image. By this process, the player can join automatic music performance while enjoying the game. As a result, it is possible to provide a game machine which is funnier and does not satiate the player's interest.

In addition to this, the musical tone output in response to a strike by the player can be designated by the third data, it is possible to change the tone quality of the sound as output in a time series. Accordingly, the player can enjoy a music game, while joining changeful automatic performance, only with a single music game console. This differs substantially from conventional percussion instruments. Namely, while a conventional percussion instrument can output sounds only of predetermined tone quality (qualities) corresponding to the conventional percussion instrument, it is possible in the case of the present invention to change the tone quality of the strike sound from one to another.

In the above music game console, the display of the indication object image is determined corresponding to a desired striking criterion.

In accordance with this configuration, it is possible to give various indications to the player by changing the display of the indication object. As a result, by making use of various ways of providing indications, it is possible to provide a plurality of difficulty levels of the game and wide variations in playing the game. Furthermore, by making use of various ways of providing indications, the player can join changeful automatic performance.

In the above music game console, the striking criterion is related to at least one of the strength of striking and a number of times of repeating strikes.

In accordance with this configuration, the player can enjoy the strength of striking or repeating strikes.

In the above music game console, said code of said third data is indicative of both the tone quality and a sound volume.

In accordance with this configuration, the player can enjoy a variety of tone qualities and sound volumes.

In the above music game console, said at least one detection circuit includes a plurality of detection circuits, said music game console further comprises;

a plurality of vibration transmission plates that correspond respectively to said detection circuits;

a plurality of resilient members that correspond respectively to said vibration transmission plates; and a support structure that supports said vibration transmission plates, wherein each of said vibration transmission plates is supported by said support structure through the corresponding resilient members, wherein said support structure is fixed inside of a housing such that said vibration transmission plates are located to face a rear surface of said strike surface, wherein said detection circuits are located to face said support structure, each of said detection circuits being attached to a corresponding one of said vibration transmission plates, and wherein each of said vibration transmission plates is supported by said support structure so as not to contact adjacent ones of said vibration transmission plates.

In accordance with this configuration, it is possible to detect strikes on a plurality of batter surfaces by the player corresponding to the number of said units. Accordingly, it is possible to make the game more attractive by effectively utilizing the plurality of batter surfaces to be selectively struck by the player. As a result, while diversified musical tones can be output in response to strikes, diversified game programs can be implemented.

In accordance with this configuration, the vibration transmission plates are supported respectively on the support structure by the resilient members such that they are prevented from coming in contact with each other. Because of this, the vibration of one vibration transmission plate is prevented from being transmitted to another vibration transmission plate as much as possible. That is, it is avoided as much as possible that the strike detecting device mounted on one vibration transmission plate detects the vibration of another vibration transmission plate to output signals which must not be output. As a result, it is possible to detect which batter surface is struck by the player as accurately as possible and thereby prevent erroneous sound output and erroneous motion of a response object.

In the above music game console, said display device is a television monitor.

In accordance with this configuration, the game can be is enjoyed only by connecting the music game console to the television monitor. Furthermore, since the television monitor is widely distributed, most people can enjoy a game only by purchasing the music game console.

In the above music game console, said second data and said third data are prepared as data in conformity with a MIDI standard or prepared by processing data which is in conformity with a MIDI standard.

In accordance with this configuration, since the second data for displaying the indication object image and the third data for designating the tone quality of the strike sound are prepared on the basis of a MIDI standard, computer aided composing software capable of outputting data in MIDI format can be used for preparing the second and third data. Since such computer aided composing software capable of outputting data in MIDI format are widely distributed, it is easy to prepare the second data and the third data.

The above music game console further comprises a graphics processor operable to generate said indication object image and said response object image, wherein said graphics processor receives storage location information of image data for generating said indication object image and storage location information of image data for generating said response object image every time a video system synchronous interrupt occurs, and reads said image data stored in storage locations designated by said storage location information to generate said indication object image and said response object image.

In accordance with the second aspect of the present invention, a music game system comprising:

a television monitor; and a music game console which comprises:

a strike surface to be struck by a player;

at least one detection circuit that detects a striking strength and outputs strike information indicative of the striking strength; and a processor which is operative to:

acquiring sequentially musical note information items from first data containing said musical note information items arranged in a time series, and performing music automatically;

acquiring sequentially codes assigned to indication object images, each of which indicates a timing of striking to said player, from second data containing said codes which are arranged in a time series, and displaying on said television monitor said indication object images corresponding to said acquired codes;

acquiring sequentially codes, each of which designates a tone quality of a sound to be output in response to a trigger corresponding to said strike information, from third data containing said codes which are arranged in a time series, and generating the sound of said tone quality designated by each of said codes in response to said trigger;

indicating a reaction responsive to said strike information with a response object image; and indicating a reaction of said indication object image when the reaction of said response object image is indicated during the time that said indication object image is located within a predetermined range in relation to a predetermined reference position, wherein said television monitor operable to display said response object image and said indication object image, and wherein said television monitor and said music game console are separate each other.

In accordance with this configuration, the music game console can be manufactured without an image display unit such that it can be distributed at a low price. In addition, the game can be enjoyed only by connecting the music game console to the television monitor. Furthermore, since the television monitor is widely distributed, most people can enjoy a game only by purchasing the music game console.

In accordance with the third aspect of the present invention, a music game system comprising:

a display device; and a music game console which comprises:

a strike surface to be struck by a player;

at least one detection circuit that detects a striking strength and outputs strike information indicative of the striking strength; and a processor which is operative to:

acquiring sequentially musical note information items from first data containing said musical note information items arranged in a time series, and performing music automatically;

acquiring sequentially codes assigned to indication object images, each of which indicates a timing of striking to said player, from second data containing said codes which are arranged in a time series, and displaying on said display device said indication object images corresponding to said acquired codes;

acquiring sequentially codes, each of which designates a tone quality of a sound to be output in response to a trigger corresponding to said strike information, from third data containing said codes which are arranged in a time series, and generating the sound of said tone quality designated by each of said codes in response to said trigger;

indicating a reaction responsive to said strike information with a response object image; and indicating a reaction of said indication object image when the reaction of said response object image is indicated during the time that said indication object image is located within a predetermined range in relation to a predetermined reference position, wherein said display device operable to display said response object image and said indication object image, and wherein said display device and said music game console are provided integrally with each other.

In accordance with this configuration, the music game console can be provided as a mobile game machine.

In accordance with further aspect of the present invention, a percussion game system for playing a game with music comprising:

a strike surface that receives strikes by a player;

a sensor placed to receive the vibration of said strike surface, and operable to detect said strikes exerted on said strike surface by the player and output strike signals indicative of said strikes; and a signal processing unit connected to a memory unit operable to store audio data and image data, a speaker and a display device, and operable to display an image based on said image data and output music based on said audio data, wherein said signal processing unit coupled to said sensor and operable to output sounds of different tone qualities as a musical part accompanying the music through said speaker in response to said strike signals from said sensor.

In accordance with further aspect of the present invention, an entertainment music system for enjoying music comprising a signal processing unit connected to a memory unit operable to store music data and image data, a speaker and a display device, and operable to output music through said speaker with reference to said music data and display an image on said display device, and an input device which an user of the entertainment music system can manipulate to input manipulation signals to said signal processing unit, wherein said signal processing unit is operable to read data corresponding to the user's part from said music data and output sounds in response to said manipulation signals with reference to said data corresponding to the user's part, and said image displayed on said display device is an interactive image providing an indication of a timing of the manipulation to the user.

In the above entertainment music system, said music data is prepared as data in conformity with a MIDI standard or prepared by processing data which is in conformity with a MIDI standard.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 17 is a schematic representation of an example of the second musical score data of FIG. 15.

FIG. 18 is a view showing the relation between the note numbers used in the second musical score data of FIG. 17 and the indication objects.

FIG. 19 is a schematic representation of an example of the third musical score data of FIG. 15.

FIG. 20 is a view showing an example of the strike sound setting table stored in the ROM of FIG. 6.

DESCRIPTION OF THE PREFERRED EMBODIMENTS

In what follows, an embodiment of the present invention will be explained in conjunction with the accompanying drawings. Meanwhile, like references indicate the same or functionally similar elements throughout the respective drawings, and therefore redundant explanation is not repeated.

Figure 1:
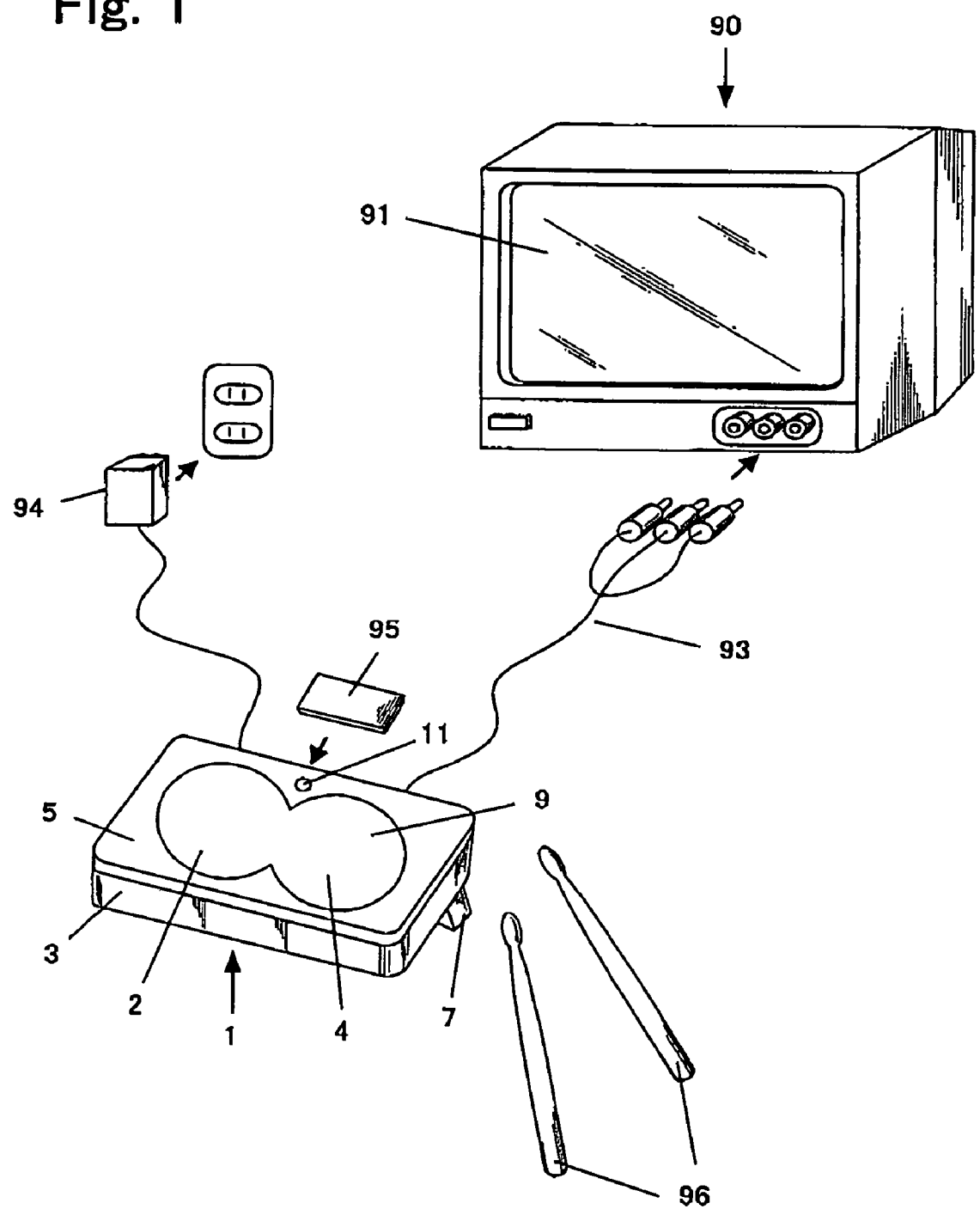
FIG. 1 is a view showing the overall configuration of a stick drum game system as the music game system in accordance with the embodiment of the present invention.

FIG. 1 is a view showing the overall configuration of a stick drum game system as the music game system in accordance with the embodiment of the present invention. As shown in FIG. 1, this music game system comprises a music game console 1, a pair of sticks 96 and a television monitor 90.

The music game console 1 includes a housing which is formed by housing member 3 and 5. Then, a strike surface 9 is exposed from an opening of the housing member 5. In addition, the housing member 5 is provided with a power switch 11. Furthermore, the housing member 3 is provided with a stand 7. With this stand 7, the strike surface 9 is to incline at a predetermined angle from the horizontal surface. Incidentally, the stand 7 can be detached such that the strike surface 9 levels out. The player can enjoy a game by striking the strike surface 9 with the sticks 96. The strike surface 9 is provided with a left batter surface 2 and a right batter surface 4.

Optionally, a memory cartridge 95 containing a ROM (read only memory) can be inserted into the music game console 1. Accordingly, the game can be enjoyed together with a variety of music by changing the memory cartridge 95.

The music game console 1 and the television monitor 90 are connected to each other by an AV cable 93. Furthermore, a DC power voltage is supplied to the music game console 1 through an AC adapter 94. Alternatively, a battery cell (not shown in the figure) can be used to supply the DC power voltage in place of the AC adaptor 94. The television monitor 90 is provided with a screen 91 at the front side.

Figure 2:
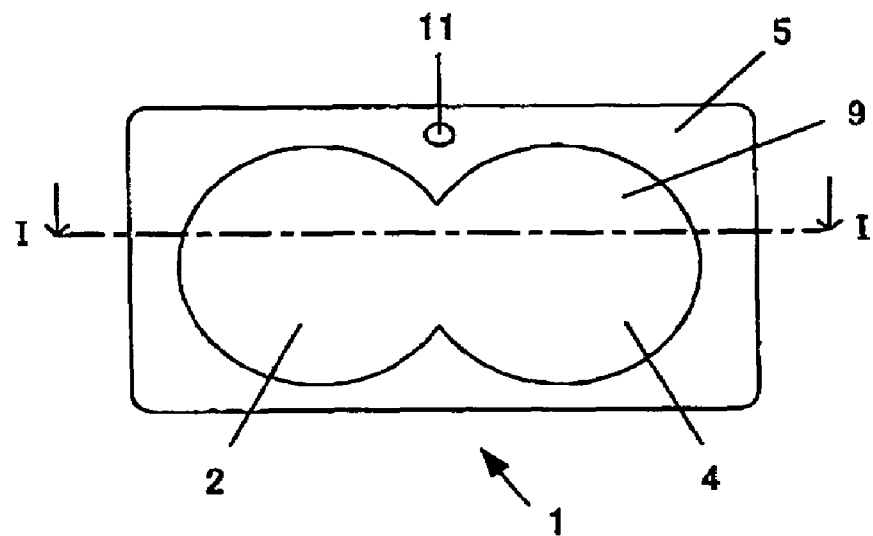
FIG. 2 is a plan view of the music game console of FIG. 1.
Figure 3:
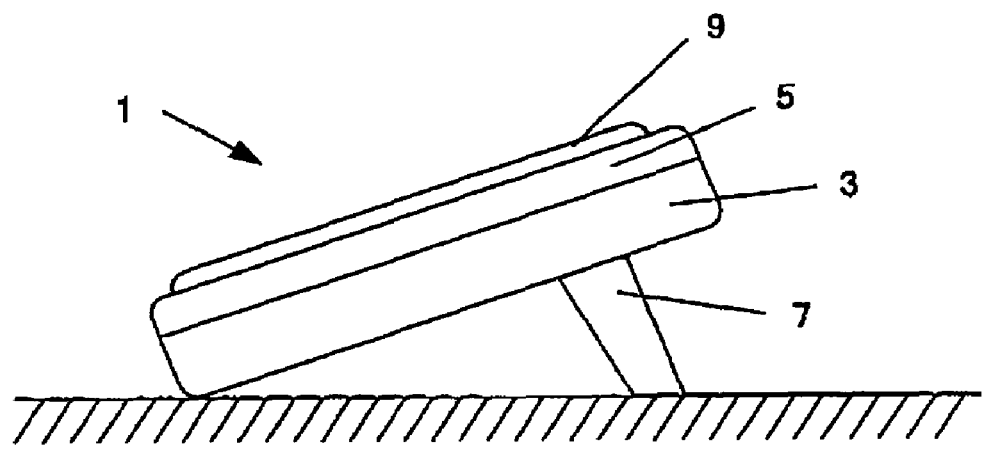
FIG. 3 is a side view showing the music game console of FIG. 1.

FIG. 2 is a plan view of the music game console 1 of FIG. 1. FIG. 3 is a side view showing the music game console 1 of FIG. 1. As shown in FIG. 3, the strike surface 9 inclines with the stand 7 at a predetermined angle from the horizontal surface.

Figure 4:
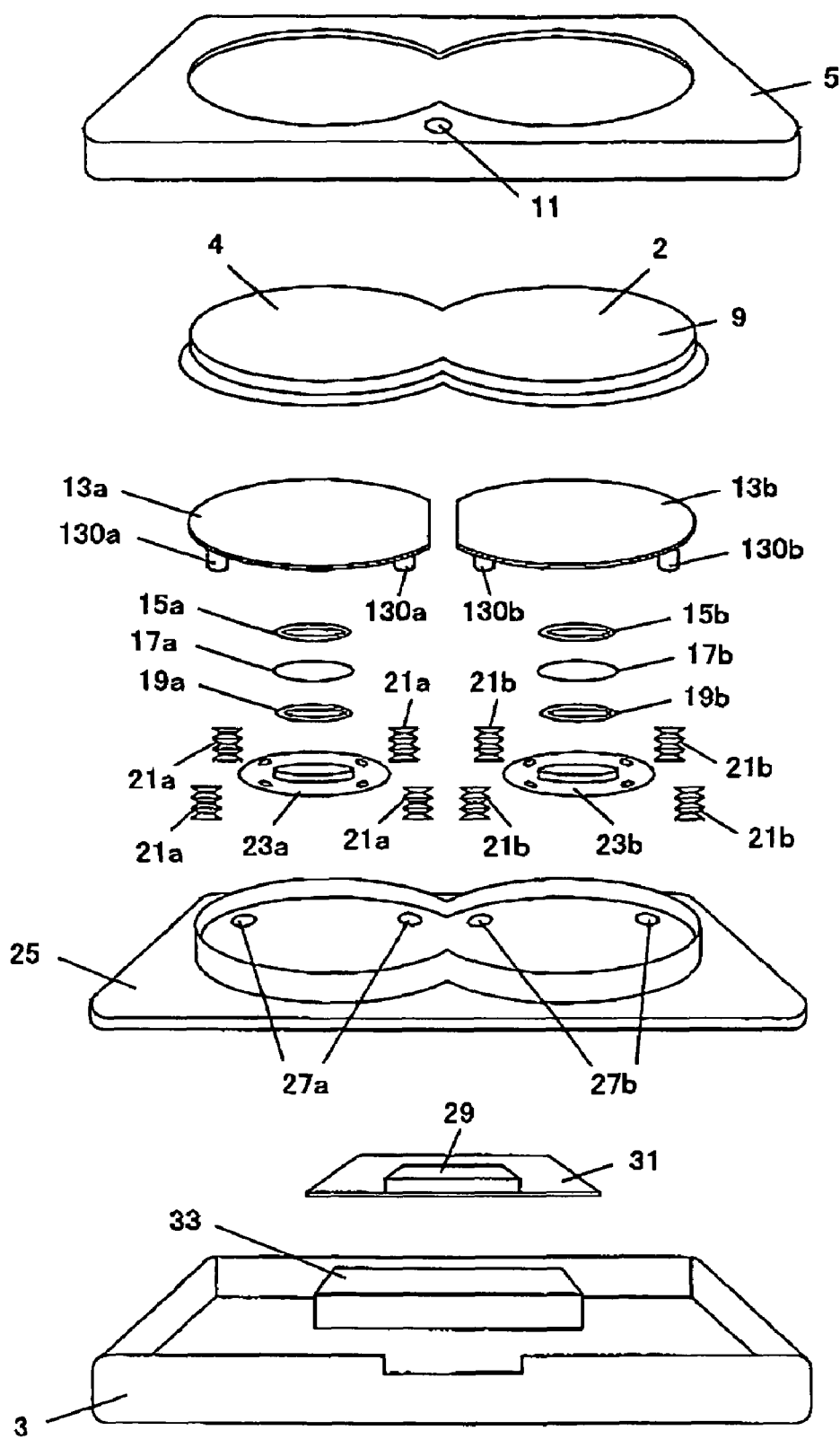
FIG. 4 is an exploded assembly diagram showing the music game console of FIG. 1.
Figure 5:
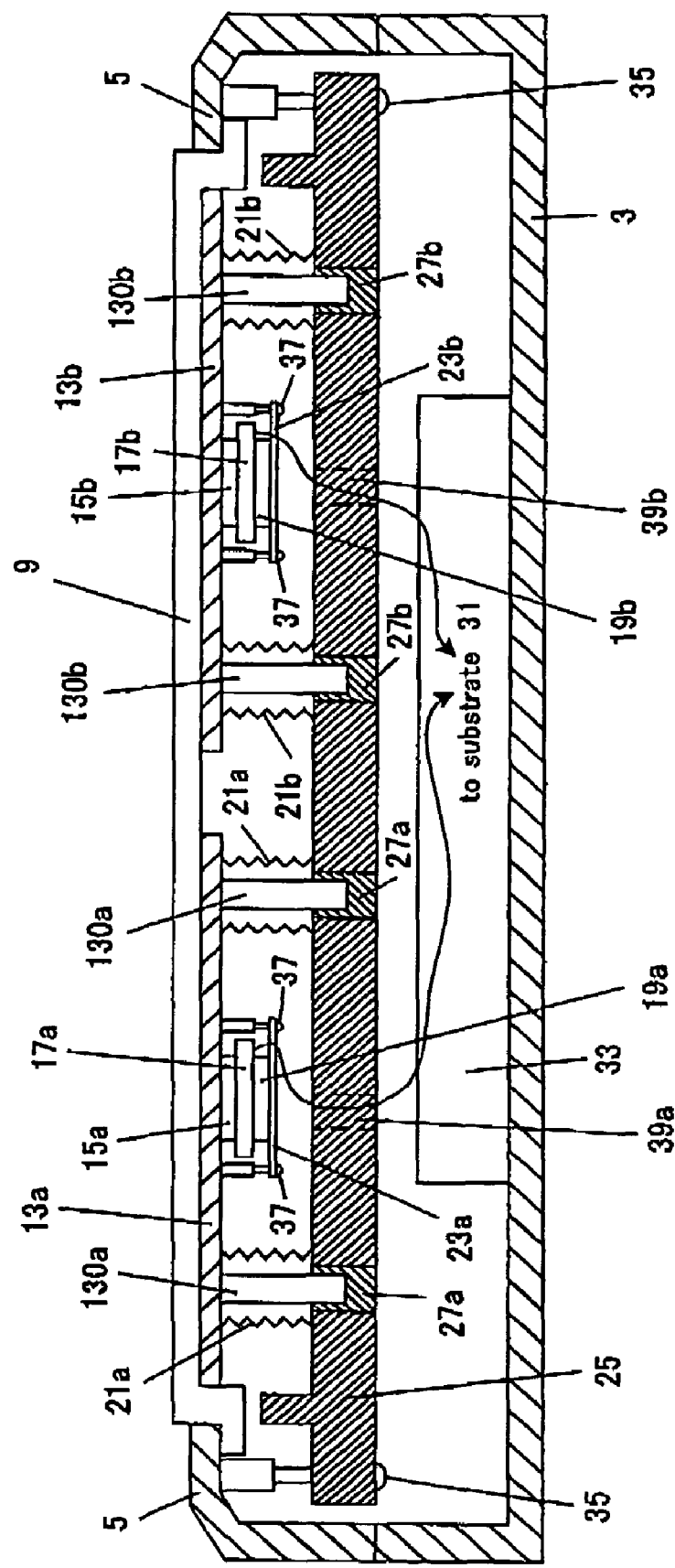
FIG. 5 is a cross sectional view along I-I line of FIG. 2.

FIG. 4 is an exploded assembly diagram showing the music game console 1 of FIG. 1. FIG. 5 is a cross sectional view along I-I line of FIG. 2. As shown in FIG. 4 and FIG. 5, the music game console 1 is constructed as follows. In this example, the illustration of the stand 7 is omitted.

In the bottom surface inside the housing member 3, there are disposed a battery box 33 and a substrate 31. A high speed processor to be described below, a ROM and other necessary components are mounted on this substrate 31 together with necessary circuitry, while a connector 29 is electrically connected thereto for the memory cartridge 95 to be inserted.

While a transmission plate 13a is provided just below the right batter surface 4, a piezoelectric elements 17a is fixed to the lower surface of the vibration transmission plate 13a by a fixing plate 23a and screws 37. In this case, the piezoelectric element 17a is disposed between two buffer members 15a and 19a which serve to prevent the vibration of the vibration transmission plate 13a from being transmitted directly to the piezoelectric element 17a. Similarly, while a vibration transmission plate 13b is provided just below the left batter surface 2, a piezoelectric element 17b is fixed to the lower surface of the vibration transmission plate 13b in a symmetrical fashion.

The vibration transmission plate 13a with the piezoelectric element 17a fixed thereto is supported by a support plate 25 through four cylindrical resilient members 21a. In this case, the vibration transmission plate 13a is provided at its lower surface with four guides 130a (only two are as illustrated in the figure) which are inserted into through four holes 27a (only two are as illustrated in the figure) opened in the support plate 25 with the intervening resilient member 21a. Then, the diameter of the through holes 27a is determined in order that the guides 130a do not come in contact with the inner surfaces of the through hole 27a. On the other hand, the vibration transmission plate 13a and the vibration transmission plate 13b are separated with a predetermined interval therebetween.

In this configuration, the vibration of the vibration transmission plate 13a is prevented from being transmitted to the piezoelectric element 17b fixed to the vibration transmission plate 13b as much as possible. Also in the right hand side as configured in the same fashion as in the left hand side, the vibration of the vibration transmission plate 13b is prevented from being transmitted to the piezoelectric element 17a fixed to the vibration transmission plate 13a as much as possible. Meanwhile, the cylindrical resilient members 21a and 21b are made of a rubber. Alternatively, for example, the resilient members 21a and 21b may be made of a spring.

The support plate 25 is fixed to the housing member 5 by screws 35. The, the vibration transmission plates 13a and 13b are covered with the strike surface 9.

The signal lines from the piezoelectric element 17a is connected to a right strike detection circuit (to be described below) of the substrate 31 through the through hole 39a opened in the support plate 25. Similarly, the signal lines from the piezoelectric element 17b is connected to a left strike detection circuit (to be described below) of the substrate 31.

Figure 6:
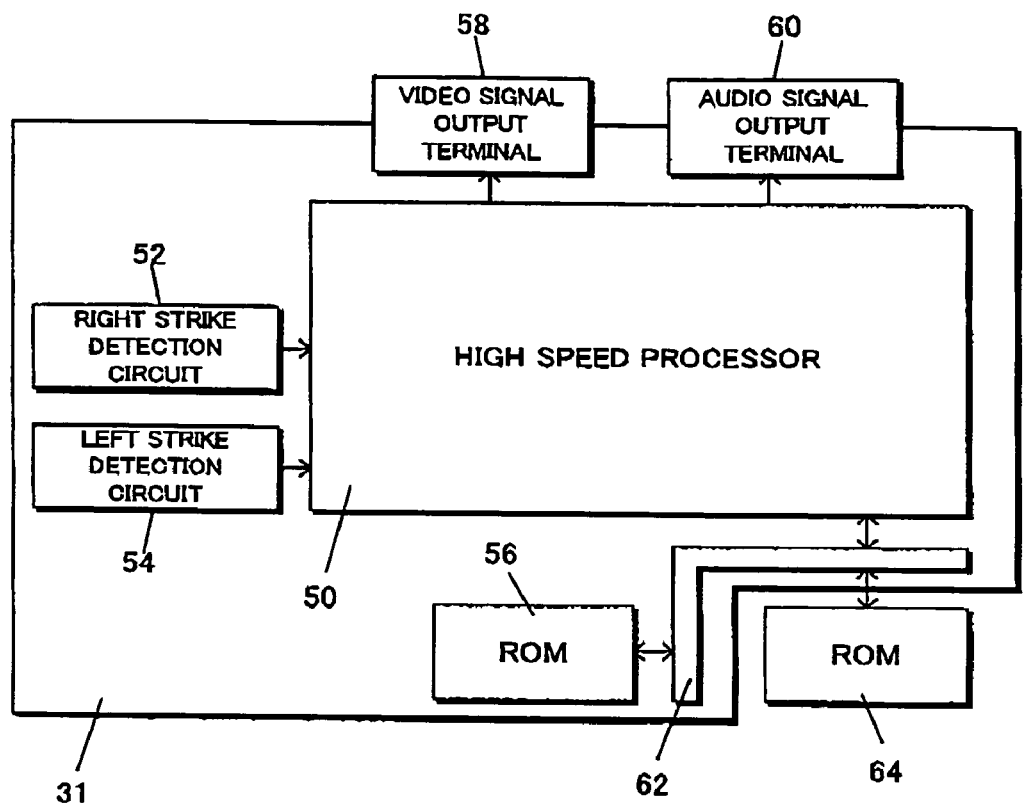
FIG. 6 is a view showing the electrical construction of the music game console as illustrated in FIG. 1.

FIG. 6 is a view showing the electrical construction of the music game console 1 as illustrated in FIG. 1. As shown in FIG. 6, a high speed processor 50, a ROM 56, the right strike detection circuit 52, the left strike detecting circuit 54, a bus 62, a video signal output terminal 58 and an audio signal output terminal 60 are mounted or implemented on the substrate 31 of this the music game console 1.

The right strike detection circuit 52 includes the piezoelectric element 17a from which signals are given to an A/D converter (to be described below) of the high speed processor 50. The left strike detection circuit 54 includes the piezoelectric element 17b from which signals are given to the A/D converter (to be described below) of the high speed processor 50. This A/D converter serves to convert the signals of the piezoelectric element 17a and the piezoelectric element 17b into digital signals, for example, 8 bit signals indicative of 256 signal levels. Then, the high speed processor 50 performs necessary processes of these signals.

Also, the high speed processor 50 can access the ROM 56 through the bus 62 and run a game program stored in the ROM 56. Furthermore, the high speed processor 50 reads image data and music data stored in the ROM 56 and performs a necessary process of the data to generate video signals and audio signals. These video signals and audio signals as generated in this way are transmitted to the video signal output terminal 58 and the audio signal output terminal 60 respectively and output to the television monitor 90 through the AV cable 93.

Furthermore, the high speed processor 50 can access an external ROM 64 through the bus 62. Accordingly, it is possible to run a game program stored in the external ROM 64 and read image data and music data therefrom. This ROM 64 is included in the memory cartridge 95 of FIG. 1 and is connected to the bus 62 through the connector 29 of FIG. 4.

Figure 7:
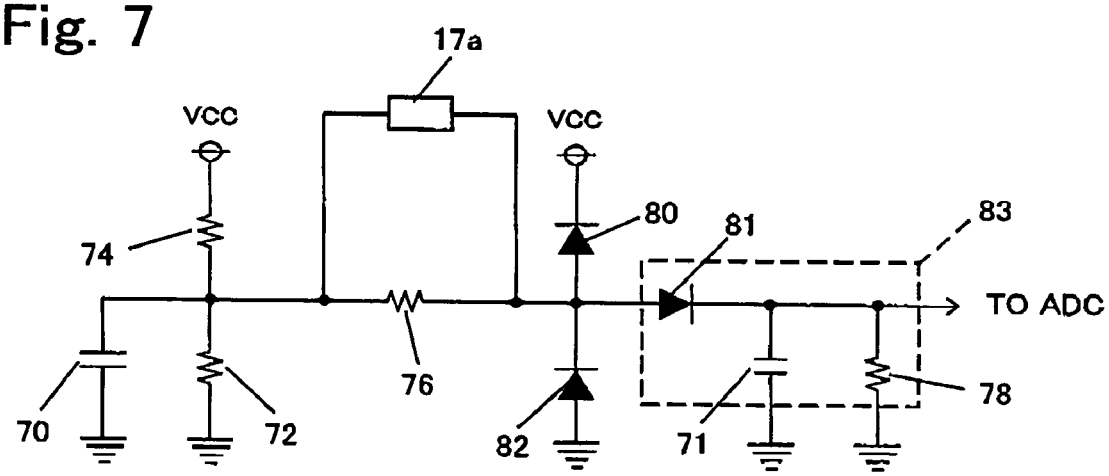
FIG. 7 is a circuit diagram of the right strike detecting circuit of FIG. 6.

FIG. 7 is a circuit diagram of the right strike detecting circuit 52 of FIG. 6. As shown in FIG. 7, this right strike detecting circuit 52 includes the piezoelectric device 17*a*, resistance elements 72, 74, 76 and 78, diodes 80, 81 and 82 and capacitors 70 and 71.

One terminal of the resistance element 76 is connected to one terminal of the piezoelectric element 17*a*, respective one terminals of resistance elements 74 and 72 and one terminal of the capacitor 70. The other terminal of the resistance element 76 is connected to the other terminal of the piezoelectric device 17*a*, the anode of the diode 81, the anode of diode 80 and the cathode of the diode 82 respectively.

The other terminal of the resistance element 74 is connected to a power supply VCC. The other terminal of the resistance element 72 is connected to a ground GND. The other terminal of the capacitor 70 is connected to the ground GND. The cathode of the diode 80 is connected to the power supply VCC. The anode of the diode 82 is connected to the ground GND. The cathode of the diode 81 is connected to one terminal of the capacitor 71 and one terminal of the resistance element 78. In addition, the cathode of the diode 81 is connected to the A/D converter (to be described below) of the high speed processor 50.

The diode 81, the capacitor 71 and the resistance element 78 constitute a peak holding circuit 83.

In this case, the piezoelectric element 17*a* generates a voltage signal in accordance with the pressure as applied, i.e., the strength of striking the vibration transmission plate 13*a* by the stick 96 through the strike surface 9. Then, the peak holding circuit 83 holds the peak value (peak voltage) of the voltage generated by the piezoelectric element 17*a* and outputs the peak value to the A/D converter (to be described below) of the high speed processor 50. As described below, the high speed processor 50 obtains the maximum value of the peak voltage output from the peak holding circuit 83 within one frame.

In the following, the voltage signal input to the A/D converter (to be described below) from the peak holding circuit 83 is referred to as a "strike signal".

Incidentally, the circuit diagram of the left strike detection circuit 54 of FIG. 6 is similar to the circuit diagram of the right strike detection circuit 52 of FIG. 7, and therefore such a redundant drawing is not provided.

Next, the game process will be explained with reference to several drawings showing examples of the game screen.

Figure 8:
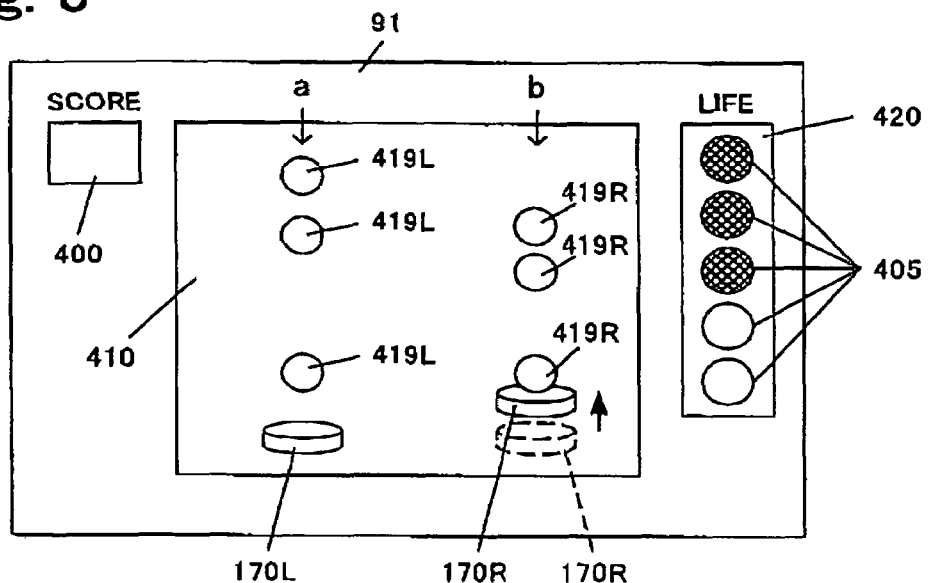
FIG. 8 is a view showing an example of the game screen in accordance with the embodiment of the present invention.

FIG. 8 is a view showing an example of the game screen in accordance with the embodiment of the present invention. As shown in FIG. 8, the game screen is displayed on the screen 91 of the television monitor 90. Also, after starting the game, music is output from a speaker (not shown) of the television monitor 90.

This game screen includes a score display area 400, a main window 410 and a life display area 420. In the lower left area of the main window 410, there is displayed a response object 170L corresponding to the left batter surface 2 (the piezoelectric device 17*b*) of the strike surface 9. In the lower right area of the main window 410, there is displayed a response object 170R corresponding to the right batter surface 4 (the piezoelectric device 17*a*) of the strike surface 9.

Indication objects 419L are displayed along the motion lane "a" in the left side of the main window 410. The indication objects 419L appear from the upper end of the left motion lane "a" and move downward with a predetermined acceleration along the left motion lane "a". Similarly, indication objects 419R appear from the upper end of the right motion lane "b" and move downward with a predetermined acceleration along the motion lane "b". Here, the initial velocity and the acceleration of the indication objects 419L are equal to those of the indication object 419R.

When the player strikes the left batter surface 2 of the strike surface 9 by the stick 96 with a strength no weaker than a predetermined level, the response object 170L responds to the strike, moves upwards in the screen and then returns to its base position. In the same way, when the player strikes the right batter surface 4 of the strike surface 9 by the stick 96 with a strength no weaker than the predetermined level, the response object 170R responds to the strike, moves upwards in the screen and then returns to its base position.

Thus, if the player strikes the left batter surface 2 of the strike surface 9 in an appropriate timing by the stick 96 with a strength no weaker than the predetermined level, he can hit back the indication object 419L by the response object 170L along the left motion lane "a" in the upward direction. In the same way, if the player strikes the right batter surface 4 of the strike surface 9 in an appropriate timing by the stick 96 with a strength no weaker than the predetermined level, he can hit back the indication object 419R by the response object 170R along the right motion lane "b" in the upward direction. This point will be explained in detail.

Figure 9:
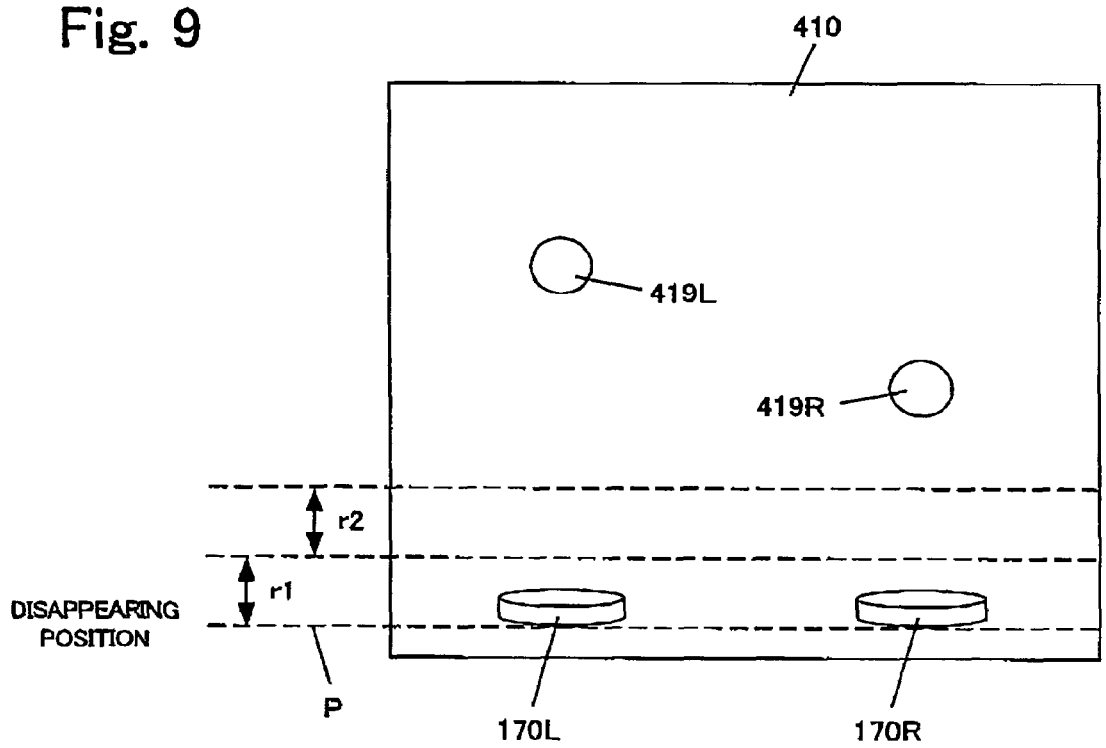
FIG. 9 is a view for explaining the hit back operation of indication objects by the response objects of FIG. 8.

FIG. 9 is a view for explaining the hit back operation of the indication objects 419L and 419R by the response objects 170L and 170R of FIG. 8. As shown in FIG. 9, if the player strikes the left batter surface 2 of the strike surface 9 by the stick 96 with a strength no weaker than a predetermined level when the indication object 419L enters a best hit range r1, he can hit back the indication object 419L by the response object 170L in response thereto. If the player successfully hits back in the best hit range r1, the indication object 419L moves in the upward direction at twice the velocity just before the hit and disappears at the upper edge of the main window 410.

In the same way, if the player strikes the left batter surface 2 of the strike surface 9 by the stick 96 with a strength no weaker than a predetermined level when the indication object 419L enters a hit range r2, he can hit back the indication object 419L by the response object 170L in response thereto. If the player can hit back in the hit range r2, the indication object 419L moves in the upward direction at the same velocity just before the hit, and then may disappear at the upper edge of the main window 410 or may move down again before reaching the upper edge depending upon the velocity. Meanwhile, it is possible to repeatedly hit back the indication object 419L moving down again by the response object 170L.

On the other hand, if the player strikes the left batter surface 2 of the strike surface 9 with a strength no weaker than the predetermined level when the indication object 419L is located outside of the best hit range r1 and the hit range r2 to drive the response object 170L, he cannot hit back the indication object 419L.

If the player fails to strikes the left batter surface 2 of the strike surface 9 with a strength no weaker than the predetermined level when the indication object 419L is located within the best hit range r1 or the hit range r2, the indication object 419L reaches the disappearing position P and then disappears. In this case, one of the lives 405 displayed in the life display area 420 of FIG. 8 is lost (turned off). When all the lives 405 are turned off, the game is over.

Incidentally, the hit back operation of the indication object 419R by the response object 170R is same as the hit back operation of the indication object 419L by the response object 170L, and therefore the redundant description is dispensed with.

As has been discussed above, unless the player strikes the strike surface 9 by the stick 96 with a strength no weaker than the predetermined level, the response objects 170L and 170R do not respond. On the other hand, the strength of striking is judged. This point will be explained in detail.

Figure 10:
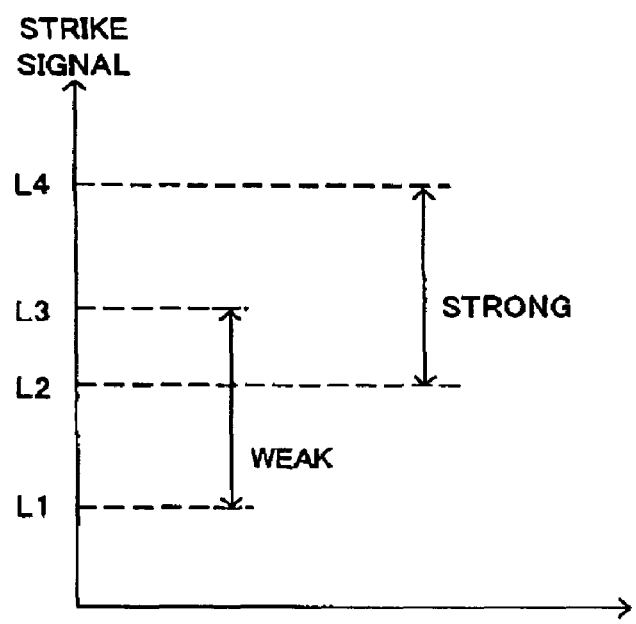
FIG. 10 is a view for explaining the strength judgment of striking the strike surface by the stick.

FIG. 10 is a view for explaining the strength judgment of striking the strike surface 9 by the stick 96. As shown in FIG. 10, if the level of the strike signal, as output when the player strikes the left batter surface 2 of the strike surface 9, exceeds a level L1, it is determined that the left batter is surface 2 is struck so that the response object 419L responds thereto. In this case, if the level of the strike signal falls within the range between the level L1 and a level L3 (referred to herein as a "weak strike range"), the strike is judged as a weak strike. Also, if the level of the strike signal falls within the range of a level L2 to a level L4 (referred to herein as a "strong strike range"), the strike is judged as a strong strike. As described above, the player can drive the response object 170L only by striking the strike surface 9 in order to generate a strike signal exceeding the level L1.

Meanwhile, if the level of the strike signal generated by striking the left batter surface 2 of the strike surface 9 exceeds the level L1, the high speed processor 50 generates and outputs a striking sound signal to the audio signal output terminal 60. Accordingly, in this case, a strike sound is output from the speaker of the television monitor 90 (not shown in the figure). In this case, the strike sound is a percussion sound.

In the following, the level L1 is sometimes referred to as an input acceptable threshold L1. Meanwhile, the above description about the strength judgment of striking the right batter surface 4 of the strike surface 9 and the sounds output in response thereto are the same as about the strength judgment of striking the left batter surface 2 of the strike surface 9 and the sounds output in response thereto, and therefore the redundant description is dispensed with.

As illustrated in FIG. 10, there is an area where the strong strike range and the weak strike range overlaps. This is because there is the possibility that the player may feel difficulty and less funny to play if the strong strike range and the weak strike range are exactly separated to make the judgment of the strength too strict.

Returning to FIG. 8, the explanation will be continued. As has been discussed above, the indication object 419L moves downward along the left motion lane "a" with a predetermined acceleration. In this case, the respective intervals between the indication objects 419L are set in agreement with the rhythm of music. Accordingly, if the player hits back the indication object 419L in the best hit range r1, a strike is sound is output in synchronization with the rhythm of music. If the player hits back the indication object 419L in the hit range r2, the timing of the strike sounds is somewhat displaced from the rhythm of music. Needless to say, the similar explanation of the indication object 419L is applicable to the indication object 419R.

Accordingly, it is possible for the player to make the music more sonorous and deeper with accompanying strike sounds in synchronization with the rhythm of music by striking the indication objects 419L and 419R in the best hit range r1.

Next, several drawings are referred to for explaining the indication given to the player by means of the indication objects 419L and 419R.

Figure 11:
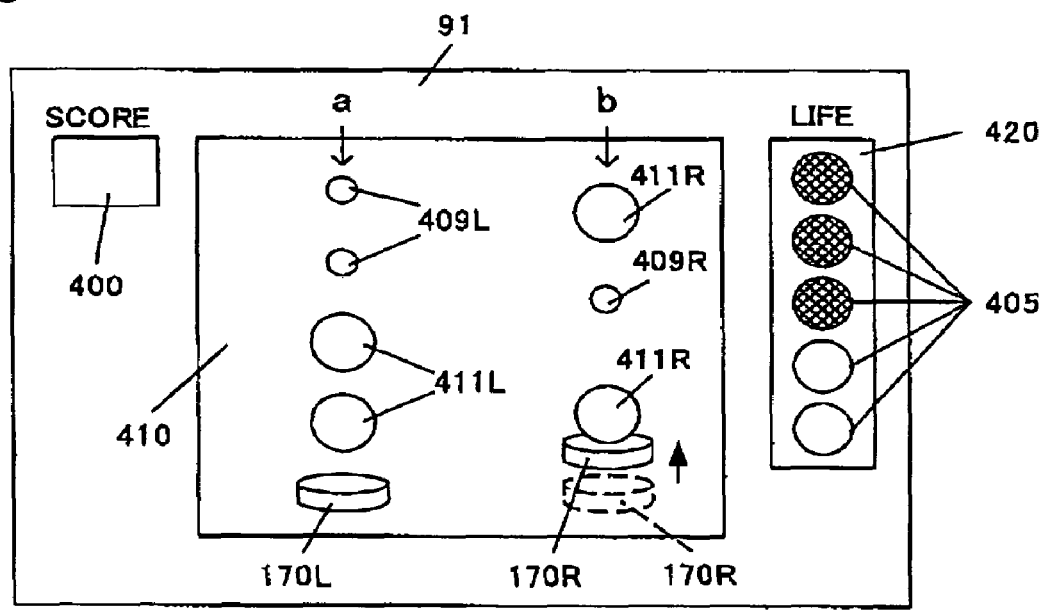
FIG. 11 is a view showing another example of the game screen in accordance with the embodiment of the present invention.

FIG. 11 is a view showing another example of the game screen in accordance with the embodiment of the present invention. As shown in FIG. 11, the indication objects 409L which are smaller in size are used to indicate that the player has to weakly strike the left batter surface 2 of the strike surface 9. On the other hand, the indication objects 411L which are larger in size are used to indicate that the player has to strongly strike the left batter surface 2 of the strike surface 9. In a similar fashion, the indication object 409R and the indication object 411R are used to indicate respectively that the player has to weakly and strongly strike the right batter surface 4 of the strike surface 9.

If the player strikes the strike surface 9 in the best hit range r1 and with an appropriate strength as indicated, he can get many points. However, even if he strikes the strike surface 9 in the best hit range r1, he can get a few points unless the strength of striking is not as indicated. If the player strikes the strike surface 9 in the hit range r2, he cannot get many points irrespective of the strength of striking.

Incidentally, relating to the timing judgment of hitting and the strength judgment of striking, the explanation of FIG. 9 and FIG. 10 is applicable even to this case.

Figure 12:
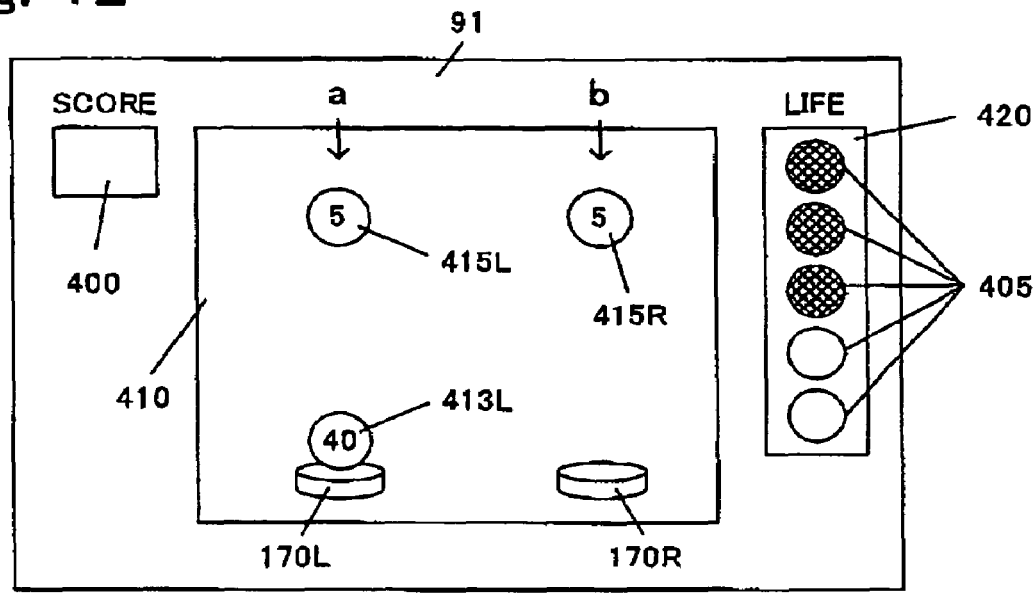
FIG. 12 is a view showing a further example of the game screen in accordance with the embodiment of the present invention.

FIG. 12 is a view showing a further example of the game screen in accordance with the embodiment of the present invention. As shown in FIG. 12, the player may be indicated to repeatedly strike the left batter surface 2 of the strike surface 9 by displaying the number of consecutive strikes in the indication object 413L. Then, when the indication object 413L reaches the response object 170L, the indication object 413L stays on the response object 170L for a predetermined time period. Similarly, the player may be indicated to repeatedly strike the right batter surface 4 of the strike surface 9 by displaying the number of consecutive strikes in the indication object 413R (not shown in the figure). Then, when the indication object 413R reaches the response object 170R, the indication object 413R stays on the response object 170R for a predetermined time period.

Furthermore, the player may be indicated to alternately and successively strike the left batter surface 2 and the right batter surface 4 of the strike surface 9 by displaying the indication object 415L and the indication object 415R on the left motion lane "a" and the right motion lane "b" at the same time together with the numbers of consecutive strikes respectively therein. Then, when the indication object 415L and the indication object 415R reach the response object 170L and the response object 170R, the indication object 415L and the indication object 415R stay respectively on the response object 170L and the response object 170R for a predetermined time period.

The player must perform the number of consecutive strikes as indicated within the predetermined time period (i.e., during the time that the indication object 413L, 413R, 415L or 415R stays). Points are given only when the number of consecutive strikes as indicated is performed within the predetermined time period, while no point is given if the number of consecutive strikes as indicated is not performed within the predetermined time period. Incidentally, in the case of such consecutive strikes, only the input acceptable threshold L1 of FIG. 10 is required of the strength of striking.

Figure 13:
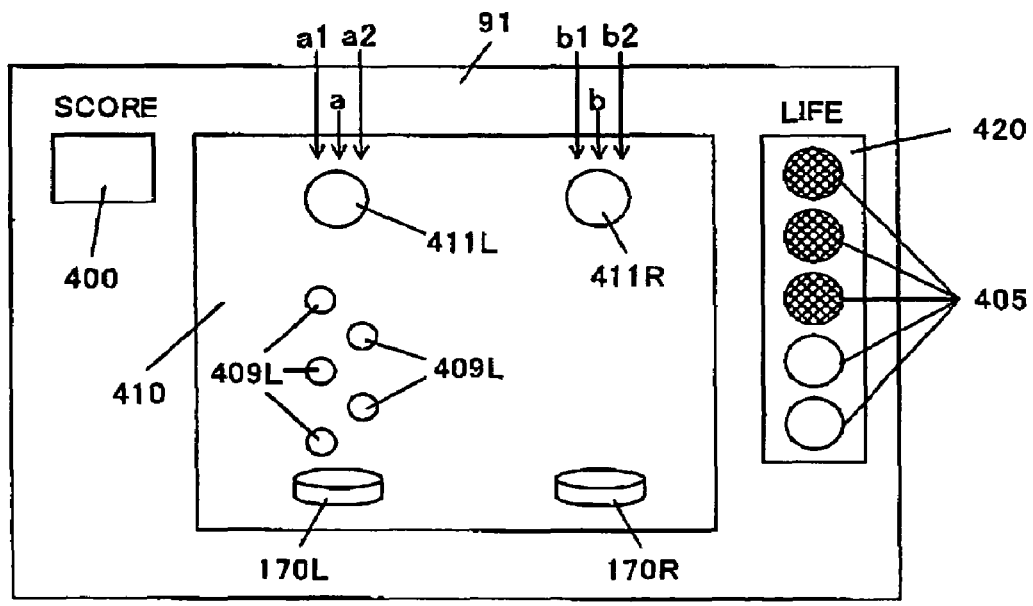
FIG. 13 is a view showing a further example of the game screen in accordance with the embodiment of the present invention.

FIG. 13 is a view showing a further example of the game screen in accordance with the embodiment of the present invention. As shown in FIG. 13, the player may be indicated to alternately use the pair of the sticks 96 to repeatedly and regularly strike the left batter surface 2 of the strike surface 9 by displaying the indication object 409L alternately on the left lane "a1" and the right lane "a2" in the right and left hand sides of the left motion lane "a". In this particular example as illustrated, the smaller indication objects 409L are displayed to indicate the player to strikes weakly. Conversely, when the player is indicated to strikes strongly, the indication objects 411L are displayed alternately in the right and left hand sides.

Similarly, the player may be indicated to alternately use the pair of the sticks 96 to repeatedly and regularly strike the right batter surface 4 of the strike surface 9 by displaying the indication object 409R alternately on the left lane "b1" and the right lane "b2" in the right and left hand sides of the left motion lane "b".

Incidentally, relating to the timing judgment of hitting and the strength judgment of striking, the explanation of FIG. 9 and FIG. 10 is applicable even to this case.

Also, the player may be indicated to strike at the same time the left batter surface 2 and the right batter surface 4 of the strike surface 9 by displaying the indication objects 411L and 411R at the same time on the left motion lane "a" and the right motion lane "b". Alternatively, for the same purpose, the indication objects 409L and 409R are displayed at the same time on the left motion lane "a" and the right motion lane "b".

Next, the operation of the game machine 1 will be explained in detail by referring to the drawing showing the electric configuration of the game machine 1 in detail.

Figure 14:
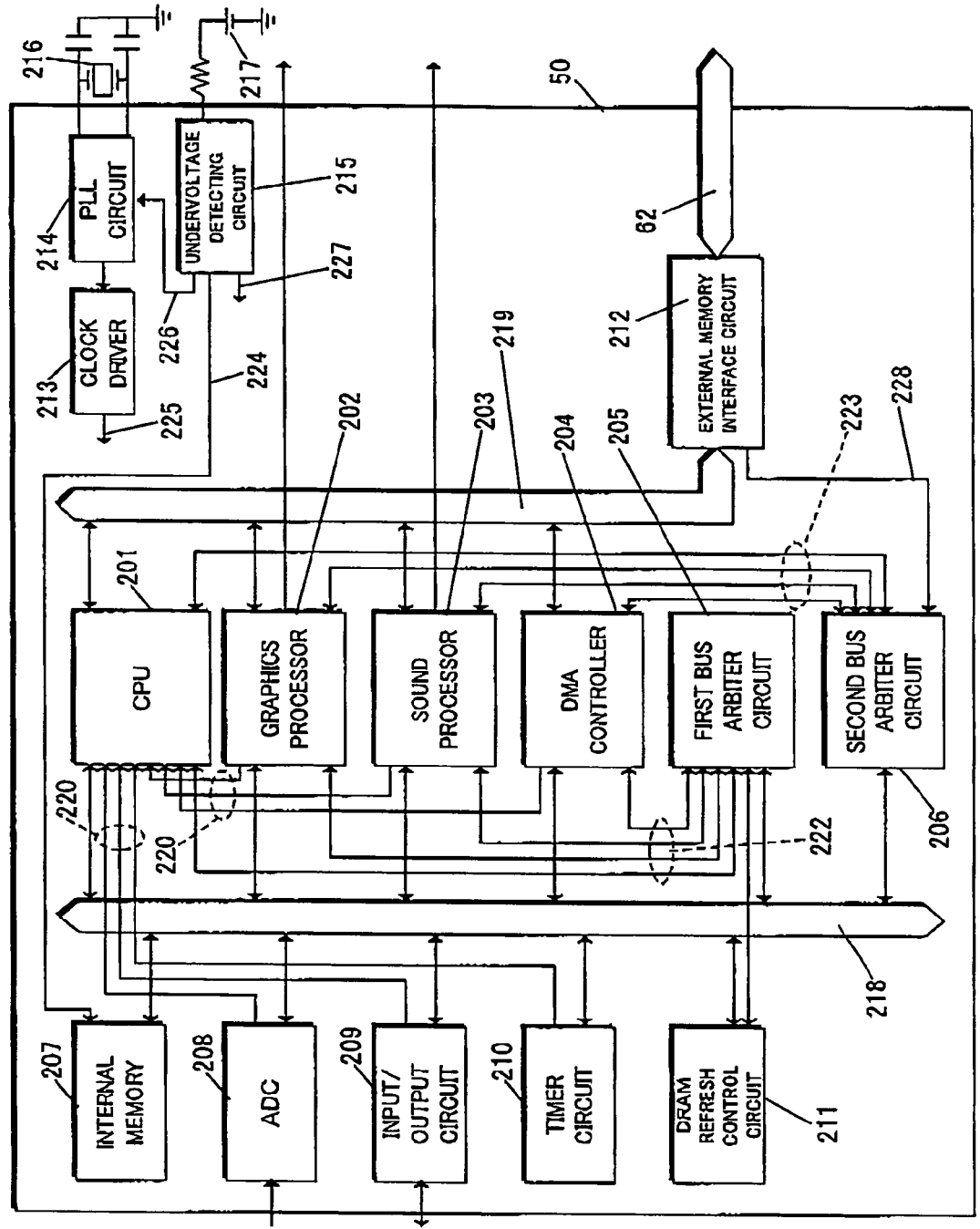
FIG. 14 is a block diagram showing the high speed processor of FIG. 6 in detail.

FIG. 14 is a block diagram showing the high speed processor 50 of FIG. 6 in detail. As shown in FIG. 14, this high speed processor 50 includes a central processing unit (CPU) 201, a graphics processor 202, a sound processor 203, a DMA (direct memory access) controller 204, a first bus arbiter circuit 205, a second bus arbiter circuit 206, an internal memory 207, an A/D converter (ADC: analog to digital converter), an input/output controller 209, a timer circuit 210, a DRAM (dynamic random access memory) refresh control circuit 211, an external memory interface circuit 212, a clock driver 213, a PLL (phase-locked loop) circuitry 214, an undervoltage detecting circuit 215, a first bus 218 and a second bus 219.

The CPU 201 performs various operations and controls the overall system in accordance with a program stored in a memory (the internal memory 207, the ROM 56 or the ROM 64). The CPU 201 is a bus master of the first bus 218 and the second bus 219, and can access the resources connected to the respective buses.

The graphics processor 202 is also a bus master of the first bus 218 and the second bus 219, and serves to generate and output video signals to the video signal output terminal 58 on the basis of the data stored in the inner memory 207, the ROM 56 or the ROM 64. The graphic processor 202 is controlled by the CPU 201 through the first bus 218. Also, the graphic processor 202 has the functionality of outputting an interrupt request signal 220 to the CPU 201.

The sound processor 203 is also a bus master of the first bus 218 and the second bus 219, and generates audio signals on the basis of the data as stored in the inner memory 207, the ROM 56 or the ROM 64, and output the audio signals through the audio signal output terminal 60. The sound processor 203 is controlled by the CPU 201 through the first bus 218. Also, the sound processor 203 has the functionality of outputting an interrupt request signal 220 to the CPU 201.

The DMA controller 204 serves to transfer data from the ROM 56 or the ROM 64 to the inner memory 207. Also, the DMA controller 204 has the functionality of outputting, to the CPU 201, an interrupt request signal 220 indicative of the completion of the data transfer. The DMA controller 204 is also a bus master of the first bus 218 and the second bus 219. The DMA controller 204 is controlled by the CPU 201 through the first bus 218.

The inner memory 207 may be implemented with appropriate one of a mask ROM, an SRAM (static random access memory) and a DRAM in accordance with the system requirements. A battery 217 is provided if an SRAM has to be powered by the battery for maintaining the data contained therein. In the case where a DRAM is used, the so called refresh cycle is periodically performed to maintain the data contained therein.

The first bus arbiter circuit 205 accepts first bus use request signals from the respective bus masters of the first bus 218, performs bus arbitration among the requests for the first bus 218, and issue a first bus use permission signal to one of the respective bus masters. Each bus master is permitted to access the first bus 218 after receiving the first bus use permission signal. In FIG. 14, the first bus use request signal and the first bus use permission signal are illustrated as first bus arbitration signals 222.

The second bus arbiter circuit 206 accepts second bus use request signals from the respective bus masters of the second bus 219, performs bus arbitration among the requests for the second bus 219, and issue a second bus use permission signal to one of the respective bus masters. Each bus master is permitted to access the second bus 219 after receiving the second bus use permission signal. In FIG. 14, the second bus use request signal and the second bus use permission signal are illustrated as second bus arbitration signals 223.

The input/output control circuit 209 serves to perform input and output operations of input/output signals to enable the communication with external input/output device(s) and/or external semiconductor device(s). The read and write operations of input/output signals are performed by the CPU 201 through the first bus 218. Also, the input/output control circuit 209 has the functionality of outputting an interrupt request signal 220 to the CPU 201.

The timer circuit 210 has the functionality of periodically outputting an interrupt request signal 220 to the CPU 201 at time intervals as preset. The setting of the timer circuit 210 such as the time interval is performed by the CPU 201 through the first bus 218.

The ADC 208 converts analog input signals into digital signals. The digital signals are read by the CPU 201 through the first bus 218. Also, the ADC 208 has the functionality of outputting an interrupt request signal 220 to the CPU 201.

The analog strike signals as output from the right strike detection circuit 52 and the left strike detection circuit 54 are input to the ADC 208 and converted into digital strike signals. Accordingly, the high speed processor 50 performs necessary processes of these digital strike signals.

The PLL circuit 214 generates a high frequency clock signal by multiplication of the sinusoidal signal as obtained from a quartz oscillator 216.

The clock driver 213 amplifies the high frequency clock signal as received from the PLL circuit 214 to a sufficient signal level to supply the respective blocks with the clock signal 225.

The low voltage detection circuit 215 monitors the power potential VCC and issues the reset signal 226 of the PLL circuit 214 and the reset signal 227 to the other circuit elements of the entire system when the power potential VCC falls below a certain voltage. Also, in the case where the inner memory 207 is implemented with an SRAM requiring the power supply from the battery 217 for maintaining data, the low voltage detection circuit 215 serves to issue a battery backup control signal 224 when the power potential VCC falls below the certain voltage.

The external memory interface circuit 212 has the functionality of connecting the second bus 219 to the external bus 62 and issuing a bus cycle completion signal 228 of the second bus 219 to control the length of the bus cycle of the second bus.

The DRAM refresh cycle control circuit 211 periodically and unconditionally gets the ownership of the first bus 218 to perform the refresh cycle of the DRAM at certain intervals.

Needless to say, the DRAM refresh cycle control circuit 211 is provided in the case where the inner memory 207 includes a DRAM.

Figures 15, 16:
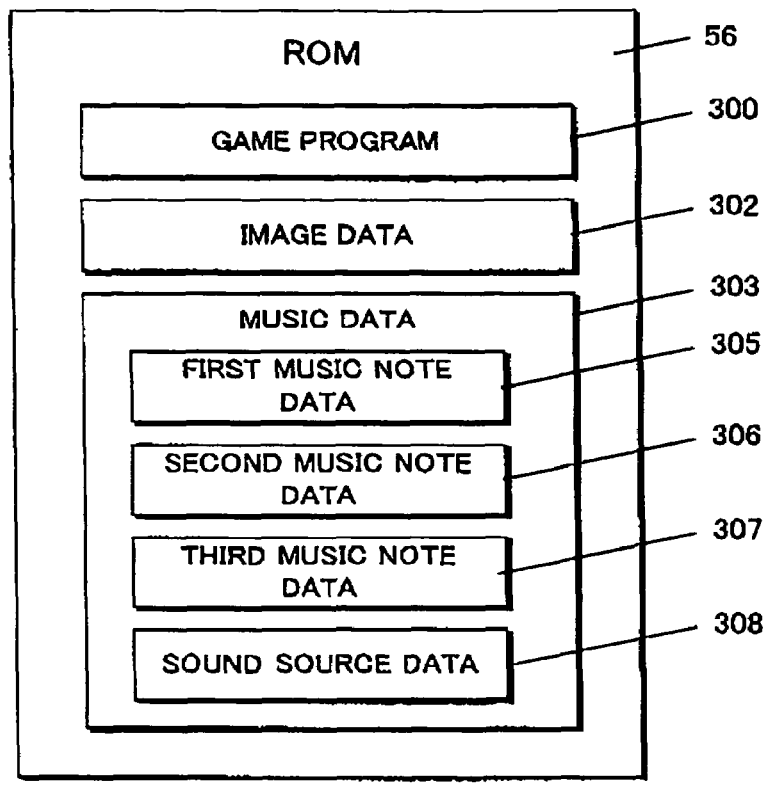
FIG. 15 is a schematic representation of a program and data stored in the ROM of FIG. 6.
FIG. 16 is a schematic representation of an example of the first musical score data of FIG. 15.

FIG. 15 is a schematic representation of a program and data stored in the ROM 56 of FIG. 6. As illustrated in FIG. 15, the ROM 56 is used to store a game program 300, image data 302, and music data 303. The music data 303 includes first musical score data 305, second musical score data 306, third musical score data 307 and sound source data 308.

Alternatively, the program and the data stored in the ROM 56 may stored in the ROM 64 of the memory cartridge 95 which is inserted into the connector 29 to make use of the program and the data.

Of the music data 303, the first musical score data 305 is time-series data containing melody control information entries arranged in a time series.

FIG. 16 is a schematic representation of an example of the first musical score data 305 of FIG. 15. As illustrated in FIG. 16, the melody control information contains commands, note number/waiting time information, instrument designation information, velocity information, and gate time information.

In the figure, "Note On" is a command to output a sound, and "Wait" is a command to set a waiting time. The waiting time is the time period to elapse prior to reading the next command after reading the current command (the time period between one musical note and the next musical note). The note number information designates a pitch (the frequency of sound vibration). The waiting time information designates a waiting time. The instrument designation information designates a musical instrument whose tone quality is to be used. The velocity information designates a magnitude of sounds, i.e., a sound volume. The gate time information designates a period for which the output of a sound is continued.

Of the music data 303, the second musical score data 306 is time-series data containing indication object control information items arranged in a time series. Then, the second musical score data 306 is used to display the indication objects 409L to 419R in the main window 410. In other words, while the first musical score data 305 is musical score data to play music, the second musical score data 306 is musical score data to have the indication objects 409L to 419R appear at correct intervals in synchronization with the music.

FIG. 17 is a schematic representation of an example of the second musical score data 306 of FIG. 15. As shown in FIG. 17, the indication object control information contains commands, note number/waiting time information, and instrument designation information.

In the second musical score data 306, the instrument designation information designates the number corresponding to the instrument relating to which the indication objects 409L to 419R is to be displayed rather than the instrument number (tone quality) corresponding to the instrument of which a sound is to be output. It is indicated by the instrument designation information that the second musical score data 306 is not musical score data for outputting music sounds but musical score data for letting the indication objects 409L to 419R be displayed.

Accordingly, "Note On" in this case is not a command to output a sound but a command to let the indication objects 409L to 419R be displayed. Also, the note number is not the information which designates a pitch (the frequency of sound vibration) but the information indicating which indication object is displayed and which motion lane is used. This point will be explained in detail.

FIG. 18 is a view showing the relation between the note numbers used in the second musical score data 306 of FIG. 17 and the indication objects 409L to 419R. As shown in FIG. 18, for example, the note number "76" designates that the indication object indicative of a strong strike is displayed on the right motion lane "b" of the main window 410. Also, fox example, the note number "77" designates that the indication object indicative of a strong strike is displayed on the right lane "b2" of the right motion lane "b" of the main window 410.

Also, for example, the note number "72" designates that the indication object indicative of long repetition of strikes is displayed on the right motion lane "b" of the main window 410. Also, for example, the note number "71" designates that the indication object indicative of long repetition of strikes is displayed on both the right motion lane "b" and the left motion lane "a" of the main window 410 at the same time.

On the other hand, for example, the note number "81" is a dummy data item which is placed at the head of the second musical score data 306 (refer to FIG. 17) but not the information indicating which indication object is displayed and which motion lane is used. In this configuration, the head of the first musical score data 305 is aligned with the head of the second musical score data 306. Furthermore, for example, the note number "79" is a data item which is placed at the tail end of the second musical score data 306 to indicate the end of music (refer to FIG. 17). Meanwhile, the note number "79" is not the information indicating which indication object is displayed and which motion lane is used.

Of the music data 303, the third musical score data 307 is time-series data containing strike sound control information items arranged in a time series.

FIG. 19 is a schematic representation of an example of the third musical score data 307 of FIG. 15. As shown in FIG. 19, the strike sound control information contains commands, note number/waiting time information, and instrument designation information.

The third musical score data 307 is not the instrument (tone quality) number corresponding to the instrument of which sound is to be output. The instrument designation information comprises a number indicating that the third musical score data 307 is musical score data indicative of the strike sound to be output in response to the strike of the strike surface 9.

Accordingly, "Note On" in this case is not a command to output a sound but a command designating the strike sound to be output in response to the strike of the strike surface 9. Also, the note number is not the information which designates a pitch (the frequency of sound vibration) but the information indicating a strike sound. The strike sound indicating information will be explained in detail.

The latest strike sound indicating information item (note number) read from the third musical score data 307 is registered. Then, the initial address of the waveform data and the volume information item associated with the strike sound indicating information item as registered are read from the ROM 56 and stored in the inner memory 207. In this case, the stored strike sound setting table stored in the ROM 56 is referred to. Incidentally, this third musical score data is registered to change the quality of strike sound and/or the sound volume of strike sound such that the previous quality and/or sound volume of strike sound are read for outputting strike sounds.

FIG. 20 is a view showing an example of the strike sound setting table stored in the ROM 56 of FIG. 6. As shown in FIG. 20, the strike sound setting table is a table in which the strike sound indicating information items, the waveform data is initial addresses and the volume information items are associated with each other. The waveform data initial address and the volume information item associated with the strike sound indicating information item as registered can be acquired by referring to this strike sound setting table.

When the strike surface 9 is struck with a strength greater than the input acceptable threshold L1, the waveform data initial address and the volume information item associated with the strike sound indicating information item as registered are given to the sound processor 203. Then, the sound processor 203 reads the waveform data item stored in the location pointed to by the waveform data initial address from the ROM 56, generates audio signals corresponding to the waveform data and the volume information item and outputs the audio signals to the audio signal output terminal 60. In this configuration, the musical tone (strike sound) corresponding to the waveform data read from the ROM 56 is output through the speaker (not shown in the figure) of the television monitor 90 at the sound volume corresponding to the volume information item. Incidentally, the waveform data is contained in the sound source data 308 of FIG. 15.

Next, the main process performed by the CPU 201 of FIG. 14 will be explained.

[Game State Check] The game ends when the CPU 201 checks the state of the game and it is confirmed that the music ends or all the lives 405 are turned off.

[Strike Sound Setting] The CPU 201 reads the initial address of the waveform data associated with the strike sound indicating information item as registered and the volume information item from the ROM 56, and stores them in the data area for musical tones of the inner memory 207 (refer to FIG. 20). This point will be explained in detail.

The strike sound indicating information is separately registered for the left batter surface 2 (the piezoelectric element 17b) and the right batter surface 4 (the piezoelectric element 17a) of the strike surface 9. Thus, the CPU 201 acquires the waveform data initial addresses and the volume information items separately for the respective left batter surface 2 and the right batter surface 4 of the strike surface 9. Incidentally, the strike sound setting table of FIG. 20 may be transferred from the ROM 56 to the inner memory 207 in advance of starting the game.

[Maximum Strike Signal Detection] The CPU 201 determines a strike signal having the maximum level (referred to as the "maximum left strike signal" in the following explanation) from among the strike signals which are input from the left strike detection circuit 54 in a period in which an image corresponding to one frame is displayed. Likewise, the CPU 201 determines a strike signal having the maximum level (referred to as the "maximum right strike signal" in the following explanation) from among the strike signals which are input from the right strike detection circuit 52 in a period in which an image corresponding to one frame is displayed. Here, the term "maximum strike signal" may be used to generally represent the maximum left strike signal and the maximum right strike signal.

The CPU 201 compares the level of the maximum left strike signal with the input acceptable threshold L1 (refer to FIG. 10). If the level of the maximum left strike signal is greater than the input acceptable threshold L1, the CPU 201 judges that an effective left strike is made and turns on a strike accepting flag and a sound output flag corresponding to the left batter surface 2 (the piezoelectric element 17b). Similarly, the CPU 201 compares the level of the maximum right strike signal with the input acceptable threshold L1 (refer to FIG. 10), and judges that an effective right strike is made and turns on a strike accepting flag and a sound output flag corresponding to the right batter surface 4 (the piezoelectric element 17a) if the level of the maximum right strike signal is greater than the input acceptable threshold L1.

Also, the CPU 201 judges whether or not the level of the maximum left strike signal falls within the weak strike range (refer to FIG. 10). If the level of the maximum left strike signal falls within the weak strike range, the CPU 201 turns on a weak strike flag corresponding to the left batter surface 2. Similarly, the CPU 201 judges whether or not the level of the maximum right strike signal falls within the weak strike range (refer to FIG. 10), and turns on the weak strike flag corresponding to the right batter surface 4 if the level of the maximum right strike signal falls within the weak strike range.

Furthermore, the CPU 201 judges whether or not the level of the maximum left strike signal falls within the strong strike range (refer to FIG. 10). If the level of the maximum left strike signal falls within the strong strike range, the CPU 201 turns on a strong strike flag corresponding to the left batter surface 2. Similarly, the CPU 201 judges whether or not the level of the maximum right strike signal falls within the strong strike range (refer to FIG. 10), and turns on the strong strike flag corresponding to the right batter surface 4 if the level of the maximum right strike signal falls within the strong strike range.

[Sound Generation Process In Response To Strikes] If the level of the strike signal, as output when the player strikes the left batter surface 2 of the strike surface 9, exceeds the input acceptable threshold L1 (refer to FIG. 10), i.e., if the sound output flag corresponding to the left batter surface 2 (the piezoelectric element 17b) is turned on, the CPU 201 controls the sound processor 203 to read the waveform data initial address and the volume information item which are currently stored corresponding to the left batter surface 2 at that time point. Also, if the level of the strike signal, as output when the player strikes the right batter surface 4 of the strike surface 9, exceeds the input acceptable threshold L1 (refer to FIG. 10), i.e., if the sound output flag corresponding to the right batter surface 4 (the piezoelectric element 17a) is turned on, the CPU 201 controls the sound processor 203 to read the waveform data initial address and the volume information item which are currently stored corresponding to the right batter surface 4 at that time point.

The sound processor 203 reads the waveform data stored in the location pointed to by the waveform data initial address from the ROM 56, generates audio signals corresponding to the waveform data and the volume information item and outputs the audio signals to the audio signal output terminal 60. In this configuration, the musical tone (strike sound) corresponding to the waveform data read from the ROM 56 is output through the speaker (not shown in the figure) of the television monitor 90 at the sound volume corresponding to the volume information item. As has been discussed above, a strike sound is output in response to a strike of the left batter surface 2 and also in response to a strike of the right batter surface 4.

[Repeated Strike Judgment] When the indication object 413L or 415L (refer to FIG. 12) indicates repetition of strikes, the CPU 201 counts the number of effective left strikes. The indication objects 413L or 415L is staying on the response object 170L when the repetition of strikes are indicated. A left strike is accepted as an effective left strike if the strength of striking exceeds the input acceptable threshold L1.

Similarly, when the indication object 413R or 415R (refer to FIG. 12) indicates repetition of strikes, the CPU 201 counts the number of effective right strikes. The indication objects 413R and 415R are staying on the response object 170R when the repetition of strikes are indicated. A right strike is accepted as an effective right strike if the strength of striking exceeds the input acceptable threshold L1.

If an effective left strike is repeated for the number of times as indicated with the indication object 413L or 415L (refer to FIG. 12), the CPU 201 adds points. Similarly, if an effective right strike is repeated for the number of times as indicated with the indication object 413R or 415R (refer to FIG. 12), the CPU 201 adds points.

[Hit Judgment] When an effective left strike is performed, i.e., when the strike accepting flag corresponding to the left batter surface 2 (the piezoelectric element 17b) is turned on, the CPU 201 judges whether or not the indication object 409L or the indication object 411L is located in the best hit range r1.

If the indication object 409L indicative of a weak strike is located in the best hit range r1, the CPU 201 judges whether or not the indication object 409L is struck with an appropriate strength as indicated with reference to the weak strike flag corresponding to the left batter surface 2.

On the other hand, if the indication object 411L indicative of a strong strike is located in the best hit range r1, the CPU 201 judges whether or not the indication object 411L is struck with an appropriate strength as indicated with reference to the strong strike flag corresponding to the left batter surface 2.

As a result, the CPU 201 adds points if the effective left strike is performed when the indication object 409L is located in the best hit range r1 with an appropriate strength as indicated by the indication object 409L, or if the effective left strike is performed when the indication object 411L is located in the best hit range r1 with an appropriate strength as indicated by the indication object 411L, the CPU 201 adds points.

When an effective right strike is performed, i.e., when the strike accepting flag corresponding to the right batter surface 4 (the piezoelectric element 17a) is turned on, the CPU 201 judges whether or not the indication object 409R or the indication object 411R is located in the best hit range r1.

If the indication object 409R indicative of a weak strike is located in the best hit range r1, the CPU 201 judges whether or not the indication object 409R is struck with an appropriate strength as indicated with reference to the weak strike flag corresponding to the right batter surface 4.

On the other hand, if the indication object 411R indicative of a strong strike is located in the best hit range r1, the CPU 201 judges whether or not the indication object 411R is struck with an appropriate strength as indicated with reference to the strong strike flag corresponding to the right batter surface 4.

As a result, the CPU 201 adds points if the effective right strike is performed when the indication object 409R is located in the best hit range r1 with an appropriate strength as indicated by the indication object 409R, or if the effective right strike is performed when the indication object 411R is located in the best hit range r1 with an appropriate strength as indicated by the indication object 411R, the CPU 201 adds points.

Incidentally, while points are added even if a strike is performed in the best hit range r1 but with a strength out of the range as indicated, the number of points as added is smaller than that are added when a strike is performed in the best hit range r1 and with a strength in the range as indicated.

Also, when an effective left strike is performed, the CPU 201 judges whether or not the indication object 409L or the indication object 411L is located in the hit range r2. Similarly, when an effective right strike is performed, the CPU 201 judges whether or not the indication object 409R or the indication object 411R is located in the hit range r2. If either indication object is located in the hit range r2 as a result of the judgment, the CPU 201 adds points. In this case, however, the number of points as added is smaller than that are added when a strike is performed in the best hit range r1 and with a strength in the range as indicated.

Incidentally, if the indication object 409L or the indication object 411L is located in the best hit range r1 when an effective left strike is performed, a best hit flag corresponding to the left batter surface 2 is turned on. Similarly, if the indication object 409R or the indication object 411R is located in the best hit range r1 when an effective left strike is performed, a best hit flag corresponding to the right batter surface 4 is turned on.

Also, if the indication object 409L or the indication object 411L is located in the hit range r2 when an effective left strike is performed, a hit flag corresponding to the left batter surface 2 is turned on. Similarly, if the indication object 409R or the indication object 411R is located in the hit range r2 when an effective left strike is performed, a hit flag corresponding to the right batter surface 4 is turned on.

[indication Object Registration] The CPU 201 reads and interprets the indication object control information of FIG. 17 while incrementing the musical score data pointer for the registration of indication objects. In this case, the musical score data pointer for the registration of indication objects is a pointer pointing to the location to be accessed for reading the second musical score data 306.

Then, if the command contained in the indication object control information as read is "Note On", the CPU 201 registers the note number contained in that indication object control information. This is the process to register a new indication object.

[Strike Sound Indicating Information Registration] The CPU 201 reads and interprets the strike sound control information of FIG. 19 while incrementing the musical score data pointer for the registration of the strike sound indicating information. In this case, the musical score data pointer for the registration of the strike sound indicating information is a pointer pointing to the location to be accessed for reading the third musical score data 307.

Then, if the command contained in the strike sound control information as read is "Note On", the CPU 201 registers the note number contained in that strike sound control information. This is the process to register the strike sound indicating information.

[Indication Object Control] the CPU 201 controls displaying the indication objects 409L to 419R in the main window 410. More specific description is as follows. The control of displaying the indication object 409L is described as an example.

In the case where a new indication object 409L is registered, the CPU 201 stores, in the inner memory 207, coordinate data indicative of the location where the indication object 409L appears and the storage location information of the image data of the indication object 409L. Then, the CPU 201 gives the coordinate and image data to the graphics processor 202 during the vertical blanking period.

The graphics processor 202 reads the image data of the indication object 409L from the ROM 56 with reference to the storage location information as given, generates video signals on the basis of the image data and the coordinate data as given, and outputs the video signals to the video signal output terminal 58. By this process, a new indication object 409L appears in the main window 410.

Then, the CPU 201 calculates the coordinates of the indication object 409L, which is being displayed, on the basis of a predetermined acceleration and a predetermined initial velocity. Then, the CPU 201 gives the graphics processor 202 the storage location information of the image data of the indication object 409L and the coordinate data as calculated during the vertical blanking period.

The graphics processor 202 reads the image data of the indication object 409L from the ROM 56 with reference to the storage location information as given, generates video signals on the basis of the image data and the coordinate data as given, and outputs the video signals to the video signal output terminal 58. By this process, the indication object 409L as moved is displayed in the main window 410.

Also, if the indication object 409L is located in the best hit range r1 when the strike accepting flag corresponding to the left batter surface 2 is turned on (i.e., an effective left strike is performed), the CPU 201 performs coordinate calculation of the indication object 409L for moving the indication object 409L at twice the velocity of the indication object 409L just before the strike. In this case, the acceleration is set to zero. Then, the CPU 201 gives the graphics processor 202 the storage location information of the image data of the indication object 409L and the coordinate data as calculated during the vertical blanking period.

The graphics processor 202 reads the image data of the indication object 409L from the ROM 56 with reference to the storage location information as given, generates video signals on the basis of the image data and the coordinate data as given, and outputs the video signals to the video signal output terminal 58. By this process, the indication object 409L hit back at the twice velocity is displayed in the main window 410.

Also, if the indication object 409L is located in the hit range r2 when the strike accepting flag corresponding to the left batter surface 2 is turned on (i.e., an effective left strike is performed), the CPU 201 performs coordinate calculation of the indication object 409L for moving the indication object 409L at the velocity of the indication object 409L just before the strike as the initial velocity. In this case, the direction of acceleration is the same as the falling acceleration of the indication object 409L. Then, the CPU 201 gives the graphics processor 202 the storage location is information of the image data of the indication object 409L and the coordinate data as calculated during the vertical blanking period.

The graphics processor 202 reads the image data of the indication object 409L from the ROM 56 with reference to the storage location information as given, generates video signals on the basis of the image data and the coordinate data as given, and outputs the video signals to the video signal output terminal 58. By this process, the indication object 409L hit back at the velocity just before the strike is displayed in the main window 410. Since this acceleration has the same direction as the falling acceleration of the indication object 409L, the indication object 409L may fall again depending upon the velocity just before the strike.

When the indication object 409L reaches a disappearing position P (refer to FIG. 9), the CPU 201 sets the coordinates of the indication object 409L out of the screen 91. By this process, the indication object 409L disappears from the game screen. In addition to this, when the indication object 409L reaches the disappearing position P (refer to FIG. 9), the CPU 201 turns off one of the lives 405.

Meanwhile, the control of displaying the indication object 409L is applicable to the control of displaying the indication objects 411L to 419L and 409R to 419R in the main window 410. However, the indication objects 413L, 413R, 415L and 415R are not hit back, but staying on the response objects 170L and 170R for a predetermined period and then disappear.

[Response Object Control] When an effective left strike is performed (i.e., the strike accepting flag corresponding to the left batter surface 2 is turned on), the CPU 201 moves the response object 170L for a predetermined distance in the upward direction. In other words, when an effective left strike is performed, the CPU 201 performs coordinate calculation with a constant velocity in the upward direction.

On the other hand, when the best hit flag or the hit flag corresponding to the left batter surface 2 is turned on or when the response object 170L is moved for a predetermined distance in the upward direction, the CPU 201 performs coordinate calculation with a constant velocity in the is downward direction in order to put the response object 170L back into the base position.

Then, the CPU 201 gives the graphics processor 202 the storage location information of the image data of the response object 170L and the coordinate data as calculated during the vertical blanking period.

The graphics processor 202 reads the image data of the response object 170L from the ROM 56 with reference to the storage location information as given, generates video signals on the basis of the image data and the coordinate data as given, and outputs the video signals to the video signal output terminal 58. By this process, the response object 170L as moved is displayed in the main window 410.

When the repetition of strikes are indicated (when the indication object 413L or the indication object 415L is staying on the response object 170L), the response object 170L is staying in its base position without moving.

The control of displaying the response object 170L is applicable to the control of displaying the response object 170R, and therefore the redundant description is dispensed with.

[Playback of Melody] The playback of melody is performed by an interrupt operation. The CPU 201 reads and interprets the melody control information of FIG. 16 while incrementing the musical score data pointer for the playback of melody. In this case, the musical score data pointer for the playback of melody is a pointer pointing to the location to be accessed for reading the first musical score data 305.

Then, if the command contained in the melody control information as read is "Note On", the CPU 201 stores, in the data area for musical tones of the inner memory 207, the pitch (the frequency of sound vibration) corresponding to the note number contained in the melody control information and the initial address of the waveform data corresponding to the instrument (tone quality) designated by the instrument designation information.

Also, if the command contained in the melody control information as read is "Note On", the CPU 201 stores, in the data area for musical tones of the inner memory 207, the pitch control information of the pitch (the frequency of sound vibration) corresponding to the note number contained in the melody control information and the volume information item contained in the melody control information.

Here, the pitch control information will be explained. The pitch control information is used to perform the pitch conversion by changing the frequency of reading the waveform data. Namely, the sound processor 203 periodically reads the pitch control information at a certain period and accumulates the pitch control information. The sound processor 203 makes use of the result of accumulation as the address pointer of waveform data. Accordingly, if a large value is set as a pitch control information, the address pointer is quickly incremented by the large value to increase the frequency of the waveform data. Conversely, if a small value is set as a pitch control information, the address pointer is slowly incremented by the small value to decrease the frequency of the waveform data. In this way, the sound processor 203 performs the pitch conversion of the waveform data.

By the way, the sound processor 203 reads from the ROM 56 the waveform data, which is stored in the area pointed to by the initial address read from the data area for musical tones, while incrementing the address pointer on the basis of the pitch control information read from the data area for musical tones. Then, the sound processor 203 generates audio signals by multiplying the waveform data, as sequentially read, by the volume information item. In this way, audio signals indicative of the tone quality of the musical instrument, the pitch (the frequency of sound vibration) and the sound volume designated by the first musical score data 305 is output to the audio signal output terminal 60.

On the other hand, the CPU 201 manages the gate times contained in the melody control information as read. Accordingly, when a gate time elapses, the CPU 201 instructs the sound processor 203 to stop outputting the sound corresponding to the gate time. In response to this, the sound processor 203 terminates the sound output as instructed.

Melody is produced on the basis of the first musical score data 305 of FIG. 16, as has been discussed above, and output from the speaker (not shown in the figure) of the television monitor 90.

Next, an example of the process flow of the game machine 1 will be explained with reference to several flow charts. In this example, the indication objects 419L and 419R of FIG. 8 are not explained.

Figure 21:
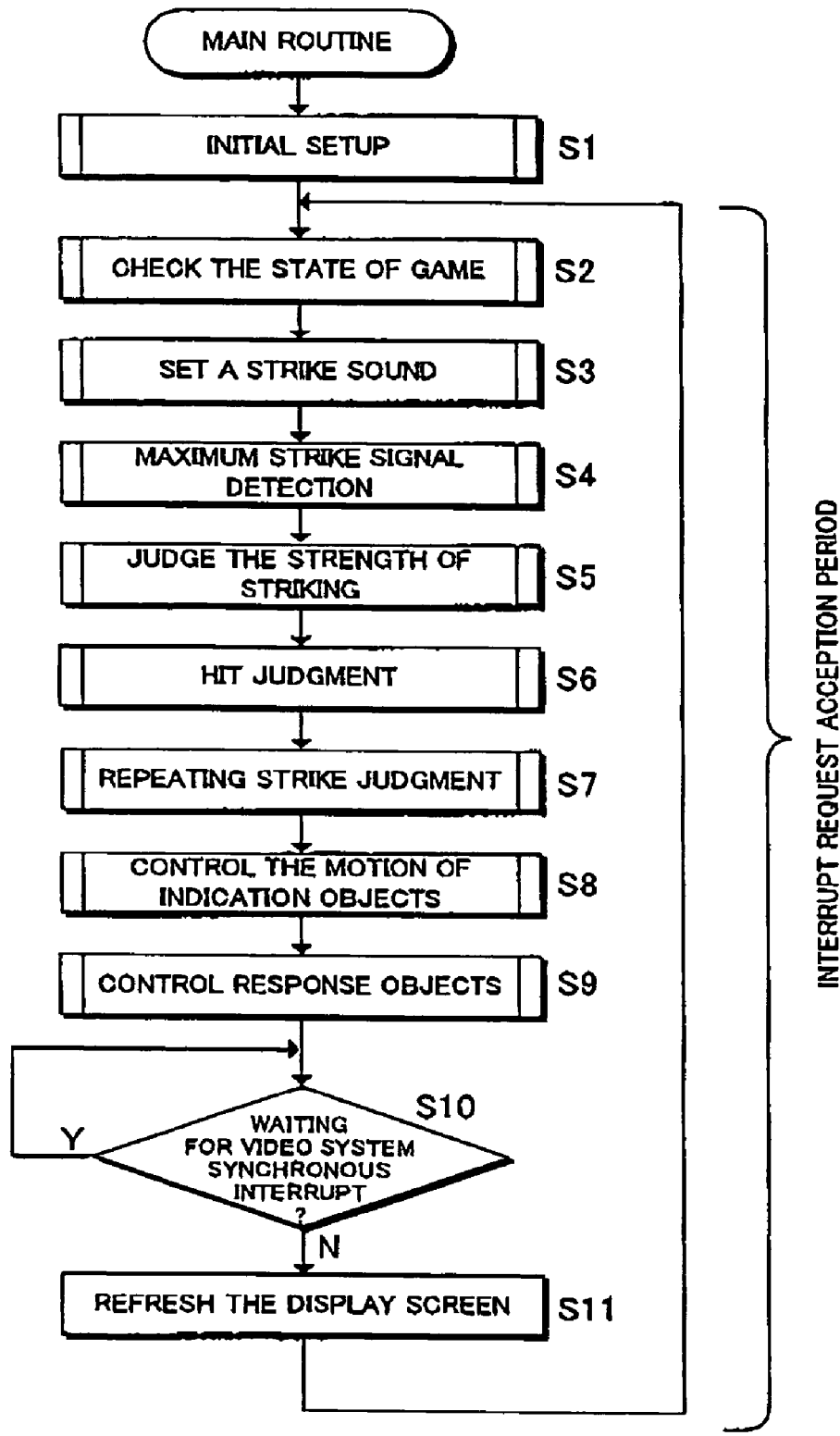
FIG. 21 is a flowchart showing the overall process flow of the game machine 1.

FIG. 21 is a flowchart showing the overall process flow of the game machine 1. As shown in FIG. 21, the CPU 201 performs the initial setup of the system in step S1.

In step S2, the CPU 201 checks the state of the game. In step S3, the CPU 201 acquires the initial address of the waveform data and the volume information item associated with the strike sound indicating information item as registered with reference to the strike sound setting table of the ROM 56 (refer to FIG. 20).

In step S4, the CPU 201 detects the maximum value of the strike signals (maximum strike signal) in one frame. In step S5, the CPU 201 compares the maximum strike signal and the input acceptable threshold L1 and judges whether or not an effective strike is performed. In addition, the CPU 201 judges whether or not the maximum strike signal falls within the strong strike range and whether or not falls within the weak strike range.

In step S6, the CPU 201 judges whether or not a strike is performed in the best hit range r1 and whether or not a strike is performed in the hit range r2. In addition, the CPU 201 judges whether or not a strike is performed with a strength as indicated. When the indication of the repetition of strikes is confirmed in step S7, the CPU 201 starts counting strikes by the player and judges whether or not the predetermined number of strikes are performed.

In step S8, the CPU 201 takes control of the motion of the indication objects 409L, 409R to 415L and 415R in the main window 410. In step 39, the CPU 201 takes control of the motion of the response objects 170L and 170R in the main window 410.

In step S10, it is determines whether or not the CPU 201 waits for the video system synchronous interrupt. In the case of the present embodiment, the CPU 201 supplies the graphics processor 202 with the image information for refreshing the display screen of the television monitor 90 after the vertical blanking period starts. Accordingly, after completing the arithmetic operations for use in refreshing the display screen, the CPU 201 refrains from proceeding its operation until the next video system synchronous interrupt is issued.

Namely, while it is "YES" in step S10, i.e., while the CPU 201 waits for a video system synchronous interrupt (there is no interrupt signal responsive to the video system synchronous signal), the process repeats the same step S10. On the other hand, if it is "NO" in step S10, i.e., if the CPU 201 gets out of the state of waiting for a video system synchronous interrupt (i.e., the CPU 201 is given a video system synchronous interrupt), the process proceeds to step S11. In step S11, the CPU 201 supplies the graphics processor 202 with the image information (the storage location information of the image data and the coordinate data thereof) for refreshing the display screen.

Figure 22:
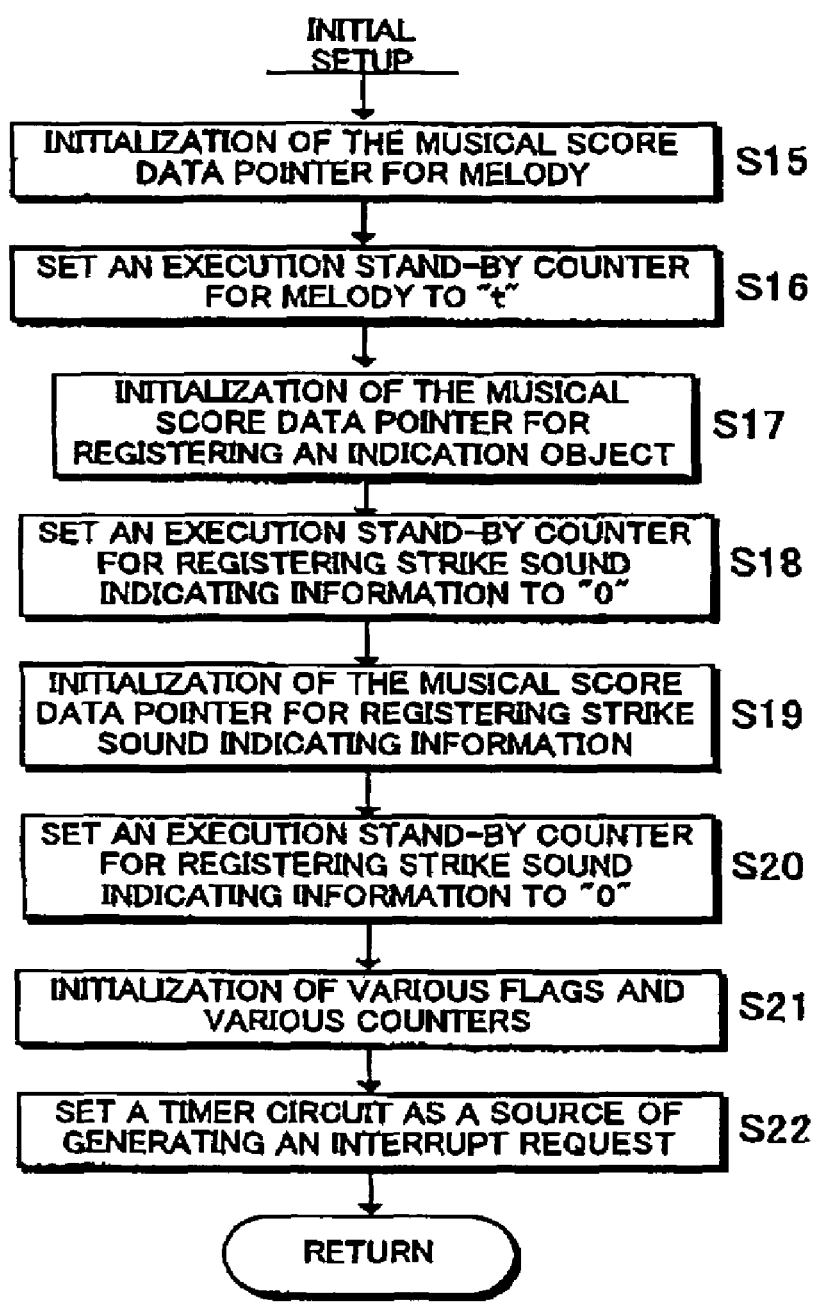
FIG. 22 is a flowchart showing the process flow in the initial setting in step S1 of FIG. 21.

FIG. 22 is a flowchart showing the process flow in the initial setting in step S1 of FIG. 21. As shown in FIG. 22, the CPU 201 initializes the musical score data pointer for melody in step S15. In step S16, the CPU 201 sets an execution stand-by counter for melody to "t".

In step S17, the CPU 201 initializes the musical score data pointer for registering an indication object. In step S18, the CPU 201 sets an execution stand-by counter for registering an indication object to "0".

In step S19, the CPU 201 initializes the musical score data pointer for registering strike sound indicating information. In step S20, the CPU 201 sets an execution stand-by counter for registering strike sound indicating information to "0".

In step S21, the CPU 201 initializes various flags and various counters. In step S22, the CPU 201 sets the timer circuit 210 as a source of generating an interrupt request signal for generating a sound, and the process proceeds to step S2 of FIG. 21.

In this case, it is for the following reason that the execution stand-by counter for melody is set to "t" and that the execution stand-by counter for registering an indication object is set to "0".

Namely, this is because it takes a certain period for the indication object 411R to enter the best hit range r1 after appearing at the uppermost edge of the right motion lane "b" of the main window 410 as illustrated in FIG. 11, and therefore the indication object 411R must be displayed at the certain period earlier to compensate this differential time. In other words, the musical score data for registering an indication object is read out at the certain period (a counter value "t") earlier than for melody. The execution stand-by counter for registering an indication object, the execution stand-by counter for melody and the execution stand-by counter for registering strike sound indicating information serve to count down.

Figure 23:
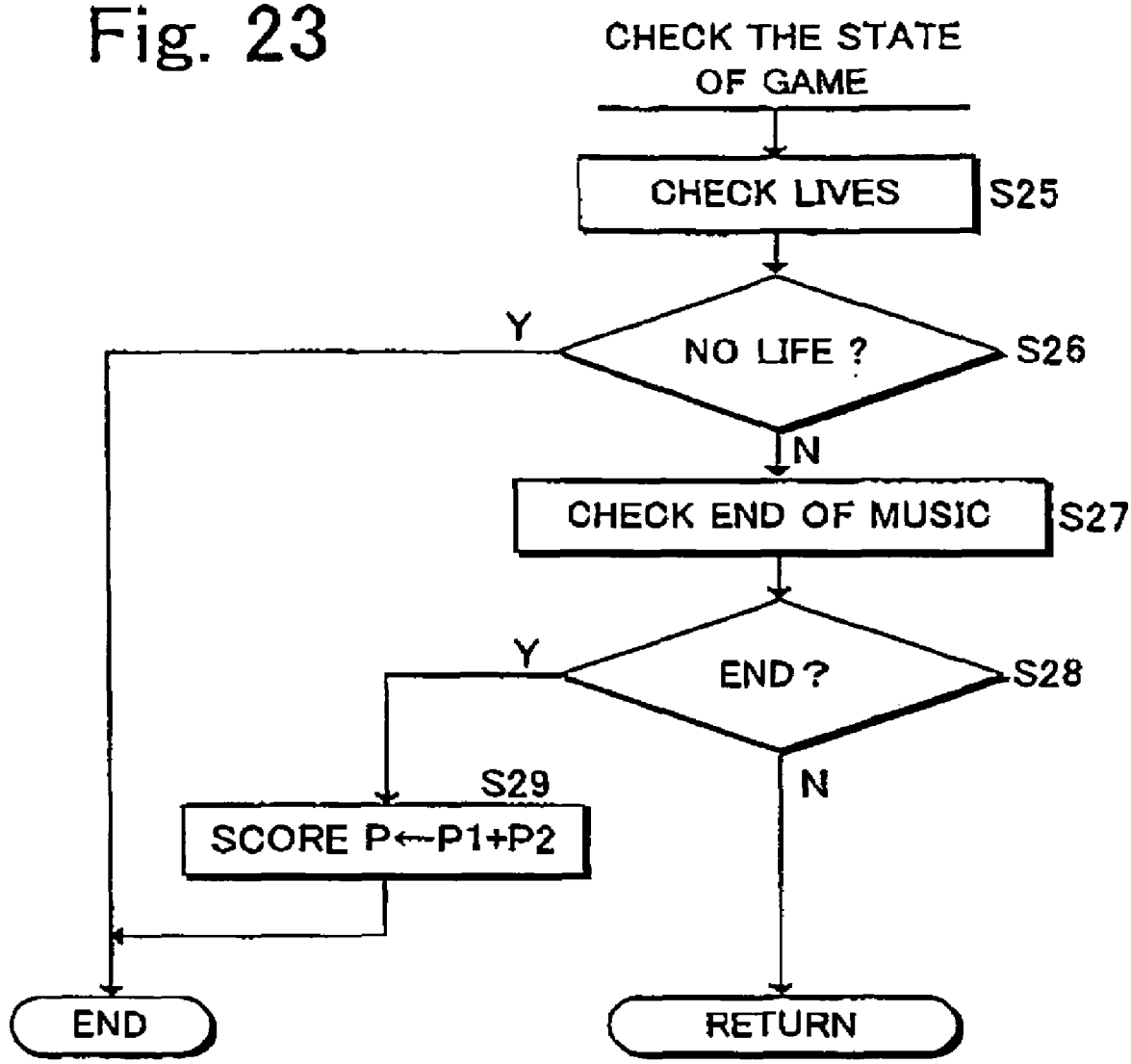
FIG. 23 is a flowchart showing the process flow of checking the state of the game in step S2 of FIG. 21.

FIG. 23 is a flowchart showing the process flow of checking the state of the game in step S2 of FIG. 21. As shown in FIG. 23, the CPU 201 checks the number of existing lives 405 in step S25. If the number of existing lives 405 is "0", the CPU 201 terminates the game (in step S26). Conversely, if the number of existing lives 405 is not "0", i.e., if there is an existing life 405, the CPU 201 proceeds to step S27 (in step S26).

In step S27, the CPU 201 checks whether or not the music ends with reference to a music end flag to be described below. If the music does not end, the CPU 201 proceeds to step S3 of FIG. 21 (in step S28). Conversely, if the music ends, the CPU 201 proceeds to step S29 (in step S28).

In step S29, the CPU 201 adds a score P1 and a score P2 together to obtain a score P. This score P is displayed in the score display area 400 of FIG. 11 to FIG. 13.

As has been discussed above, in the case of this embodiment, the game ends when the music ends or when all the lives 405 are turned off.

Figure 24:
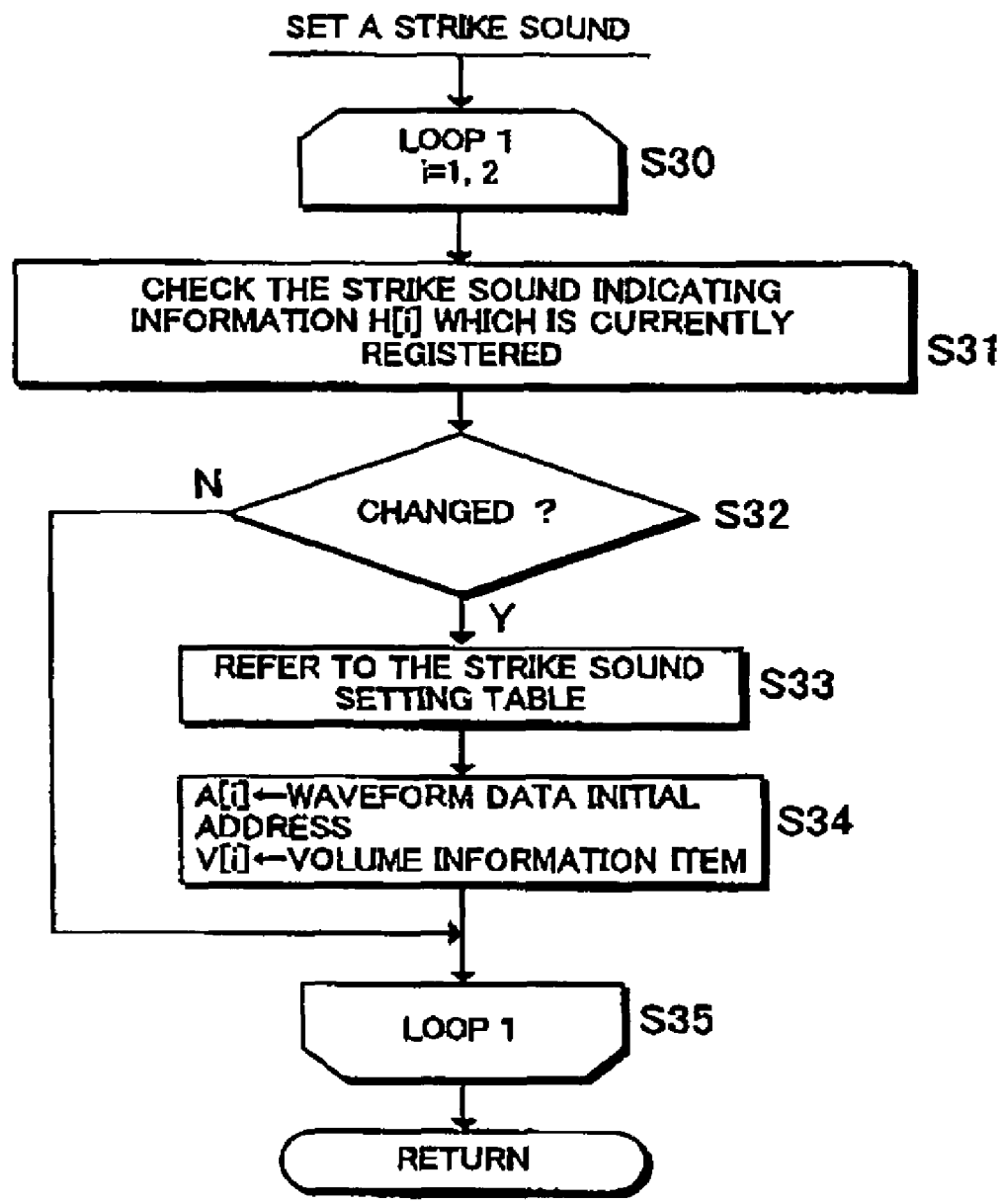
FIG. 24 is a flowchart showing the process flow of setting a strike sound in step S3 of FIG. 21.

FIG. 24 is a flowchart showing the process flow of setting a strike sound in step S3 of FIG. 21. As shown in FIG. 24, the process of step S31 to step S34 is repeated for two times between step S30 and step 35. In this case, "i" set to "1" means that the process is performed for the left batter surface 2 (the piezoelectric element 17b) while "i" set to "2" means that the process is performed for the right batter surface 4 (the piezoelectric element 17a).

In step S31, the CPU 201 checks the strike sound indicating information H[i] which is currently registered. If the strike sound indicating information H[i] is not changed, the CPU 201 proceeds to step S35 (in step S32). Conversely, if the strike sound indicating information H[i] is changed, the CPU 201 proceeds to step S33 (in step S32).

In step S33, the CPU 201 refers to the strike sound setting table (refer to FIG. 20) stored in the ROM 56. In step S34, the CPU 201 reads, from the ROM 56, the waveform data initial address and the volume information item associated with the strike sound indicating information H[i] which is currently registered, and stores them in the inner memory 207. More specifically speaking, the waveform data initial address is stored in an array element A[i] while the volume information item is stored in an array element V[i].

After completing step S35, the CPU 201 proceeds to step S4 of FIG. 21.

Figure 25:
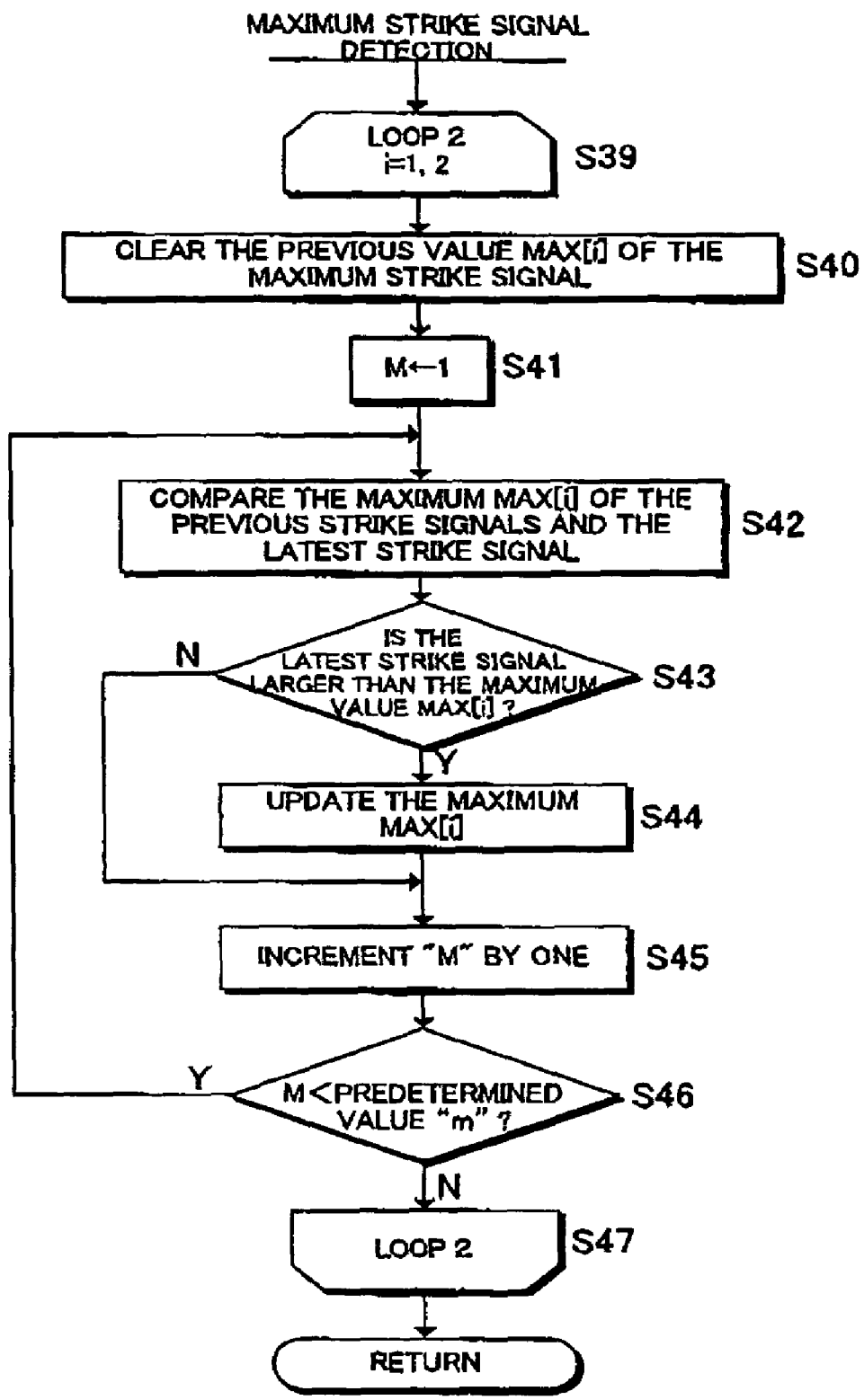
FIG. 25 is a flowchart showing the flow of the maximum strike signal detection process of step S4 of FIG. 21.

FIG. 25 is a flowchart showing the flow of the maximum strike signal detection process of step S4 of FIG. 21. As shown in FIG. 25, the process of step S40 to step S46 is repeated for two times between step S39 and step 47. Here, the meaning of "i" is the same as that in FIG. 24.

In step S40, the CPU 201 clears the previous value MAX[i] of the maximum strike signal. In step S41, the CPU 201 assigns "1" to "M".

In step S42, the CPU 201 compares the maximum MAX[i] of the previous strike signals and the latest strike signal. Incidentally, if "M" is "1", the latest strike signal is assigned to the maximum MAX[i].

The CPU 201 proceeds to step S45 (in step S43) if the latest strike signal is no larger than the maximum value MAX[i]. Contrary to this, the CPU 201 proceeds to step S44 (in step S43) if the latest strike signal is larger than the maximum value MAX[i].

In step S44, the CPU 201 updates the maximum value MAX[i] of the strike signals to the latest strike signal value. In step S45, the CPU 201 increments "M" by one.

If "M" is smaller than a predetermined value m, the CPU 201 proceeds to step S42 (in step S46). On the other hand, if "M" is no smaller than the predetermined value m, the CPU 201 proceeds to step S47 (in step S46).

Here, the predetermined value m is the number of times that a strike signal is input to the ADC 208. This number of times is the number of times per frame. Accordingly, it is possible to detect the maximum value of the strike signals input in each frame (the maximum strike signal) by performing the above process.

The CPU 201 performs step S5 of FIG. 21 after completing step S47.

Figure 26:
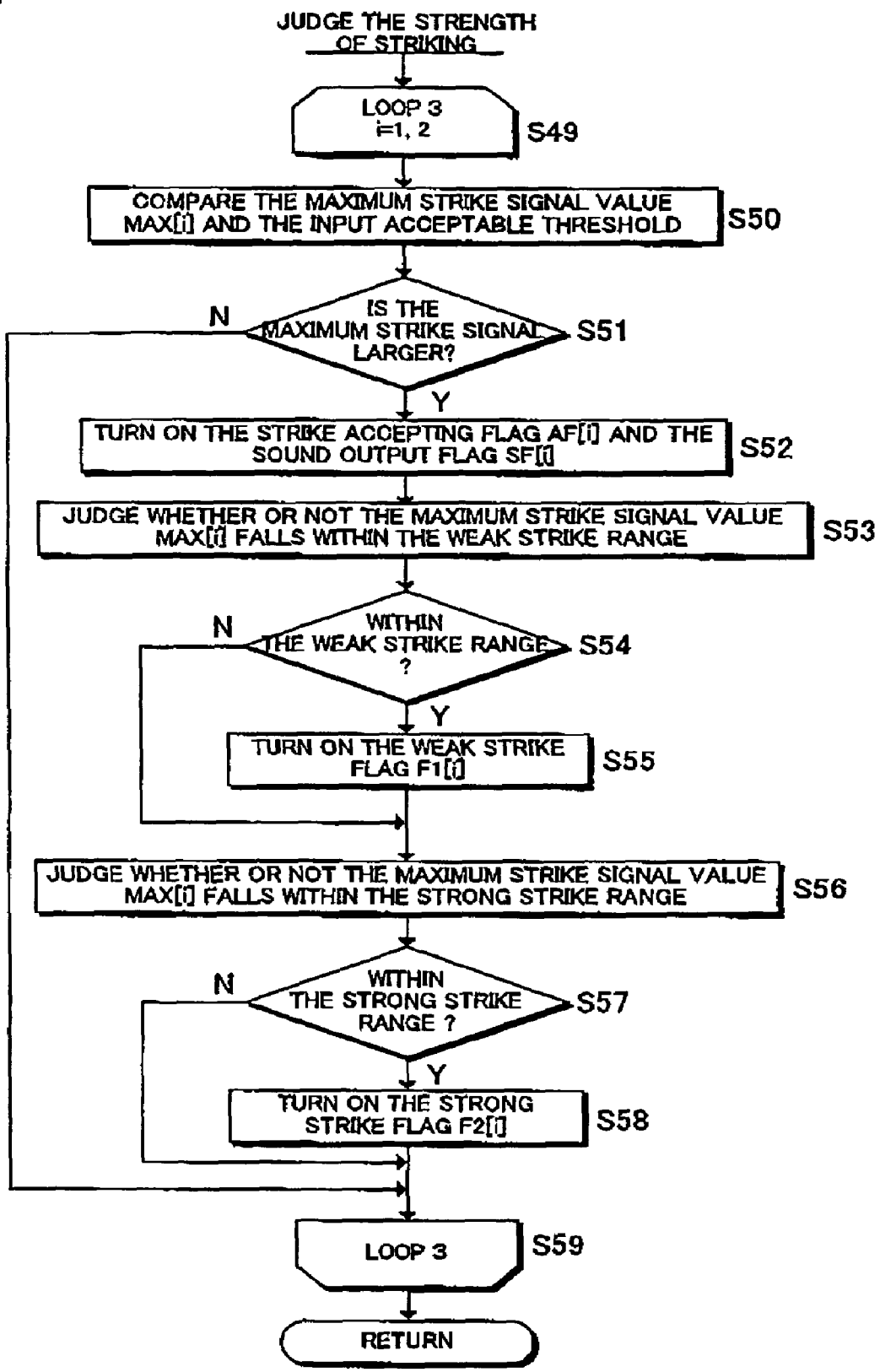
FIG. 26 is a flowchart showing the process flow of judging the strength of striking in step S5 of FIG. 21.

FIG. 26 is a flowchart showing the process flow of judging the strength of striking in step S5 of FIG. 21. As shown in FIG. 26, the process of step S50 to step S58 is repeated for two times between step S49 to step S59. In this flowchart, the index "i" has the same meaning as in FIG. 24.

In step S50, the CPU 201 compares the maximum strike signal value MAX[i] and the input acceptable threshold L1. If the maximum strike signal is no larger than the input acceptable threshold L1, the CPU 201 proceeds to step S59 (in step S51). On the other hand, the maximum strike signal is larger than the input acceptable threshold L1, the CPU 201 proceeds to step S52 (in step S51).

In step S52, the CPU 201 turns on the strike accepting flag AF[i] and the sound output flag SF[i]. In step S53, the CPU 201 judges whether or not the maximum strike signal value MAX[i] falls within the weak strike range. The CPU 201 proceeds to step S56 (in step S54) if the maximum strike signal value MAX[i] is out of the weak strike range. Contrary to this, if the maximum strike signal value MAX[i] falls within the weak strike range, the CPU 201 proceeds to step S55 (in step S54). In step S55, the CPU 201 turns on the weak strike flag F1[i].

In step S56, the CPU 201 judges whether or not the maximum strike signal value MAX[i] falls within the strong strike range. The CPU 201 then proceeds to step S59 (in step S57) if the maximum strike signal value MAX[i] is out of the strong strike range. On the other hand, if the maximum strike signal value MAX[i] falls within the strong strike range, the CPU 201 proceeds to step S58 (in step S57). In step S58, the CPU 201 turns on the strong strike flag F2[i] and proceeds to step S59.

The CPU 201 proceeds to step S6 of FIG. 21 after step S59 is completed.

Figure 27:
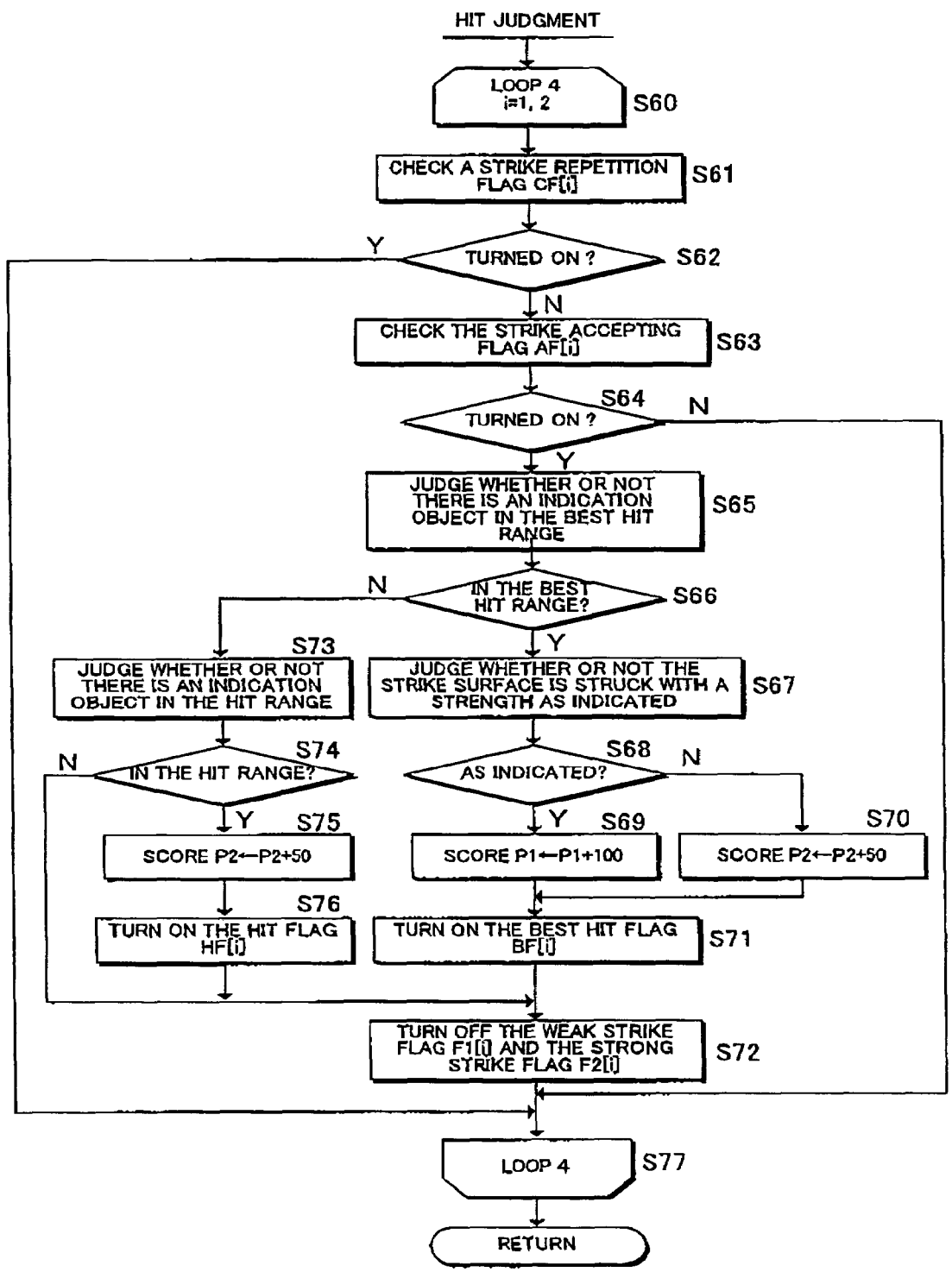
FIG. 27 is a flowchart showing the flow of the hit judgment process of step S6 of FIG. 21.

FIG. 27 is a flowchart showing the flow of the hit judgment process of step S6 of FIG. 21. As shown in FIG. 27, the process of step S61 to step S76 is repeated for two times between step S60 and step 77. In this flowchart, the index "i" has the same meaning as in FIG. 24.

In step S61, the CPU 201 checks a strike repetition flag CF[i]. In this case, the strike repetition flag CF[i] is a flag which is turned on when the repetition of strikes are indicated and turned off when the repetition of strikes are not indicated. More specifically speaking, the strike repetition flag CF[i] is turned on during the period that the indication object 413L, 413R, 415L of 415R is staying on the response object 170L or 170R.

When strike repetition flag CF[i] is turned on, the CPU 201 proceeds to step S77 (in step S62). On the other hand, when strike repetition flag CF[i] is turned off, the CPU 201 proceeds to step S63 (in step S62).

In step S63, the CPU 201 checks the strike accepting flag AF[i]. When the strike accepting flag AF[i] is turned off, the CPU 201 proceeds to step S77 (in step S64). On the other hand, when the strike accepting flag AF[i] is turned on, the CPU 201 proceeds to step S65 (in step S64).

In step S65, the CPU 201 judges whether or not there is an indication object in the best hit range r1. If there is an indication object in the best hit range r1, the CPU 201 proceeds to step S67 (in step S66). On the other hand, if there is no indication object in the best hit range r1, the CPU 201 proceeds to step S73 (in step S66).

In step S67, the CPU 201 judges whether or not the strike surface 9 is struck with a strength as indicated with reference to the weak strike flag F1[i] and the strong strike flag F2[i]. If the indication object is struck with a strength as indicated, the CPU 201 proceeds to step S69, otherwise proceeds to step S70 (in step S68).

In step S69, the CPU 201 adds one hundred points to the score P1. On the other hand, in step S70, the CPU 201 adds 50 points to the score P2. In step S71, the CPU 201 turns on the best hit flag BF[i].

On the other hand, in step S73, the CPU 201 judges whether or not there is an indication object in the hit range r2. If no indication object is located in the hit range r2, the CPU 201 proceeds to step S72, and conversely if there is an indication object in the hit range r2, the CPU 201 proceeds to step S75 (in step S74). In step S75, the CPU 201 adds 50 points to the score P2. In step S76, the CPU 201 turns on the hit flag HF[i].

In step S72, the CPU 201 turns off the weak strike flag F1[i] and the strong strike flag F2[i]. The CPU 201 proceeds to step S7 of FIG. 21 after step S77 is completed.

Figure 28:
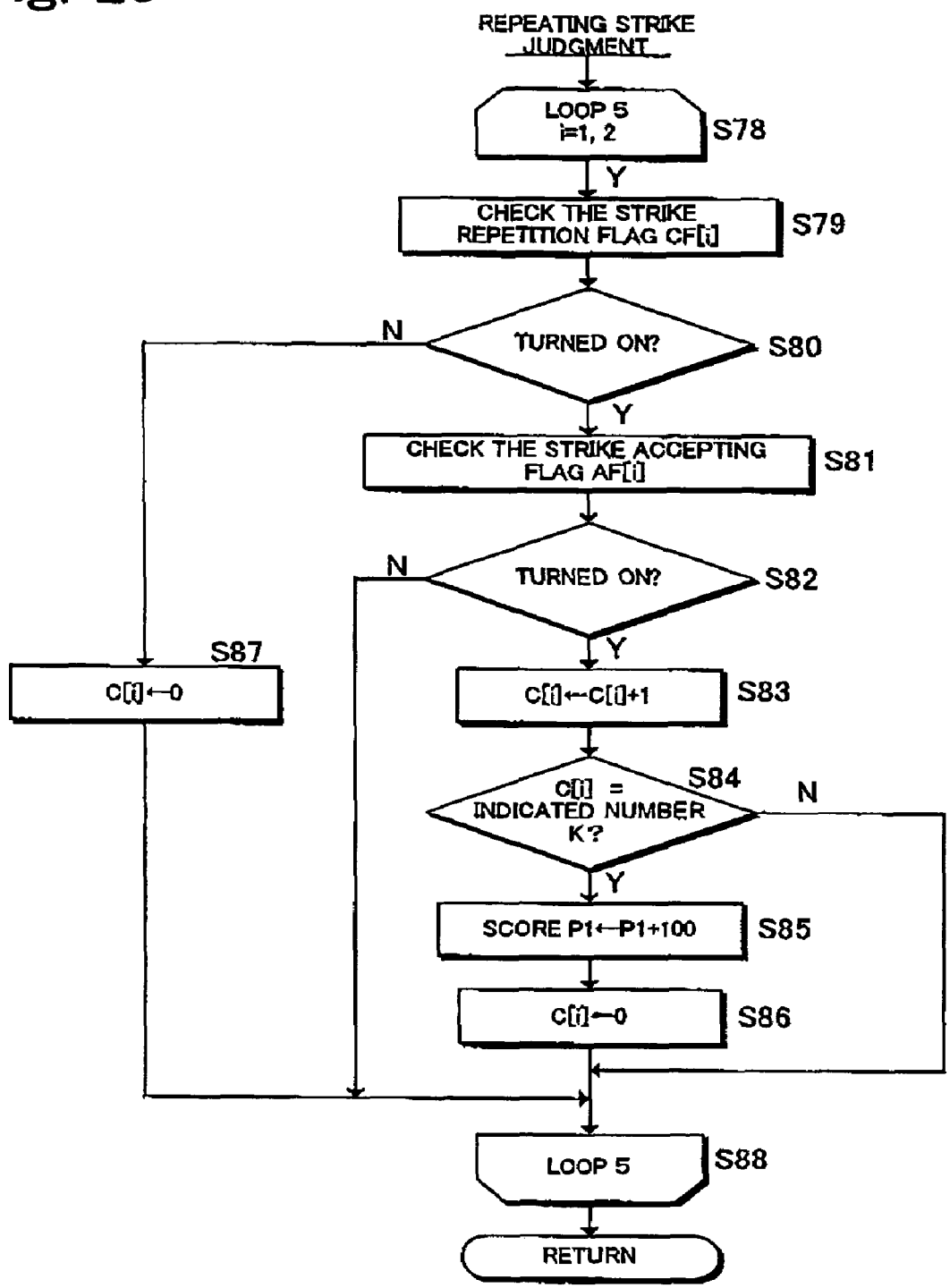
FIG. 28 is a flowchart showing the flow of the strike repetition judgment process of step S7 of FIG. 21.

FIG. 28 is a flowchart showing the flow of the strike repetition judgment process of step S7 of FIG. 21. As shown in FIG. 28, the process of step S79 to step S87 it is repeated a process of between step S78 and step 88. In this flowchart, the index "i" has the same meaning as in FIG. 24.

In step S79, the CPU 201 checks the strike repetition flag CF[i]. If the strike repetition flag CF[i] is turned off, the CPU 201 proceeds to step S87 while the strike repetition flag CF[i] is turned off the CPU 201 proceeds to step S81 (in step S80). In step S87, the CPU 201 reset a counter as C[i]=0.

On the other hand, in step S81, the CPU 201 checks the strike accepting flag AF[i]. If the strike accepting flag AF[i] is turned off, the CPU 201 proceeds to step S88 while if it is turned on, the CPU 201 proceeds to step S83 (in step S82).

In step S83, the CPU 201 increments the counter by one as (C[i]=C[i]+1). If the count value C[i] is equal to the number K of consecutive strikes as indicated by an indication object, the CPU 201 proceeds to step S85, otherwise proceeds to step S88 (in step S84).

In step S85, the CPU 201 adds one hundred points to the is score P1. In step S86, the CPU 201 reset a counter as C[i]=0.

The CPU 201 proceeds to step S8 of FIG. 21 after step S88 is completed. As has been discussed above, the number of times that the player repeats striking is counted while points are added if the predetermined number of strikes are performed.

Figure 29:
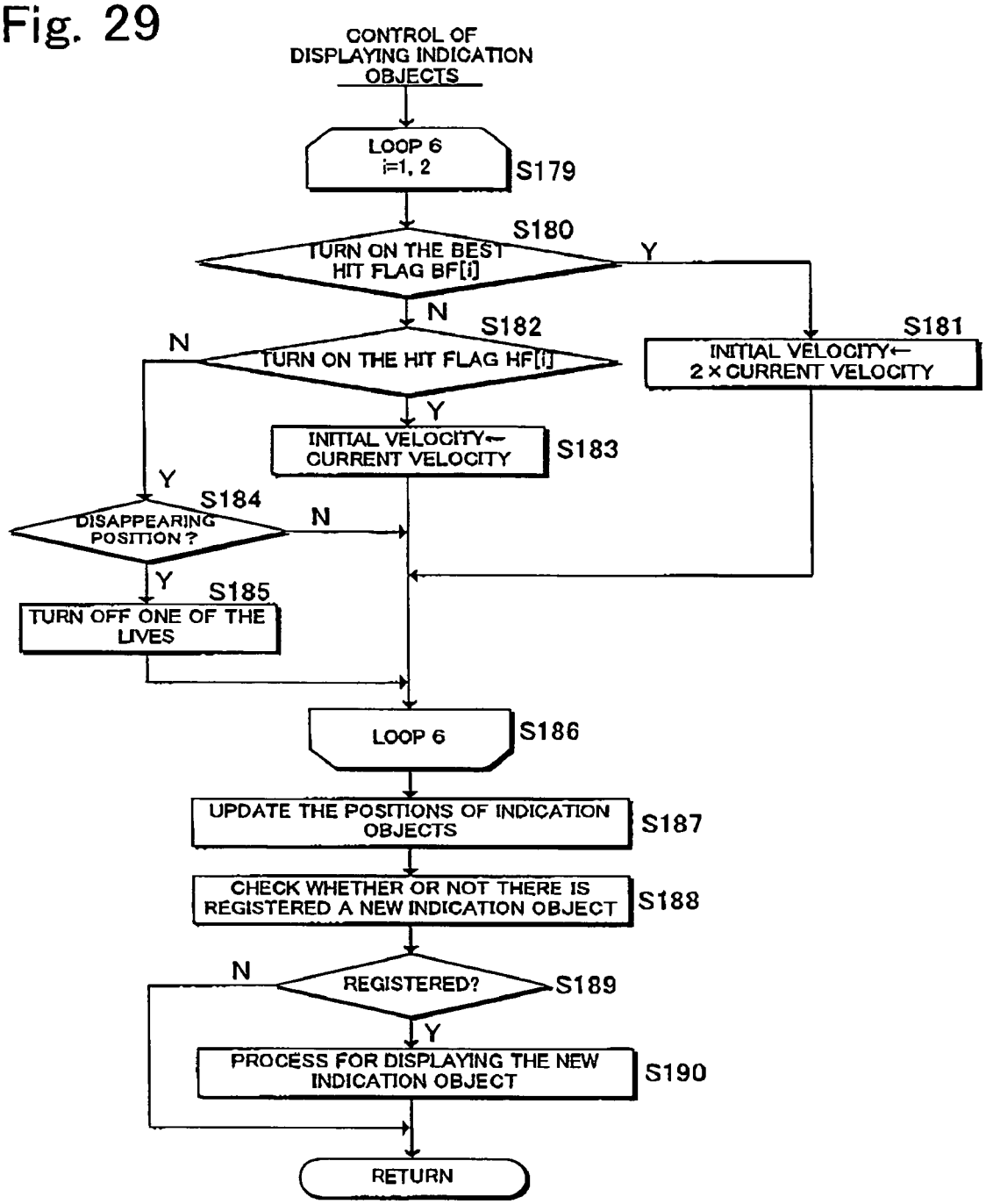
FIG. 29 is a flowchart showing the process flow of displaying indication objects in step S8 of FIG. 21.

FIG. 29 is a flowchart showing the process flow of displaying indication objects in step S8 of FIG. 21. As shown in FIG. 29, the process of step S180 to step S185 is repeated for two times between step S179 and step S186. In this flowchart, the index "i" has the same meaning as in FIG. 24.

If the best hit flag BF[i] is turned on, the CPU 201 proceeds to step S181 while if turned off the CPU 201 proceeds to step S182 (in step S180). In step S181, the CPU 201 sets the initial velocity of the corresponding indication object to twice the velocity just before hitting. By this setting, the indication object which is hit in the best hit range r1 is returned at twice the velocity just before hitting.

On the other hand, in the case where the best hit flag BF[i] is turned off, if the hit flag HF[i] is turned off the CPU 201 proceeds to step S183, and if the hit flag HF[i] is turned on the CPU 201 proceeds to step S184 (in step S182).

In step S183, the CPU 201 sets the initial velocity of the corresponding indication object to the velocity just before hitting. By this setting, the indication object which is hit in the hit range r2 is returned at the velocity just before hitting.

On the other hand, while the hit flag HF[i] is turned off, if the indication object reaches the disappearing position P (refer to FIG. 9), the CPU 201 proceeds to step S185, otherwise proceeds to step S186 (in step S184). In step S185, the CPU 201 turns off one of the lives 405.

After the process between step S179 and step S186 is performed for two times, in step S187, the CPU 201 performs the process of updating the positions of indication objects. More specifically speaking, the CPU 201 calculates and sets new coordinates on the basis of the velocity obtained in step S181 or step S183, or sets the coordinates of the indication object that reaches the disappearing position P out of the screen 91. Also, the CPU 201 calculates anew the coordinates of the indication objects which are moving.

In step S188, the CPU 201 checks whether or not there is registered a new indication object. If there is registered no new indication object, the CPU 201 proceeds to step S9 of FIG. 21 (in step S189). Conversely, if there is registered a new indication object, the CPU 201 proceeds to step S190 (in step S189). In step S190, the CPU 201 performs necessary processes required for displaying the new indication object, such as setting the coordinates thereof, and then proceeds to step S9 of FIG. 21.

Figure 30:
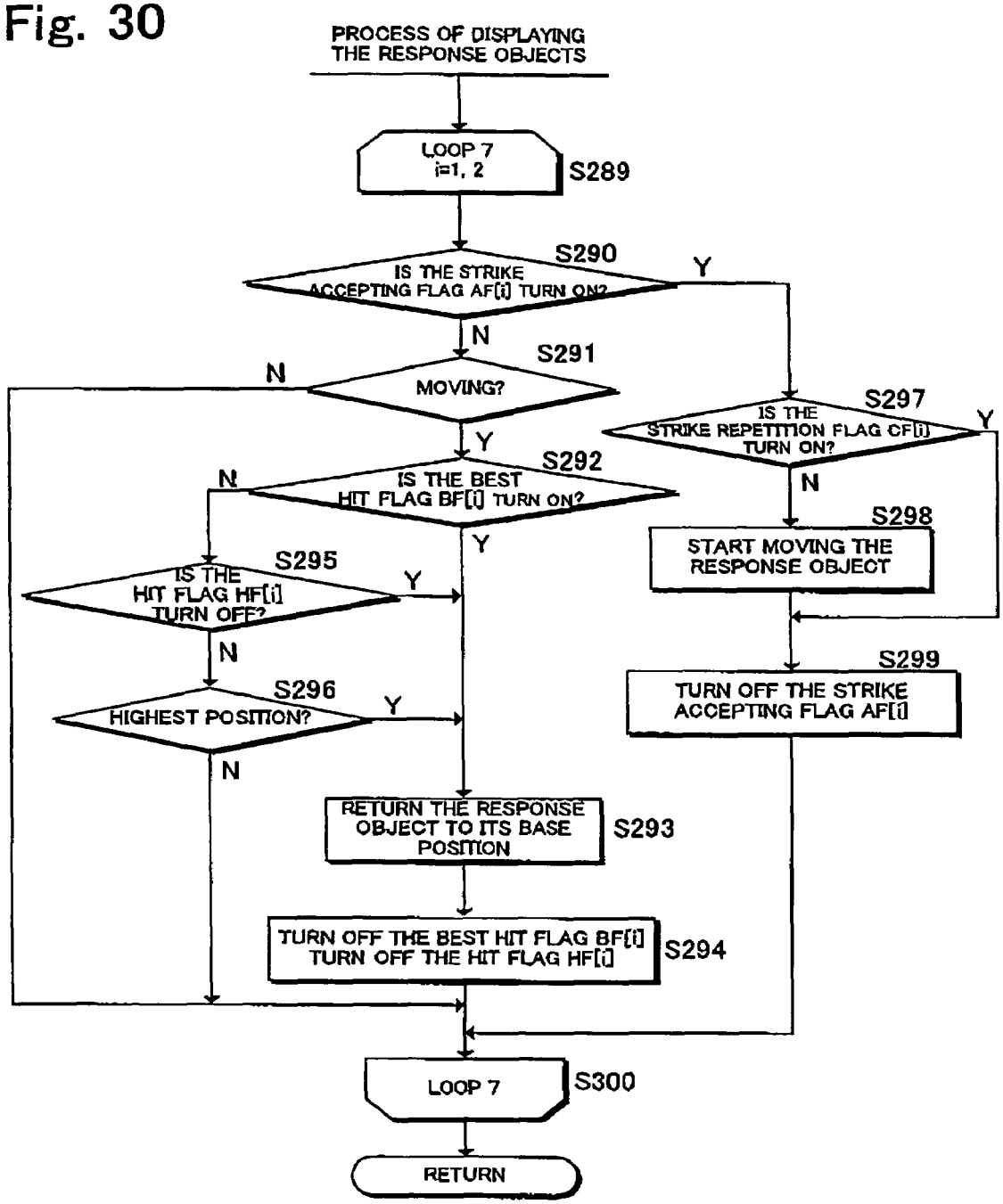
FIG. 30 is a flowchart showing the process flow of displaying response objects in step S9 of FIG. 21.

FIG. 30 is a flowchart showing the process flow of displaying the response objects in step S9 of FIG. 21. As shown in FIG. 30, the process of step S290 to step S299 is repeated for two times between step S289 and step S300. In this flowchart, the index "i" has the same meaning as in FIG. 24.

If the strike accepting flag AF[i] is turned on, the CPU 201 proceeds to step S297, otherwise proceeds to step S291 (in step S290).

If the response object is moving, the CPU 201 proceeds to step S292, otherwise proceeds to step S300 (in step S291).

If the best hit flag BF[i] is turned on, the CPU 201 proceeds to step S293, otherwise proceeds to step S295 (in step S292).

If the hit flag HF[i] is turned on, the CPU 201 proceeds to step S293, otherwise proceeds to step S296 (in step S295).

If the moving response object reaches its highest position, the CPU 201 proceeds to step S293, otherwise proceeds to step S300 (in step S296).

In step S293, the CPU 201 sets the coordinates of the response object in order that the response object returns to its base position. In other words, the process of returning the response object to its base position is performed when the response object hits an indication object or reaches its highest position. In step S294, the CPU 201 turns off the best hit flag BF[i] and the hit flag HF[i].

In the case where the strike accepting flag AF[i] is turned on, if the strike repetition flag CF[i] is turned on the CPU 201 proceeds to step S299, otherwise proceeds to step S298 (in step S297).

In step S298, the CPU 201 sets the coordinates of the response object in order to move the response object. In other words, when an effective strike is performed, the response object is moved in response to this. In step S299, the CPU 201 turns off the strike accepting flag AF[i].

CPU 201 proceeds to step S10 of FIG. 21 after step S300 is completed.

Figure 31:
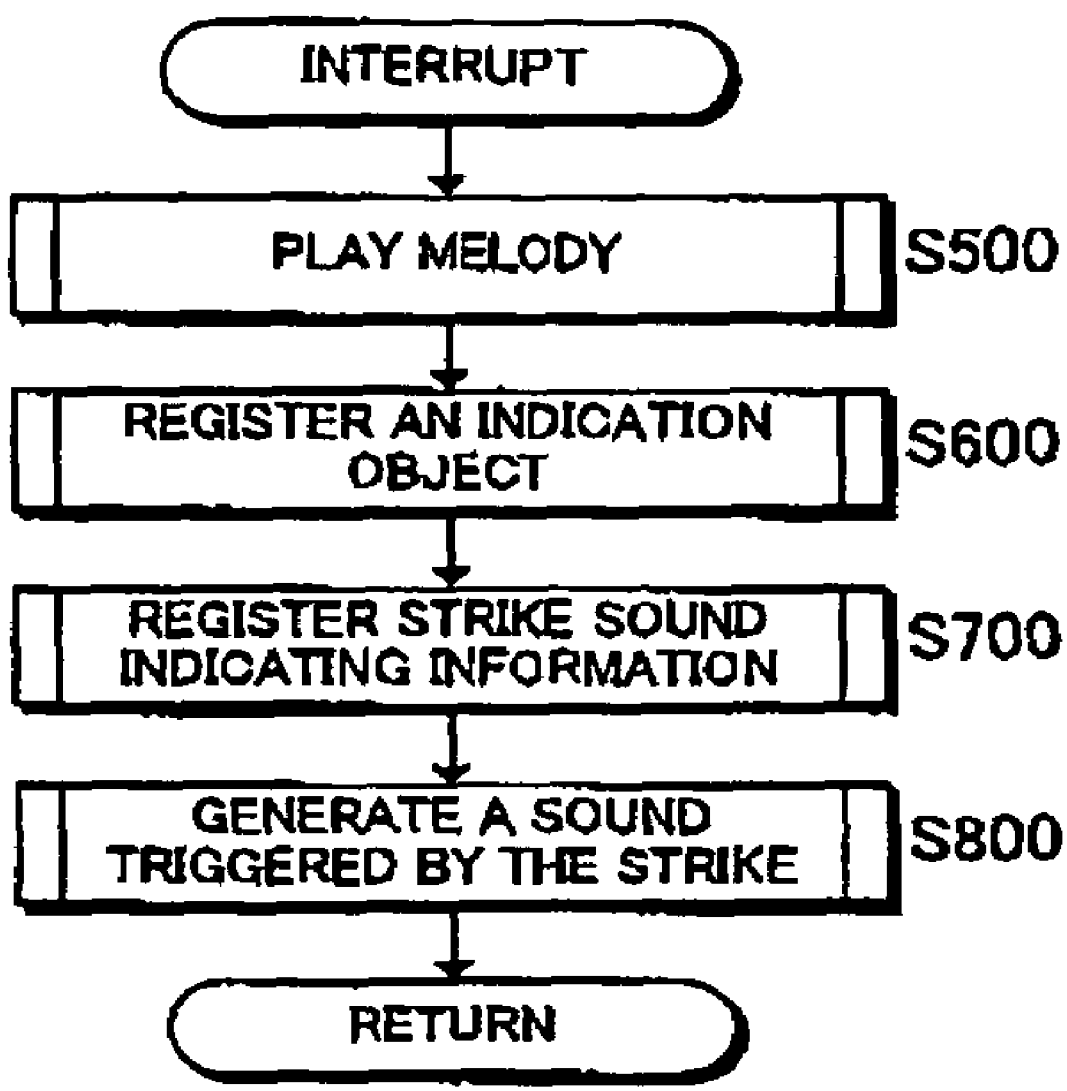
FIG. 31 is a flowchart showing the interrupt handling process flow.

FIG. 31 is a flowchart showing the interrupt handling process flow. As shown in FIG. 31, the high speed processor 50 is operated to play a melody in step S500. In step S600, the CPU 201 performs the process of registering an indication object. In step S700, the CPU 201 performs the process of registering strike sound indicating information. In step S800, the high speed processor 50 performs the process of generating a sound triggered by the strike of the strike surface 9.

Figure 32:
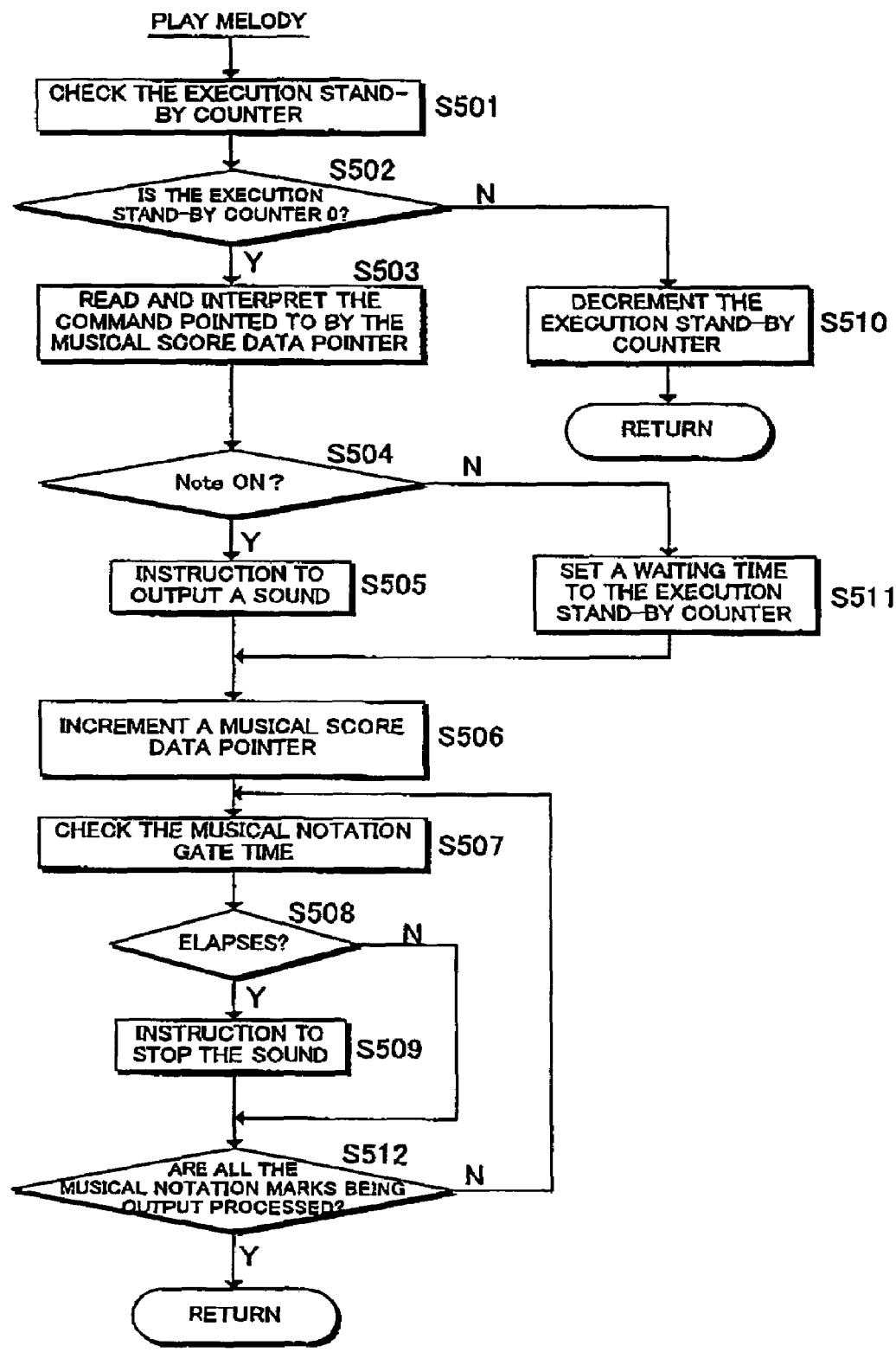
FIG. 32 is a flowchart showing the process flow of playing a melody in step S500 of FIG. 31.

FIG. 32 is a flowchart showing the process flow of playing a melody in step S500 of FIG. 31. As shown in FIG. 32, the CPU 201 checks the execution stand-by counter for playing a melody in step S501. If the value of the execution stand-by counter for melody is "0" the process proceeds to step S503, otherwise proceeds to step S510 (in step S502).

In step S510, the CPU 201 decrements the execution stand-by counter for melody.

On the other hand, in step S503, the CPU 201 reads and interprets the command pointed to by the musical score data pointer for melody. The process proceeds to step S505 if the command is "Note On" (in step S502). On the other hand, if the command is not "Note On", i.e., is "Stand-by", the process proceeds to step S511.

In step S511, the CPU 201 sets a waiting time to the execution stand-by counter for melody. On the other hand, in step S505, the CPU 201 stores the waveform pitch control information, the initial address information of waveform data in the data area for musical tones of the inner memory 207 in accordance with the note number and the instrument designation information pointed to by the musical score data pointer, and stores the channel volume information corresponding to the velocity information and the gate time information in the data area for musical tones. The CPU 201 then instructs the sound processor 203 to access the inner memory 207. In response to this, the sound processor 203 reads the above information as stored in the data area for musical tones of the inner memory 207 in the appropriate timing, and generates audio signals.

In step S506, the CPU 201 increments a musical score data pointer for melody. In step S507, the CPU 201 checks the remaining time of the musical notation gate time. If the gate time elapses in step S508, the CPU 201 proceeds to step S509, instructs the sound processor 203 to stop outputting the sound corresponding to the musical notation mark, and then proceeds step S510. On the other hand, if the gate time does not elapse in step S508, the process proceeds to step S510.

In step S512, the CPU 201 determines whether or not the process in step S507 is completed for all the musical notation marks being output, and if not completed the process proceeds to step S507 otherwise proceeds to step S600 of FIG. 31.

Figure 33:
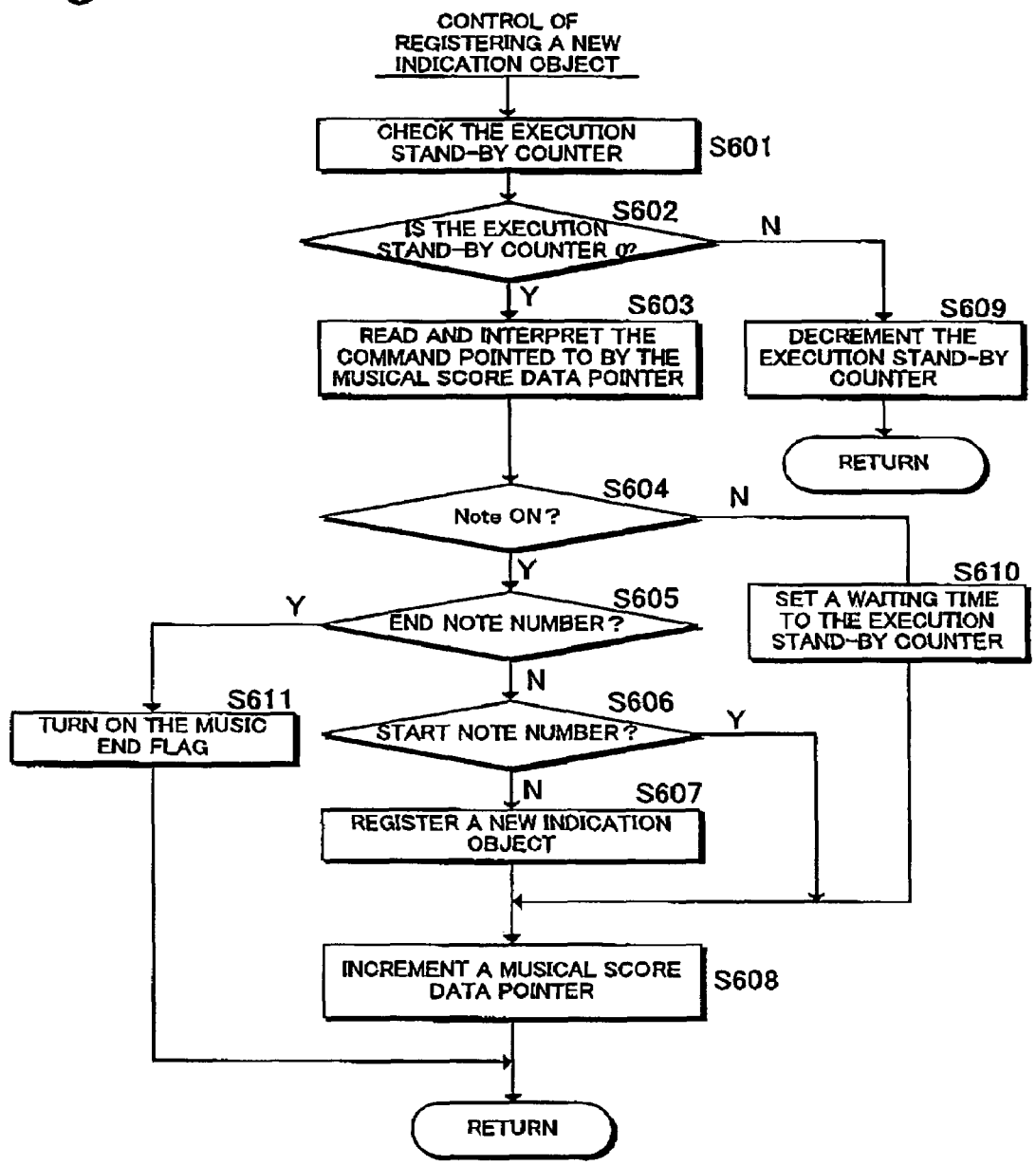
FIG. 33 is a flowchart showing one example of the indication object registration process in step S600 of FIG. 31.

FIG. 33 is a flowchart showing one example of the indication object registration process in step S600 of FIG. 31. As shown in FIG. 33, in step S601, the CPU 201 checks the execution stand-by counter for registering an indication object. The process proceeds to step S603 if the execution stand-by counter for registering an indication object is "0", otherwise proceeds to step S609 (in step S602).

In step S609, the CPU 201 decrements the execution stand-by counter for registering an indication object. On the other hand, in step S603, the CPU 201 reads and interprets a command pointed to by the musical score data pointer for registering an indication object.

The process proceeds to step S605 if the command is "Note On" (in step S604). Conversely, if the command is not "Note On", i.e., is "Stand-by", the process proceeds to step S610.

In step S610, the CPU 201 sets a stand-by time to the execution stand-by counter for registering an indication object. On the other hand, in the case where the command is "Note On", the process proceeds to step S611 if the note number is indicative of the end of music, otherwise proceeds to S606 (in step S605). In step S611, the CPU 201 turns on the is music end flag.

On the other hand, if the note number is indicative of the start of music, the process proceeds to step S608, otherwise proceeds to step S607 (in step S606). In step S607, the CPU 201 registers a new indication object. In step S608, the CPU 201 increments the musical score data pointer for registering an indication object. Then, the process proceeds to step S700 of FIG. 31.

Figure 34:
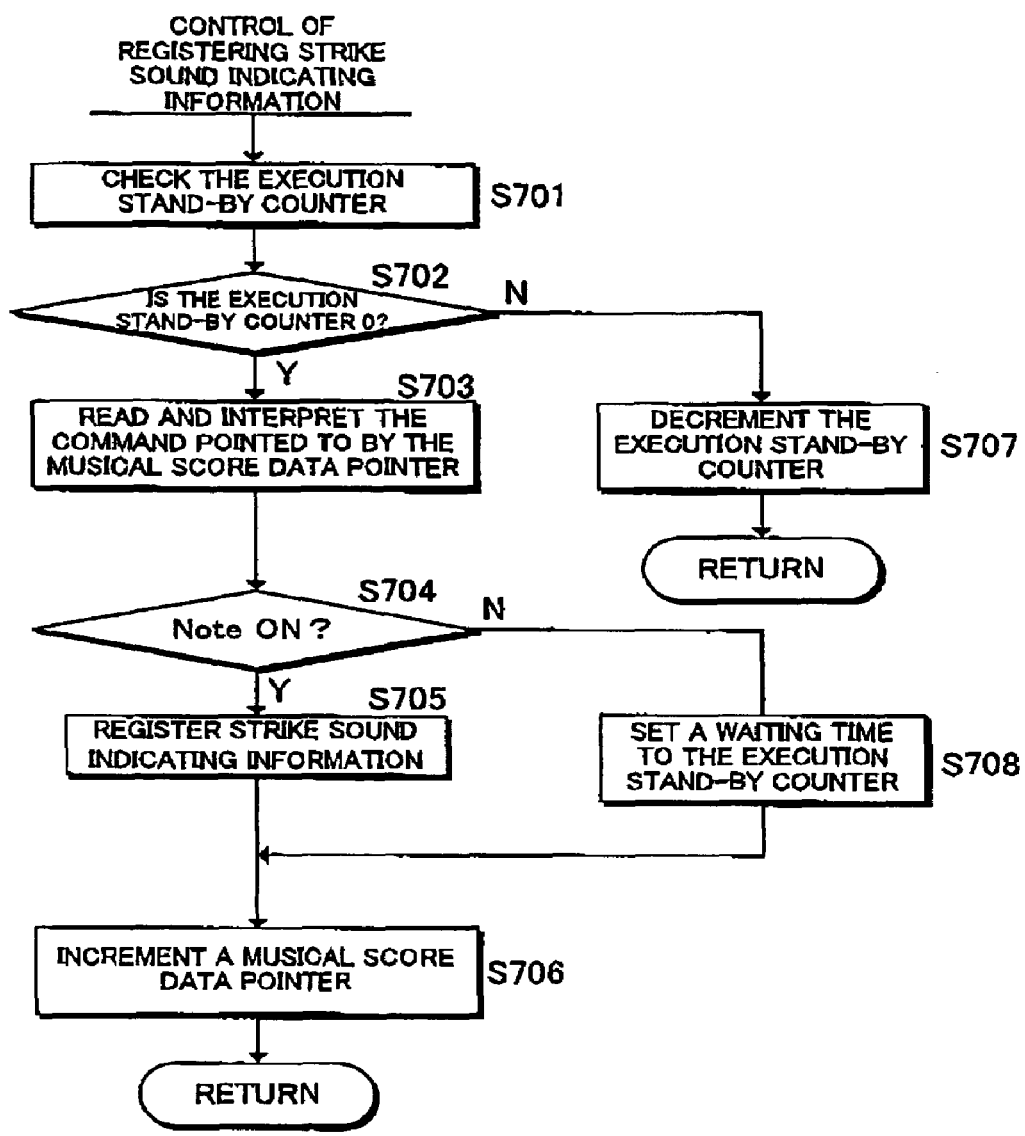
FIG. 34 is a flowchart showing the flow of the strike sound indicating information registration process of step S700 of FIG. 31.

FIG. 34 is a flowchart showing the flow of the strike sound indicating information registration process of step S700 of FIG. 31. As shown in FIG. 34, the CPU 201 checks the execution stand-by counter for registering strike sound indicating information in step S701. The process proceeds to step S703 if the execution stand-by counter for registering strike sound indicating information is "0", otherwise proceeds to step S707 (in step S702).

In step S707, the CPU 201 decrements the execution stand-by counter for registering strike sound indicating information. On the other hand, in step S703, the CPU 201 reads and interprets a command pointed to by the musical score data pointer for registering strike sound indicating information. The process proceeds to step S705 if the command is "Note On" (in step S704). Conversely, if the command is not "Note On", i.e., is "Stand-by", the process proceeds to step S708.

In step S708, the CPU 201 sets a stand-by time to the execution stand-by counter for registering strike sound indicating information. On the other hand, in step S705, the CPU 201 registers the strike sound indicating information. More specifically speaking, an array element H[1] is used to store the strike sound indicating information corresponding to the left batter surface 2 (the piezoelectric element 17b) while an array element H[2] is used to store the strike sound indicating information corresponding to the right batter surface 4 (the piezoelectric element 17a).

In step S706, the CPU 201 increments the musical score data pointer for registering strike sound indicating information. Then, the process proceeds to step S800 of FIG. 31.

Figure 35:
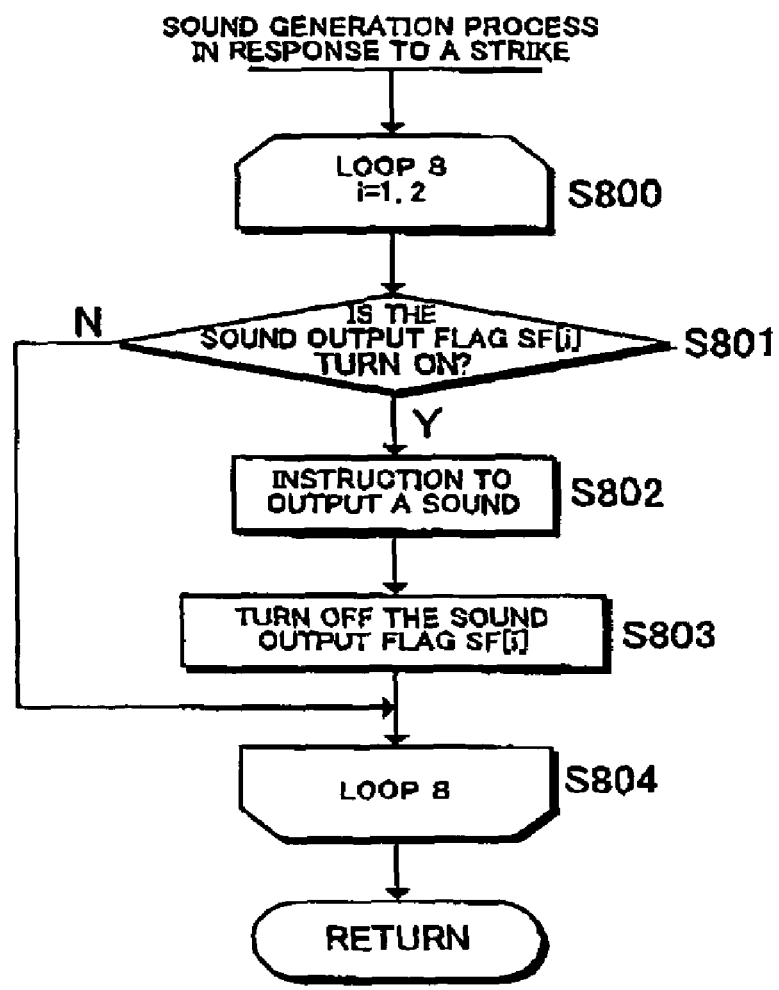
FIG. 35 is a flowchart showing the flow of the sound generation process in response to a strike in step S800 of FIG. 31.
Figure 36:
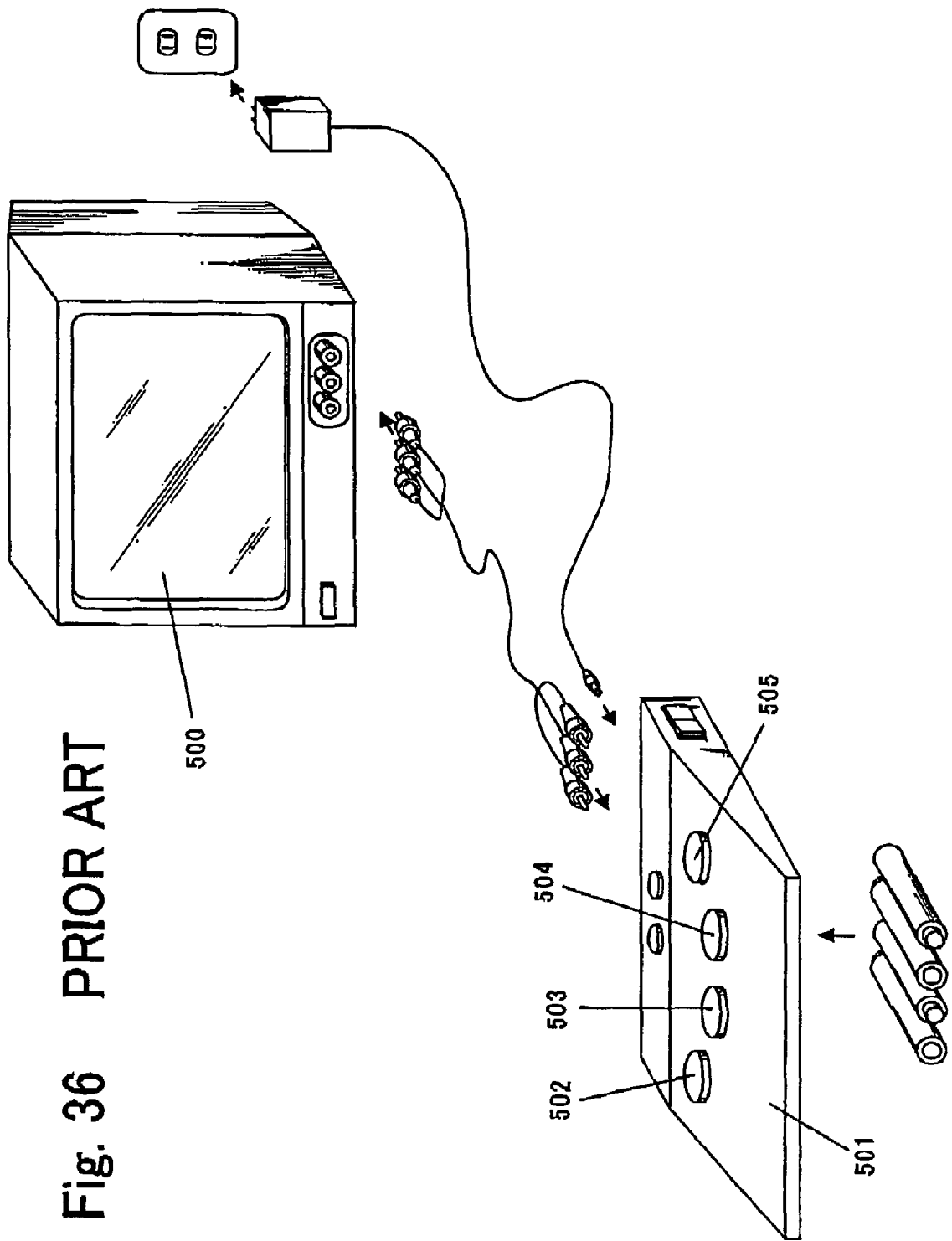
FIG. 36 is a view showing the overall configuration of a conventional ball paddle game machine.
Figure 37:
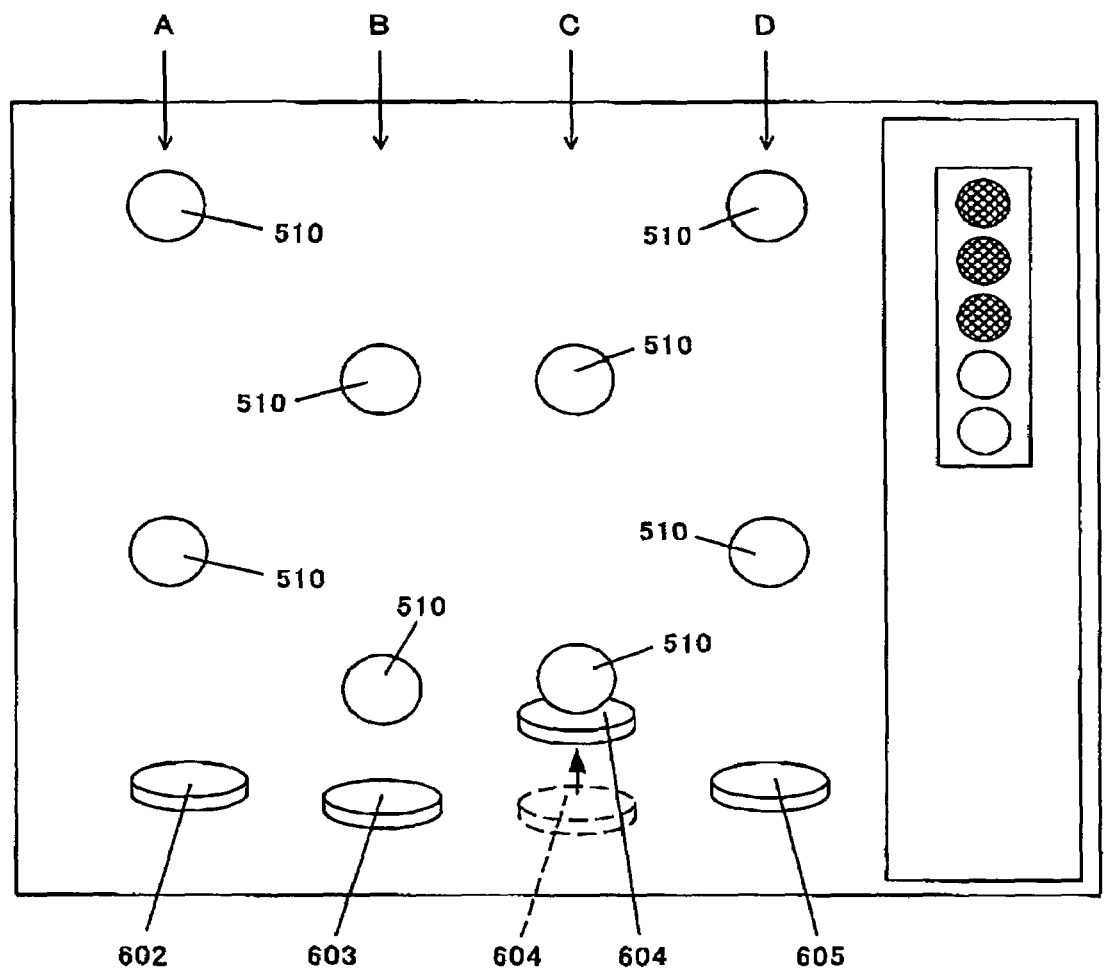
FIG. 37 is a view showing an example of the game screen of the conventional ball paddle game machine.

FIG. 35 is a flowchart showing the flow of the sound generation process in response to a strike in step S800 of FIG. 31. As shown in FIG. 35, the process of step S801 to step S803 is repeated for two times between step S800 and step S804. In this flowchart, the index "i" has the same meaning as in FIG. 24.

The CPU 201 proceeds to step S804 if the sound output flag SF[i] is turned off and proceeds to step S802 if the sound output flag SF[i] is turned on (in step S801). In step S802, the CPU 201 has the sound processor 203 read the waveform data initial address A[i] and the volume information item V[i] stored in the data area for musical tones, and perform the output of the strike sound.

In step S803, the CPU 201 turns off the sound output flag SF[i]. As has been discussed above, when the sound output flag SF[i] is turned on, i.e., when an effective strike is performed on the strike surface 9, a strike sound is output in response to it.

Next, one example of the method of providing the first musical score data 305, the second musical score data 306 and the third musical score data 307 will be explained.

For this purpose, performance information (sound pitch (i.e., note number), the magnitude of sound (i.e., velocity), the length of tone (i.e., gate time), the tone quality (i.e., instrument designation information) and the time-series information indicative of the numerical timings of the respective musical notes and the like) for playing melody is prepared in conformity with the MIDI (Musical Instrument Digital Interface) standard. In this case, it is generally easy to generate such performance data by making use of computer aided composing software capable of outputting data in MIDI format. The first musical score data 305 of FIG. 16 can be prepared by the use of the performance data as generated with the software. In this case, the stand-by time is calculated with reference to the timing information of musical notes. Alternatively, it is possible to design the music game console 1 capable of playing melody with the performance data, as it is, which has been prepared in conformity with the MIDI standard.

The second musical score data 306 of FIG. 17 is generated on the basis of performance data prepared in conformity with the MIDI standard in the same manner as the first musical score data 305. In this case, the note number is not the information which designates a pitch but the information designating the type of the indication object (refer to FIG. 18). In other words, musical notes of the MIDI data are used for determining the appearance of an indication object. By making use of musical notes in this way, a widely distributed computer aided composing software product can be used to prepare performance data for displaying indication objects with ease. The information about the magnitude of sound and the length of tone contained in the performance data for displaying indication objects is not used for displaying indication objects, and therefore arbitrary values (predetermined values) can be set to the corresponding fields. Alternatively, it is possible to design the music game console 1 capable of making use of the performance data itself, as the musical score data for displaying indication objects, which has been prepared in conformity with the MIDI standard.

The third musical score data 307 of FIG. 19 is generated on the basis of performance data prepared in conformity with a MIDI standard in the same manner as the first musical score data 305. In this case, the note number is not the information which designates a pitch but the information designating the tone quality of strike sound. In other words, musical notes of the MIDI data are used for designating the tone quality of strike sound. By making use of musical notes in this way, a widely distributed computer aided composing software product can be used to prepare the information for designating the tone quality of strike sound with ease. The information about the magnitude of sound and the length of tone contained in the information for designating the tone quality of strike sound is not used for designating the tone quality of strike sound, and therefore arbitrary values (predetermined values) can be set to the corresponding fields. Alternatively, it is possible to design the music game console 1 capable of making use of the performance data itself, as the musical score data for designating the tone quality of strike sound, which has been prepared in conformity with the MIDI standard.

The following is a description of one exemplary method of generating the musical score data for use in the present invention from MIDI data. First, a Standard MIDI file containing two or more tracks is prepared by a known method. One of the tracks (for example, a percussion instrument part) corresponds to the second musical score data 306. For example, a MIDI file can be generated by inputting musical notes to a computer with a mouse, a MIDI instrument or a microphone (using a microphone-to-score entry utility). In the case where there is available a sheet music including a percussion instrument part, it can be scanned and transcribed into a MIDI file by an appropriate image analysis utility. In this case, the percussion instrument part can be used for the player's part as the second musical score data 306.

The second musical score data can be modified by editing it, in order to add striking criteria by hands or in accordance with a predetermined algorithm, for example, on the basis of the downbeat and upbeat. The striking criterion is related to at least one the strength of striking and the number of times of repeating strikes.

Furthermore, it is possible to distribute the music data 303 and, if necessary, the image data 302 and/or the game program 300, through the Internet to meet user's diverse needs.

One example of such distribution is described, for example, in Japanese patent application No. 2003-270850 filed on Jul. 4, 2003 by the present applicant, and PCT Application No. PCT/JP2004/009763 corresponding thereto filed on Jul. 2, 2004.

As has been discussed above, since indication objects are displayed at the intervals in agreement with the rhythm of music in the case of the present embodiment, musical tones can be output in synchronization with music by performing strikes in the appropriate timing as indicated by indication objects. By this process, the player can join automatic music performance while enjoying the game. As a result, it is possible to provide a game machine which is more funny and does not satiate the player's interest.

Also, the musical tone output in response to a strike by the player can be designated by tone quality designation information (the note number is used for this purpose in the above embodiment) such that a variety of musical tones can be output. Accordingly, the player can enjoy a music game, while joining changeful automatic performance, only with a single music game console. This differs substantially from conventional percussion instruments. Namely, while a conventional percussion instrument can output sounds only of predetermined tone quality (qualities) corresponding to the conventional percussion instrument, it is possible in the case of the present invention to change the tone quality of the strike sound from one to another.

For example, in the case of a conventional percussion instrument having two batter surfaces (corresponding to the left batter surface 2 and the right batter surface 4 in the case of the present embodiment), the strike sounds as output are predetermined corresponding to these two batter surfaces. However, in the case of the present embodiment, the tone quality of strike sounds can be changed in a time series by the use of the third musical score data 307 irrespective of the number of the batter surfaces (even if only a single batter surface is available).

In addition to this, in accordance with the present embodiment, it is possible to give various indications to the player by changing the way of displaying the indication object. As a result, by making use of various ways of indicating, it is possible to provide a plurality of difficulty levels of the game and wide variations in playing the game. Furthermore, by making use of various ways of providing indications, the player can join changeful automatic performance.

In the above example, while the strength of striking is indicated, the number of times of repeating strikes is displayed in the respective indication objects. However, the way of providing indications by an indication object is not limited thereto. For example, the color or profile of an indication object may be changed for this purpose.

Also, in the case of the present embodiment, there are two piezoelectric elements provided for detecting strikes. By providing a plurality of piezoelectric elements in this manner, is it possible to detect strikes on a plurality of batter surfaces by the player corresponding to the number of the piezoelectric elements. Accordingly, it is possible to make the game more attractive by effectively utilizing the plurality of batter surfaces to be selectively struck by the player. As a result, while diversified musical tones can be output in response to strikes, diversified game programs can be implemented. For example, the piezoelectric device may be made of any type of a vibration sensor.

Also, in accordance with the present embodiment, the vibration transmission plates 13*a* and 13*b* are supported respectively on the support plate 25 by the resilient members 21*a* and 21*b* such that they are prevented from coming in contact with each other. In this configuration, the vibration of the vibration transmission plate 13*a* is prevented from being transmitted to the vibration transmission plate 13*b* as much as possible. That is, it is avoided as much as possible that the piezoelectric element 17*b* mounted on the vibration transmission plate 13*b* detects the vibration of the vibration transmission plate 13*a* to output signals which must not be output. Contrary to this, it is avoided as much as possible that the vibration transmission plate 13a detects the vibration of the vibration transmission plate 13b. As a result, it is possible to detect which batter surface is struck by the player as accurately as possible and thereby prevent erroneous sound output and erroneous motion of a response object.

Also, in accordance with the present embodiment, the game can be enjoyed only by connecting the music game console 1 to the television monitor 90. Furthermore, since the television monitor 90 is widely distributed, most people can enjoy a game only by purchasing the music game console 1.

Still further, in accordance with the present embodiment, the television monitor 90 and the music game console 1 are separately provided. Accordingly, the music game console 1 can be manufactured without an image display unit such that it can be distributed at a low price.

Incidentally, the present invention is not limited to the above embodiments, and a variety of variations and modifications may be effected without departing from the spirit and scope thereof, as described in the following exemplary modifications.

(1) In the above description, the two piezoelectric elements 17a and 17b are used to detect strikes on the two batter surfaces 2 and 4. However, the number of piezoelectric elements and the number of batter surfaces are not limited thereto. the number of piezoelectric elements and/or the number of batter surfaces may be one, three or more. In this case, response objects are preferably displayed in the same number as piezoelectric elements. Likewise, the motion lanes of the indication objects are preferably provided also in the same number as piezoelectric elements.

(2) In the above description, while the two response objects 170L and 170R are displayed, there are the two motion lanes "a" and "b" corresponding to these objects. The numbers of these elements are not limited to two, but may be one, three or more. However, it is not required that the number of the response objects is equal to the number of the piezoelectric elements for detecting strikes.

(3) In the above description, the two piezoelectric elements 17a and 17b are disposed in the single housing. However, the piezoelectric elements 17a and 17b may be disposed in separate housings respectively. In other words, the batter surfaces can be formed with the separate housings.

(4) With the strike sound indicating information of FIG. 20, it is possible to designate various tone qualities such as the tone quality of a string instrument, the tone quality of a keyboard instrument, the tone quality of a wind instrument, voices, a noisy sound, an animal cry and any other natural sounds.

(5) In the above description, the strength of striking as indicated by an indication object is one of two levels, i.e., strong and weak levels. However, it is not limited to this. Three of more levels may be used.

(6) The note number as used for the first musical score data 305 is preferably not used for the second musical score data 306 or the third musical score data 307. Also, the instrument designation information as used for the first musical score data 305 is preferably not used for the second musical score data 306 or the third musical score data 307.

(7) In one exemplary style of playing a game, a single player enjoys the game by striking the strike surface 9 with the sticks 96 in both hands. In another exemplary style of playing a game, two players have the sticks 96 in both hands respectively such that, while one player strikes the left batter surface 2, the other player strikes the right batter surface 4 to enjoy the game together.

(8) In an alternative game screen, for example, there are displayed two windows in the single screen 91, i.e., one window (e.g., corresponding to the screen as illustrated in FIG. 8 but reduced by half in size) in which the computer (the high speed processor 50) plays the game and the other window (e.g., corresponding to the screen as illustrated in FIG. 8 but reduced by half in size) in which the player plays the game, such that the player meets the computer in the context of the game.

(9) In the above description, the strike sound is set by the use of the third musical score data 307. However, it is possible to set the tone qualities of strike sounds directly by time, for example, so that one tone quality is used from the start of music for a predetermined time period, and thereafter another tone quality is used for a further predetermined time. Also, the same tone quality may be used for the strike sound until the music ends while the sound volume is fixed throughout the music.

(10) In the above description, the music game console 1 is not provided with an image display unit. However, an image display unit may be integrally provided with the music game console 1. In this configuration, the music game console can be provided as a mobile game machine. Such an image display unit may be a liquid crystal display.

(11) While any appropriate processor can be used as the high speed processor 50 of FIG. 6, it is preferred to use the high speed processor in relation to which the applicant has been filed patent applications. The details of this high speed processor are disclosed, for example, in Japanese unexamined patent publication No. 10-307790 and U.S. Pat. No. 6,070,205 corresponding thereto.

(12) In the above description, when an effective strike is performed, the response object is moved in response to this. However, the response object may be changed in shape, color or the like property rather than moved in response to an effective strike. Alternatively, the reaction responsive to an effective strike may be indicated by showing the response object while the response object is usually hidden from the view. The player can be notified of the effective strike also by this reaction.

(13) In the above description, when hit, the indication object is returned back in response to this. However, when hit, the indication object may be changed in shape, color or the like property or disappear rather than returned back. The player can be notified of the hit also by this reaction.

(14) In the above description, the note number of the third musical score data 307 is not the information which designates a pitch (the frequency of sound vibration) but the information indicating a strike sound. However, this note number is used to designate a pitch. Namely, the pitch of strike sound can be changed by registering anew entry of the third musical score data 307. In this case, by including the strike sound indicating information in the instrument designation information, it is possible to control both the tone quality and pitch of the strike sound to realize changeful automatic performance.

(15) In the above description, by making use of the television monitor 90, the music game console 1 can be manufactured without an image display unit such that it can be distributed at a low price. It is possible to furthermore lower the price by design the music game console 1 connectable to a personal computer. In this case, the signal processing elements other than the right strike detection circuit 52 and the left strike detection circuit 54 can be dispensed with. However, an appropriate interface is provided for connecting the music game console 1 to a USE or MIDI port of the personal computer. The signal processes other than those performed by the right strike detection circuit 52 and the left strike detection circuit 54 are performed by software in the personal computer. In this case, it is possible to make the music game console more attractive by adding to this software the functionality of converting a Standard MIDI file, which can be easily got from the Internet and the like or prepared as user's own data, into the second musical score data. This conversion feature may be implemented by simply relating the downbeat and the upbeat of a musical measure to the indications of strong and weak striking. Alternatively, the indications of strong and weak striking can be entered in a MIDI editing screen of the software. The most simple implementation is the omission of indications of the way of striking to use a Standard MIDI file as it is. In this case, it may be said that the player plays a musical instrument rather than enjoys a game.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A music game console comprising;
    a plurality of strike surfaces to be struck by a player;
    a plurality of detection circuits that correspond respectively to said strike surfaces;
    a plurality of vibration transmission plates that correspond respectively to said detection circuits;
    a plurality of resilient members that correspond respectively to said vibration transmission plates; and
    a support structure that supports said vibration transmission plates,
    wherein each of said vibration transmission plates is supported by said support structure through the corresponding resilient members,
    wherein said support structure is fixed inside of a housing such that each of said vibration transmission plates is located to face a rear surface of said corresponding strike surface,
    wherein said detection circuits are located to face said support structure, each of said detection circuits being attached to a corresponding one of said vibration transmission plates,
    wherein said vibration transmission plates are supported by said support structure so as not to contact with each other, wherein
    each of said detection circuits detects a striking strength and outputs strike information indicative of the striking strength, and
    wherein each of the resilient members comprises a rubber or a spring, wherein said support structure is provided with a plurality of holes that correspond respectively to said vibration transmission plates,
    wherein each of said vibration transmission plates is provided at a lower surface thereof with a guide,
    wherein each of said guides is inserted into a corresponding hole of said support structure though said corresponding resilient member, and
    wherein each of the guides does not contract an inner surface of the corresponding hole.

2. The music game console as claimed in claim 1, further comprising a plurality of buffer members that correspond respectively to said detection circuits,
    wherein the buffer members are distinct from the resilient members, and
    wherein each of the detection circuits is fixed to the corresponding one of the vibration transmission plates such that a corresponding one of the buffer members is disposed between the detection circuit and the vibration transmission plate.

3. The music game console as claimed in claim 1, further comprising a processor which is operative to judge whether the striking strength detected by each of the detection circuits falls within one of a first strike range and a second strike range which overlap with each other,
    wherein a lower bound of the first strike range is lower than a lower bound of the second strike range, and
    wherein an upper bound of the first strike range is higher than the lower bound of the second strike range.

4. The music game console as claimed in claim 3
    wherein the processor is further operative to:
    acquire sequential musical note information items from first data containing said musical note information items arranged in a time series, and perform music automatically;
    acquire sequential codes assigned to indication object images, each of which indicates a timing of striking to said player, from second data containing said codes which are arranged in a time series, and display on a display device said indication object images corresponding to said acquired codes;
    acquire sequential codes, each of which designates a tone quality of a sound to be output in response to a trigger corresponding to said strike information, from third data containing said codes which are arranged in a time series, and generate the sound of said tone quality designated by each of said codes in response to said trigger if the striking strength exceeds the lower bound of the first strike range;
    indicate a reaction responsive to said strike information with a response object image if the striking strength exceeds the lower bound of the first strike range; and
    indicate a reaction of said indication object image when the reaction of said response object image is indicated during the time that said indication object image is located within a predetermined range in relation to a predetermined reference position.

5. The music game console as claimed in claim 4 wherein the display of the indication object image is determined corresponding to a desired striking criterion.

6. The music game console as claimed in claim 5 wherein the striking criterion is related to at least one of the striking strength and a number of repeating strikes.

7. The music game console as claimed in claim 4 wherein said code of said third data is indicative of both the tone quality and a sound volume.

8. The music game console as claimed in claim 4 wherein said display device is a television monitor.

9. The music game console as claimed in claim 4 wherein said second data and said third data are prepared as data in conformity with a MIDI standard or prepared by processing data which is in conformity with a MIDI standard.

10. The music game console as claimed in claim 4, said processor comprises a graphics processor operable to generate said indication object image and said response object image,
    wherein said graphics processor receives storage location information of image data for generating said indication object image and storage location information of image data for generating said response object image every time a video system synchronous interrupt occurs, and reads said image data stored in storage locations designated by said storage location information to generate said indication object image and said response object image.

11. A music game system comprising:
a processor operable to generate a video game signal and an audio signal; and
a music game console which comprises:
a plurality of strike surfaces to be struck by a player;
a plurality of detection circuits that correspond respectively to said strike surface;
a plurality of vibration transmission plates that correspond respectively to said detection circuits;
a plurality of resilient members that correspond respectively to said vibration transmission plates; and
a support structure that supports said vibration transmission plates,
wherein each of said vibration transmission plates is supported by said support structure through the corresponding resilient members,
wherein said support structure is fixed inside of a housing such that each of said vibration transmission plates is located to face a rear surface of said corresponding strike surface,
wherein said detection circuits are located to face said support structure, each of said detection circuits being attached to a corresponding one of said vibration transmission plates,
wherein said vibration transmission plates are supported by said support structure so as not to contact with each other,
wherein each of said detection circuits detects a striking strength and outputs strike information indicative of the striking strength,
wherein said processor generates the audio signal which includes sound corresponding to the strike information, and outputs the video game signal to a television monitor,
wherein said television monitor and said music game console are separate from each other,
wherein each of the resilient members comprises a rubber or a spring,
wherein said support structure is provide with a plurality of holes that correspond respectively to said vibration transmission plates,
wherein each of said vibration transmission plates is provided at a lower surface thereof with a guide,
wherein each of said guides is inserted into a corresponding hole of said support structure through said corresponding resilient member, and
wherein each of the guides does not contact an inner surface of the corresponding hole.

12. The music game system as claimed in claim 11,
wherein the music game console further comprises a plurality of buffer members that correspond respectively to said detection circuits,
wherein the buffer members are distinct from the resilient members, and
wherein each of the detection circuits is fixed to the corresponding one of the vibration transmission plates such that a corresponding one of the buffer members is disposed between the detection circuit and the vibration transmission plate.

13. The music game system as claimed in claim 11,
wherein the processor is further operable to judge whether the striking strength detected by each of the detection circuits falls within one of a first strike range and a second strike range which overlap with each other,
wherein a lower bound of the first strike range is lower than a lower bound of the second strike range,
wherein an upper bound of the first strike range is higher than the lower bound of the second strike range, and
wherein the processor generates the audio signal if the striking strength exceeds the lower bound of the first strike range.

14. A music game system comprising:
a processor operable to generate a video game signal and an audio signal;
a display device; and
a music game console which comprises:
a plurality of strike surfaces to be struck by a player;
a plurality of detection circuits that correspond respectively to said strike surfaces;
a plurality of vibration transmission plates that correspond respectively to said detection circuits;
a plurality of resilient members that correspond respectively to said vibration transmission plates; and
a support structure that supports said vibration transmission plates,
wherein each of said vibration transmission plates is supported by said support structure through the corresponding resilient members,
wherein said support structure is fixed inside of a housing such that each of said vibration transmission plates is located to face a rear surface of said corresponding strike surface,
wherein said detection circuits are located to face said support structure, each of said detection circuits being attached to a corresponding one of said vibration transmission plates,
wherein said vibration transmission plates are supported by said support structure so as not to contact with each other,
wherein each of said detection circuits detects a striking strengthen and outputs strike information indicative of the striking strength,
wherein said processor generates the audio signal which includes sound corresponding to the strike information, and outputs the video game signal to said display device,
wherein said display device and said music game console are provided integrally with each other,
wherein each of the resilient members comprises a rubber or a spring,
wherein said support structure is provided with a plurality of holes that correspond respectively to said vibration transmission plates,
wherein each of said vibration transmission plates is provided at a lower surface thereof with a guide,
wherein each of said guides is inserted into a corresponding hole of said support structure through said corresponding resilient member, and
wherein each of the guides does not contact an inner surface of the corresponding hole.

15. The music game system as claimed in claim 14,
wherein the music game console further comprises a plurality of buffer members that correspond respectively to said detection circuits,
wherein the buffer members are distinct from the resilient members, and
wherein each of the detection circuits is fixed to the corresponding one of the vibration transmission plates such that a corresponding one of the buffer members is disposed between the detection circuit and the vibration transmission plate.

16. The music game system as claimed in claim 14,
wherein the processor is further operable to judge whether the striking strength detected by each of the detection circuits falls within one of a first strike range and a second strike range which overlap with each other,
wherein a lower bound of the first strike range is lower than a lower bound of the second strike range,
wherein an upper bound of the first strike range is higher than the lower bound of the second strike range, and
wherein the processor generates the audio signal if the striking strength exceeds the lower bound of the first strike range.

17. A percussion game system for playing a game with music comprising:
a plurality of strike surfaces each of which receives strikes by a player;
a plurality of sensors each of which is placed to receive vibration of a corresponding one of said plurality of strike surfaces, and detects a striking strength of each of said strikes exerted on said corresponding strike surface by the player and outputs strike signals indicative of the striking strength of each of said strikes; and
a signal processing unit connected to a memory unit operable to store audio data and image data, and operable to display an image on a display based on said image data and output music through a speaker based on said audio data,
wherein said signal processing unit coupled to said sensor and operable to output sounds of tone qualities as a musical part accompanying the music through said speaker in response to said strike signals from said sensor,
wherein said percussion game system further comprises:
a plurality of vibration transmission plates that correspond respectively to said sensors;
a plurality of resilient members that correspond respectively to said vibration transmission plates; and
a support structure that supports said vibration transmission plates,
wherein each of said vibration transmission plates is supported by said support structure through the corresponding resilient members,
wherein said support structure is fixed inside of a housing such that each of said vibration transmission plates is located to face a rear surface of said corresponding strike surface,
wherein said sensors are located to face said support structure, each of said sensors being attached to a corresponding one of said vibration transmission plates,
wherein said vibration transmission plates are supported by said support structure so as not to contact with each other,
wherein each of the resilient members comprises a rubber or a spring,
wherein said support structure is provided with a plurality of holes that correspond respectively to said vibration transmission plates,
wherein each of said vibration transmission plates is provided at a lower surface thereof with a guide,
wherein each of said guides is inserted into a corresponding hole of said support structure through said corresponding resilient member, and
wherein each of the guides does not contact an inner surface of the corresponding hole.

18. The music game system as claimed in claim 17,
wherein the music game console further comprises a plurality of buffer members that correspond respectively to said sensors,
wherein the buffer members are distinct from the resilient members, and
wherein each of the sensors is fixed to the corresponding one of the vibration transmission plates such that a corresponding one of the buffer members is disposed between the sensor and the vibration transmission plate.

19. The percussion game system as claimed in claim 17,
wherein the signal processing unit is further operable to judge whether the striking strength detected by each of the sensors falls within one of a first strike range and a second strike range which overlap with each other,
wherein a lower bound of the first strike range is lower than a lower bound of the second strike range,
wherein an upper bound of the first strike range is higher than the lower bound of the second strike range, and
wherein the signal processing unit outputs the sound if the striking strength exceeds the lower bound of the first strike range.

20. An entertainment music system for enjoying music comprising:
a signal processing unit connected to a memory unit operable to store music data and image data, and operable to output music through a speaker with reference to said music data and display an image on a display device; and
an input device which an user of the entertainment music system can strike to input strike signals to said signal processing unit,
wherein said signal processing unit is operable to read data corresponding to a user's part from said music data and output sounds in response to said strike signals with reference to said data corresponding to the user's part,
wherein said image displayed on said display device is an interactive image providing an indication of a timing of the strike to the user,
wherein said input device includes:
a plurality of strike surfaces to be struck by the player;
a plurality of detection circuits that correspond respectively to said strike surfaces;
a plurality of vibration transmission plates that correspond respectively to said detection circuits;
a plurality of resilient members that correspond respectively to said vibration transmission plates; and
a support structure that supports said vibration transmission plates,
wherein each of said vibration transmission plates is supported by said support structure through the corresponding resilient members,
wherein said support structure is fixed inside of a housing such that each of said vibration transmission plates is located to face a rear surface of said corresponding strike surface,
wherein said detection circuits are located to face said support structure, each of said detection circuits being attached to a corresponding one of said vibration transmission plates,
wherein said vibration transmission plates are supported by said support structure so as not to contact with each other,
wherein each of said detection circuits detects a striking strength and outputs the strike signal indicative of the striking strength,
wherein each of the resilient members comprises a rubber or a spring, wherein said support structure is provided with a plurality of holes that correspond respectively to said vibration transmission plates, wherein each of said vibration transmission plates is provided at a lower surface thereof with a guide, wherein each of said guides is inserted into a corresponding hole of said support structure through said corresponding resilient member, and wherein each of the guides does not contact an inner surface of the corresponding hole.

21. The entertainment music system as claimed in claim 20 wherein said music data is prepared as data in conformity with a MIDI standard or prepared by processing data which is in conformity with a MIDI standard.

22. The entertainment music system as claimed in claim 20, wherein the input device further comprises a plurality of buffer members that correspond respectively to said detection circuits, wherein the buffer members are distinct from the resilient members, and wherein each of the detection circuits is fixed to the corresponding one of the vibration transmission plates such that a corresponding one of the buffer members is disposed between the detection circuit and the vibration transmission plate.

23. The entertainment music system as claimed in claim 20, wherein the signal processing unit is further operable to judge whether the striking strength detected by each of the detection circuits falls within one of a first strike range and a second strike range which overlap with each other, wherein a lower bound of the first strike range is lower than a lower bound of the second strike range, wherein an upper bound of the first strike range is higher than the lower bound of the second strike range, and wherein the signal processing unit outputs the sound if the striking strength exceeds the lower bound of the first strike range.

* * * * *